(12) United States Patent
Inoue et al.

(10) Patent No.: US 8,365,021 B2
(45) Date of Patent: Jan. 29, 2013

(54) INFORMATION PROCESSING DEVICE COMPRISING A PLURALITY OF DOMAINS HAVING A PLURALITY OF PROCESSORS, RECOVERY DEVICE, PROGRAM AND RECOVERY METHOD

(75) Inventors: Hiroaki Inoue, Tokyo (JP); Junji Sakai, Tokyo (JP); Tsuyoshi Abe, Tokyo (JP); Masaki Uekubo, Tokyo (JP); Noriaki Suzuki, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 1316 days.

(21) Appl. No.: 11/921,742

(22) PCT Filed: Feb. 23, 2006

(86) PCT No.: PCT/JP2006/303920
§ 371 (c)(1),
(2), (4) Date: Dec. 7, 2007

(87) PCT Pub. No.: WO2006/134691
PCT Pub. Date: Dec. 21, 2006

(65) Prior Publication Data
US 2009/0119541 A1 May 7, 2009

(30) Foreign Application Priority Data

Jun. 17, 2005 (JP) .................................. 2005-177811

(51) Int. Cl.
*G06F 11/00* (2006.01)
*G06F 11/22* (2006.01)

(52) U.S. Cl. ............... 714/48; 714/2; 714/38.1; 714/54; 714/57

(58) Field of Classification Search ................ 714/32, 714/37, 38, 47, 55, 2, 10, 38.1, 48, 54, 57
See application file for complete search history.

(56) References Cited

U.S. PATENT DOCUMENTS

| 6,718,482 | B2 * | 4/2004 | Sato et al. ...................... 714/4.4 |
| 6,892,331 | B2 * | 5/2005 | Da Palma et al. ............... 714/55 |
| 7,171,590 | B2 | 1/2007 | Kadoi |
| 7,617,411 | B2 * | 11/2009 | Baba et al. ..................... 714/4.1 |
| 8,005,959 | B2 * | 8/2011 | Bernardi et al. ............. 709/227 |
| 2002/0087687 | A1 * | 7/2002 | Zaifman et al. ............... 709/225 |

(Continued)

FOREIGN PATENT DOCUMENTS

| EP | 1391822 A2 | 2/2004 |
| JP | 04-275663 | 10/1992 |

(Continued)

OTHER PUBLICATIONS

TechNet Blogs "Virtual PC verses Virtual Server" published Nov. 29, 2004.*

*Primary Examiner* — Joseph Schell
(74) *Attorney, Agent, or Firm* — Foley & Lardner LLP

(57) ABSTRACT

The information processing device which recovers a domain developing a fault caused by added application and device driver while maintaining security and reliability includes a plurality of processors, wherein the plurality of processors form a plurality of domains according to processing contents to be executed, and the processors in different domains communicate with each other through a communication unit, and which further includes a recovery unit for executing, for a domain developing a fault, failure recovery processing based on a failure recovery request notified by the domain and a recovery condition set in advance for each domain.

53 Claims, 43 Drawing Sheets

U.S. PATENT DOCUMENTS

| | | | |
|---|---|---|---|
| 2006/0004667 A1* | 1/2006 | Neil | 705/59 |
| 2006/0136720 A1* | 6/2006 | Armstrong et al. | 713/164 |
| 2008/0256639 A1* | 10/2008 | Onoda et al. | 726/26 |

FOREIGN PATENT DOCUMENTS

| | | |
|---|---|---|
| JP | 06-332864 | 12/1994 |
| JP | 2001-154999 A | 6/2001 |
| JP | 2000-276364 A | 10/2001 |
| JP | 2002-533791 A | 10/2002 |
| JP | 2002-542537 A | 12/2002 |
| JP | 2004-500666 A | 1/2004 |
| JP | 2004-062535 A | 2/2004 |

* cited by examiner

| ADDITION SIDE CPU | STARTING POINT ADDRESS | ENDING POINT ADDRESS | KIND OF ACCESS |
|---|---|---|---|
| CPU#4 | 0x0001000 | 0x0002000 | R |
| CPU#2、#3 | 0xC000000 | 0xF000000 | R/W |
| CPU#3 | 0xE000000 | 0xF000000 | W |

ALLOWED RANGE ADDRESS

ALLOWED REFERENCE METHOD

OVERLAP IS ALLOWED

700 FUNCTION SIGNIFICANCE SETTING TABLE

|  | HIGHEST RELIABILITY DOMAIN | MEDIUM RELIABILITY DOMAIN | LOW RELIABILITY DOMAIN |
|---|---|---|---|
| FUNCTION 1 | LEVEL A | — | — |
| FUNCTION 2 | LEVEL A | LEVEL B | — |
| FUNCTION 3 | LEVEL A, LEVEL B | LEVEL A, LEVEL B | — |
| FUNCTION 4 | LEVEL A, LEVEL B | LEVEL A, LEVEL B | LEVEL C |
| FUNCTION 5 | LEVEL A, LEVEL B | LEVEL A, LEVEL B, LEVEL C | LEVEL C, LEVEL D |

404a RECOVERY PROCESSING ALLOWANCE DATA

INFORMATION PROCESSING DEVICE COMPRISING A PLURALITY OF DOMAINS HAVING A PLURALITY OF PROCESSORS, RECOVERY DEVICE, PROGRAM AND RECOVERY METHOD

TECHNICAL FIELD

The present invention relates to an information processing device formed of multiprocessors and, more particularly, an information processing device comprising a domain having a processor capable of executing additional processing externally obtained, a recovery device, a program and a recovery method.

BACKGROUND ART

In an information communication terminal device such as a mobile phone, basic processing for realizing a basic function of the terminal device (e.g. a call processing function, a browsing function for Internet access, an electronic mailing function, a screen control function and the like) is commonly installed together with an operating system in advance and other additional processing (program) than the above-described basic processing is downloaded into the terminal device from the outside such as a network by user operation or the like and executed for installation. When the downloaded additional processing is executed, however, an operating system, basis processing and the like might be subjected to an attack by the additional processing.

FIG. 42 is a diagram schematically showing one example of a typical structure of an information communication terminal device which executes downloaded additional processing. Illustrated schematically in FIG. 42 is a block diagram of a well-known typical device structure. In the following, description will be made of a case where additional processing is an application program or a device driver (software which makes an access request to a device and executes processing of interruption from a device and which is also referred to as "I/O driver") provided by a native code (a binary code compiled or subjected to assembly processing on a provider side).

In the structure shown in FIG. 42, when an additional processing 23 is downloaded and executed (in a case where the additional processing 23 is a device driver, when the processing is incorporated into an operating system and executed), a basic processing 22, an operating system (called "OS") 21, a CPU (Control Processing Unit) 10, a memory 50 and an input/output device (I/O) 60 might be directly attacked by the additional processing 23. The reason is that no means is mounted for restricting attack to the basic processing 22, the CPU 10, the OS 21, the memory 50 or the input/output device (I/O) from the additional processing 23 to realize safe execution environments. More specifically, in a case of the structure shown in FIG. 42, the additional processing 23 is assumed to be capable of arbitrarily issuing a processing request to the basic processing 22, a processing request to the OS 21 and processing requests to the CPU 10, the memory 50 and the input/output device 60 and be allowed to freely access each resource of hardware and software. As a result, the malicious additional processing 23 (or additional processing affected by virus or the like even without malicious intent) is allowed to freely attack the defenseless OS 21, basic processing 22 and the like.

There is a case where an additional device driver is incorporated in a kernel of the OS 21 as a resident driver, for example, in which case reliability of the device driver will directly affect reliability and performance of the OS 21. This is clear also from properties of a device driver that the device driver includes processing setting to a device and interruption service to be started by a scheduler at an interruption from a device and that execution time of the interruption service (during which time re-scheduling is inhibited) is limited to a time significantly short because of processing performance (e.g. less than a millisecond). In other words, if an additional device driver is a driver with malicious intent, processing performance of an information processing device could be deteriorated with ease. This is also the case with a loadable driver (a driver selectively loaded or unloaded to/from memory) not a resident driver. Thus, when a driver with malicious intent installed as additional processing attacks, the kernel of the OS 21 will be directly attacked to be fatal (goes substantially inoperable).

Under these circumstances, currently proposed are various kinds of design architectures for protecting basic processing and the like by limiting execution environments of a downloaded additional processing. In the following, outlines will be given with respect to several typical examples.

FIG. 43 is a diagram showing one typical example of a structure which presents environments for protecting execution of additional processing by software. In the example shown in FIG. 43, the additional processing 23 by native codes is designed to be executed on a virtual machine 24. As an example, assuming that the additional processing 23 is described in JAVA (registered trademark) byte codes, a downloaded JAVA (registered trademark) byte code will be executed on JVM (registered trademark) virtual machine) forming the virtual machine 24.

In such a structure, the basic processing 22, the OS 21 and the like are separated from the additional processing 23 in terms of software to have their securities ensured. More specifically, the additional processing 23 accesses the OS 21, the CPU 10, the memory 50, the I/O 60 and the like only through the virtual machine 24. The virtual machine 24 is not ordinarily authorized to do execution in a kernel mode of the OS 21 (e.g. execution of a privileged instruction) or the like and therefore, the additional processing 23 is not allowed to directly operate the OS 21. In addition, since the virtual machine 24 in general executes an instruction code of the additional processing 23 in an interpreter method, monitoring adequacy of instructions/operation of the additional processing 23 is easy and by, for example, limiting unauthorized access (e.g. output of multiple data on a network or a screen and the like) to hardware resources and software resources from the additional processing 23, the virtual machine 24 is allowed to serve as a protective filter or a protective barrier, or a protective gate in terms of software. Thus, the basic processing 22, the OS 21 and the like are separated from the additional processing 23 through the virtual machine 24 in terms of software.

The virtual machine system shown in FIG. 43, however, has the following problems.

When the downloaded additional processing 23 attacks the virtual machine 24 through a hole (e.g. security hole) or other, system security will be damaged.

In addition, since the virtual machine 24 such as a JAVA (registered trademark) virtual machine is in general adopts an interpreter method of interpreting and executing instruction codes such as JAVA (registered trademark) byte codes one instruction by one instruction, its execution rate is low.

Furthermore, although the virtual machine 24 makes a processing request to the OS 21 by issuing a system call at the time of execution of the additional processing 23, because an overhead of the system call is large, processing execution is slow. In the virtual machine 24, for example, one or a plurality of system calls corresponding to one instruction of the additional processing 23 are issued. A series of such control is executed to have a large overhead as context switching from a user mode to a system mode by system call issuance, decoding of packet data of a system call at a system call entry unit of the OS 21, justification check (error detection processing) of a parameter and the like, distribution (dispatch) of processing and furthermore, transfer of a processing result at the time of processing end, context switching, switching from a kernel space to a user space and the like.

Then, in a case of the structure shown in FIG. 43, it is not possible to incorporate a device driver as the additional processing 23 into the OS 21. As is clear from FIG. 43, the virtual machine 24 locates in the upper layer above the OS 21. With the virtual machine 24 structured to make a processing request to the OS 21 based on the codes of the additional processing 23, receive a processing result from the OS 21 and return the same to the additional processing 23 when necessary, incorporating additional processing as a device driver into the OS 21 requires incorporation of a virtual machine as well which controls execution of the additional processing into the OS 21, so that such a structure is in principle impossible in such the virtual machine system shown in FIG. 43.

Known as another security management system by software is such a structure as shown in FIG. 44, for example. As shown in FIG. 44, the additional processing 23 is downloaded into a terminal (information processing device) with a certificate 25 attached for certifying that it can be trusted. The terminal side is structured to check the contents of the attached certificate 25 and when authenticating that the attached certificate 25 is a proper certificate, allow installation and execution of the downloaded additional processing 23. As the certificate 25, digital signing (ITU-T XS09) may be used. With an organization to be certified and its public key, and digital signing of CA (certification authority) (encipherment of an organization to be certified or a public key by a secret key of CA), for example, stored in the certificate 25, when authenticating the certificate, decode a part of CA digital signing by the public key of CA to check whether the decoded contents coincide with the contents of the data of the certificate and determine that the data of the certificate is reliable when they coincide with each other. Alternatively, the certificate 25 may be an arbitrary certificate as long as it certifies a true vender. Driver signing of a device driver is mounted also on Windows (registered trademark) 2000, for example.

In a case of the system shown in FIG. 44, the additional processing 23 can be provided by a native code, which enables higher-speed execution than in the virtual machine system shown in FIG. 43. Execution of an application and a device driver is also possible as the additional processing 23. System reliability, however, wholly depends on security of the additional processing 23. In other words, when the additional processing 23 has a problem which can not be sensed in advance, the system might be fatally damaged.

FIG. 45 is a diagram showing a structure of a processor which executes security management by hardware. With reference to FIG. 45, a CPU 11 has a secure mode 12 and a non-secure mode 13, and the downloaded additional processing 23 and an OS 21B corresponding to the additional processing 23 are mainly executed in the non-secure mode 13. Then, a memory management unit 14 manages a region (address space) of memory executed in the non-secure mode 13 separately from a region of memory accessed in the secure mode 12, so that an access to a memory region in the secure mode 12 from the non-secure mode 13 is inhibited. In other words, the memory management unit 14 executes memory access control from the non-secure mode 13 and control for inhibiting an access to a memory region in the secure mode 12 from the non-secure mode 13.

Thus, in the structure shown in FIG. 45, the basic processing 22 is executed in the secure mode 12 to virtually separate a CPU which executes the additional processing 23 and another CPU, thereby improving security.

The secure mode and the non-secure mode are, however, executed on a time division basis on the CPU and no system operation in the secure mode is executed unless returned from the non-secure mode.

In addition, since the non-secure mode and the secure mode are processed on a time division basis, such overhead as mode shift is generated at its switching.

Furthermore, when the additional processing 23 is incorporated as a device driver into the OS 21B in the non-secure mode, if the driver has malicious intent, return to the secure mode might be disabled to cause fatal damage to the system.

Referred to as a processor with a separation region provided in system memory and comprising a normal execution mode and a separated execution mode similarly to the structure shown in FIG. 45 is recitation of Japanese Translation of PCT International Application No. 2004-50666 (Literature 1). The device recited in Literature 1, with the normal execution mode being a mode operable in an ordinary operation mode without a security function provided to the processor in non-secure environments, that is, in the separated execution mode, is structured to inhibit an access to a separated region from the normal execution mode and support execution of a predetermined separation instruction in the separated execution mode. Even with such a structure, because the normal execution mode and the separated execution mode are processed on a time division basis, such overhead is generated as mode shift at its switching.

Also disclosed is a structure comprising two processor units and a switch unit, with one processor unit connected to a public data communication network and other processor unit not connected to the public data communication network but functioning as a data security unit (see Japanese Translation of PCT International Application No. 2002-542537 (see Literature 2)). The system recited in Literature 2 has the processor unit connected to the public data communication network and the data security unit separated by a switch, thereby ensuring security of the data security unit. The device, however, takes into no consideration a countermeasure against an attack to the processor unit connected to the public data communication network by the execution of the above-described additional processing (additional processing downloaded from a network or the like). While the data security unit is safe, the processor unit connected to the public data communication network fails to have a security mechanism effective to an attack by additional processing. For realizing security management in the processor unit connected to the public data communication network, therefore, it is necessary to adopt any of the above-described systems.

Furthermore, recited in Japanese Translation of PCT International Application No. 2002-533791 (Literature 3) is the system simultaneously executing an execution program or an operating system separated on a processor, in which for protecting false program execution environments, a memory space used only by a first program is set while the first program is executed, communication between the first program and a computer execution environment is executed through a single link including use of a shared memory space, dedicated interruption or a dedicated I/O port, and the first program has its access to resources on a processor restricted excluding a set memory space and a single link under a limited execution environment. In a case of the method recited in Literature 3, since the first program has its access to resources on a processor restricted excluding a set memory space and a single link (use of a shared memory space, dedicated interruption or a dedicated I/O port), the first program can not be used as a device driver and therefore can not be applied to additional processing including a device driver.

As publication disclosing a technique related to an inter-processor communication unit used in the present invention which will be described later, Japanese Patent Laying-Open No. H6-332864 (Literature 4) discloses the system for communication between CPUs in a multiprocessor system. Recited in Literature 4 as its related art is a structure in which at the execution of communication between CPUs by a multiprocessor by using a shared memory, when generating an interruption to a CPU1, a CPU2 writes communication information into an inter-CPU communication information write region for its own use in a fixed region for the CPU1 to generate an interruption and when an interruption occurs, the CPU1 accesses an inter-CPU communication information write region corresponding to the CPU2 to execute interruption processing and further recited is the invention intended to reduce the number of accesses of a shared memory.

Japanese Patent Laying-Open No. 2001-154999 (Literature 5) proposes the parallel computation system in which a processor analysis circuit detects a failure at the start-up of its own processor to ask a service processor for recovery and the service processor executes processing for the recovery.

Literature 1: Japanese Translation of PCT International Application No. 2004-500666.

Literature 2: Japanese Translation of PCT International Application No. 2002-542537.

Literature 3: Japanese Translation of PCT International Application No. 2002-533791.

Literature 4: Japanese Patent Laying-Open No. H6-332864.

Literature 5: Japanese Patent Laying-Open No. 2001-154999.

As described above, related devices with a countermeasure for ensuring security against an attack from downloaded malicious or false additional processing in practice have various kinds of problems remaining such as a problem in processing performance, a problem that execution of a device driver is impossible and a problem in ensuring security. In particular, as shown in FIG. 43 and FIG. 45, related to an information processing device, a design architecture which disables downloading of an additional device driver from outside the device shows that addition of a device and addition of a function are substantially impossible and in this term, has limited availability.

On the other hand, since when operating an additional device driver in a kernel mode, for example, reliability of an OS and a system is directly affected as described above, drastic improvement in ensuring security and in reliability is demanded.

Also recovery processing in a related parallel computation system whose one example is the technique disclosed in Literature 5 has a problem that processing will be executed in response to such a request with malicious intent as a notified recovery request including virus.

An object of the present invention is therefore to provide an information processing device, a recovery device, a program and a recovery method which enable a domain developing a fault due to added application program and device driver to be recovered with its security and reliability ensured.

SUMMARY

According to a first exemplary aspect of the invention, an information processing device, comprising a plurality of processors, wherein the plurality of processors form a plurality of domains according to processing contents to be executed, and the processors in different domains communicate with each other through a communication unit, and which further includes a recovery unit for executing, for a domain developing a fault, failure recovery processing based on a failure recovery request notified by the domain and a recovery condition set in advance for each the domain.

According to a second exemplary aspect of the invention, a recovery device for recovering, on an information processing device having a plurality of domains formed of a plurality of processors, a failure occurring on the domain, which comprises with the plurality of processors forming a plurality of domains according to processing contents to be executed, a recovery unit for executing, for a domain developing a fault, failure recovery processing based on a failure recovery request notified by the domain and a recovery condition set in advance for each the domain.

According to a third exemplary aspect of the invention, a program executed on an information processing device as a computer processing device formed of a plurality of processors to realize recovery of a function of the information processing device, which making the information processing device execute with the plurality of processors forming a plurality of domains according to processing contents to be executed, a communication function of causing the processors in different domains to communicate with each other, and a recovery function of executing, for a domain developing a fault, failure recovery processing based on a failure recovery request notified by the domain and a recovery condition set in advance for each the domain.

According to a fourth exemplary aspect of the invention, a recovery method of recovering a processing function of an information processing device formed of a plurality of processors, includes with the plurality of processors forming a plurality of domains according to processing contents to be executed, and with the processors in different domains communicating by a communication step, a recovery step of executing, by a recovery unit on the information processing device, failure recovery processing for a domain developing a fault based on a failure recovery request notified by the domain and a recovery condition set in advance for each the domain.

EXEMPLARY EMBODIMENT

Figure 1:
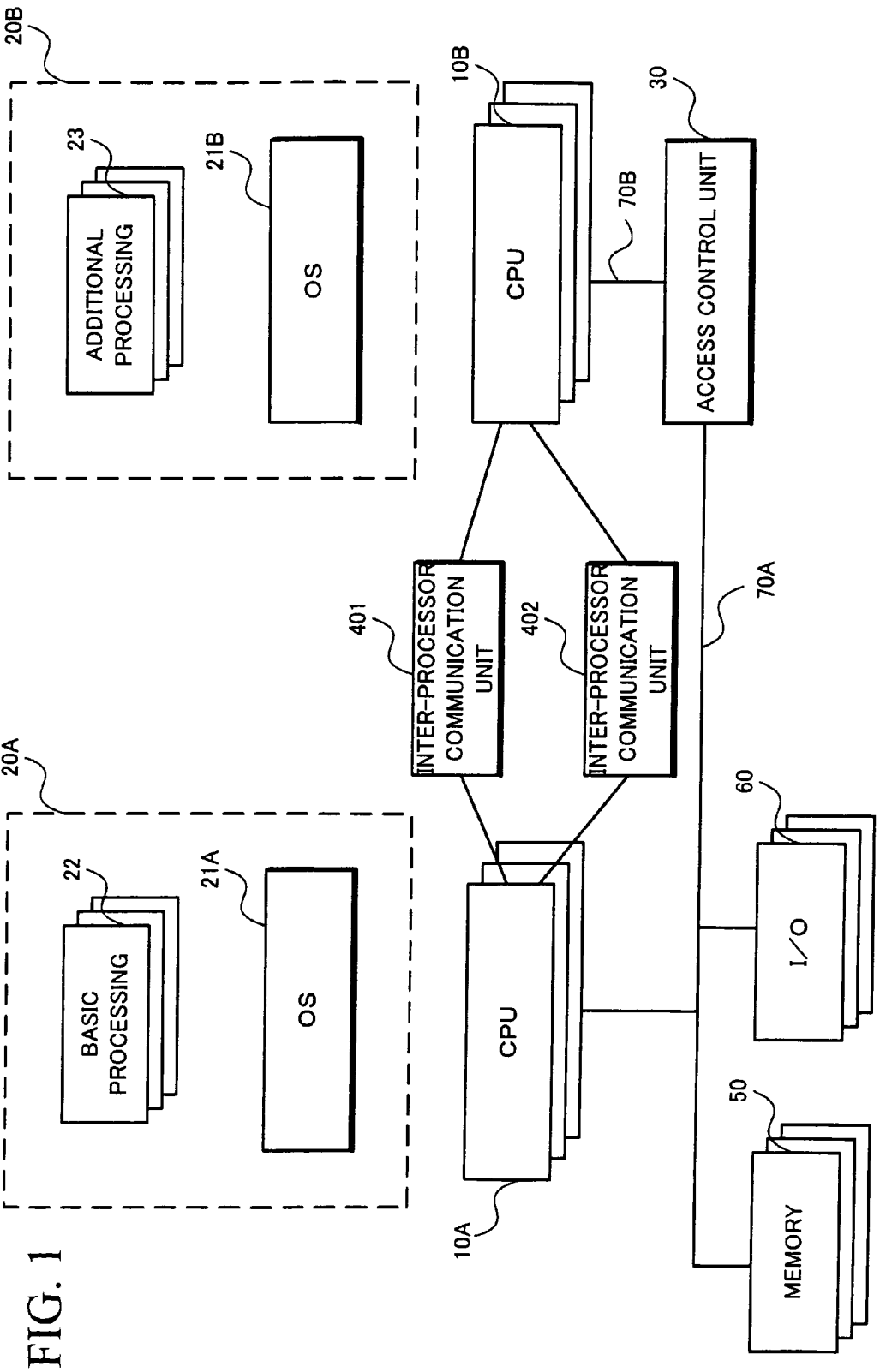
FIG. 1 is a diagram showing a hardware structure of an information processing device of a first example of the present invention.

First, a basic structure of an information processing device to which the present invention is applied will be described.

According to a first example of the basic structure, in an information processing device having a multi-CPU structure including a plurality of CPUs, the plurality of CPUs are divided into a plurality of domains (e.g. basic domain, trusted domain, untrusted domain and the like) according to a security level of a program (processing) to be executed.

Basic domain is assumed to be a domain which executes processing whose security level is higher than a fixed level, a trusted domain is assumed to be a domain having at least one processing whose security level is lower than that of processing executed by a basic domain, and an untrusted domain is assumed to be a domain having at least one processing whose security level is lower than that of processing executed by a trusted domain.

Alternatively, the basic domain may have each execution processing whose fixed security level is the same as a security level of execution processing in the trusted domain or higher than a security level of execution processing in the trusted domain and includes at least one processing whose security level is higher as a set of execution processings of the basic domain.

The trusted domain may have each execution processing whose fixed security level is the same as a security level of execution processing in the untrusted domain or higher than a security level of execution processing in the untrusted domain and includes at least one processing whose security level is higher as a set of execution processings of each domain. In this case, the basic domain executes processing whose security level is relatively higher than that of the trusted domain and the trusted domain executes processing whose security level is relatively higher than that of the untrusted domain.

Each domain is structured to include one or a plurality of CPUs and execute communication of CPU between different domains through an inter-processor communication unit (e.g. 40 in FIG. 1), in which when a CPU belonging to a domain executing low security processing such as additional processing accesses memory and an input/output device of a domain executing high security processing, to a relevant access request, access allowance/non-allowance is determined by an access control unit (e.g. 30 in FIG. 1) to make only an allowed access.

Thus structured first example ensures security of a high security domain by executing downloaded additional processing (including a device driver and an application program) by a CPU on a lower security domain side having other hardware structure than that of the high security domain.

Downloading here includes downloading to an information device via not only a data communication network provided by a carrier of a mobile phone and a common radio LAN network but also such connection as an accumulation type medium whose representative is an SD card and a wire communication medium whose representative is USB.

Then, according to the first example, synchronization and cooperative operation between CPUs of a high security domain and a low security domain are enabled while guaranteeing security by not separately controlling CPUs of the high security domain and the low security domain by a switch or the like but connecting them through an inter-processor communication unit which enables communication with each other.

The inter-processor communication unit (40 in FIG. 1) is structured to transfer data (command) from a CPU of one domain to a CPU of other domain and not structured to make a direct attack to a CPU of other domain and the like. For example, even when trying to cause degradation of CPU performance of a high security domain, buffer overflow and the like by continuously transmitting a large volume of data from a CPU on a low security domain side to a CPU on a high security domain side, relevant data is suppressed by the inter-processor communication unit to prevent transmission to the CPU of the high security domain.

Also in the first example, the access control unit (30 in FIG. 1) executes access control of allowing a CPU on a low security domain side only an access of a form allowed in advance to a memory space, an input/output device and the like allowed in advance. This enables an attack to a high security domain from a downloaded additional processing to be prevented. Alternatively, by the control of a band, a flow and the like by the access control unit as required, various kinds of attacks from a downloaded additional processing to a high security domain can be prevented. Description will be made along the first example in the following.

FIG. 1 is a diagram showing a structure of the first example. With reference to FIG. 1, provided are a group 10A of CPUs which execute a software 20A including a basic processing 22 and an OS 21A, a group 10B of CPUs which execute a software 20B including an additional processing 23 and an additional processing compatible OS 21B, inter-processor communication units 401 and 402 which execute communication between the CPU groups 10A and 10B, and an access control unit 30 which controls an access by the CPU group 10B to a memory 50 and/or an input/output device (I/O) 60. Although shown in FIG. 1 are the CPU group 10A and the CPU group 10B each formed of a plurality (three) of CPUs, it is apparent that each group can be formed of one CPU. It is also apparent that in the CPU group 10A and the CPU group 10B, the number of CPUs in each group needs not to be the same. In the following, the CPU group 10A and the CPU group 10B will be simply referred to as the CPU 10A and the CPU 10B. In the first example, the additional processing 23 to be downloaded is formed of a native code of a binary format. It may have a binary format obtained by subjecting a downloaded source program to compiling processing (assembling processing).

According to the first example, with the CPU 10B executing the additional processing 23 provided separately from the CPU 10A executing the basic processing 22, the CPU 10A and the CPU 10B which are operable independently realize high-speed execution while improving security, thereby enabling execution of an application program and a device driver. It is apparent that possible is a structure in which with the CPU 10A executing the basic processing 22 as a master and the CPU 10B executing the additional processing 23 as a slave, the slave side operates under the supervision of the master. In this case, for example, execution of the additional processing 23 by the CPU 10B is realized by receiving a command from the CPU 10A through the inter-processor communication unit 402.

The inter-processor communication units 401 and 402 control data transmission and reception between the CPU 10A and the CPU 10B. Being disposed independently, the CPUs 10A and 10B are allowed to execute their processing (programs) in parallel to each other, while synchronous processing and cooperative (highlighting) processing between the CPU 10A and the CPU 10B through the inter-processor communication units 401 and 402 are enabled as well. As an example, when a user instructs on execution of additional processing on a screen of a display device, the CPU 10A executing the basic processing 22 transmits a request for starting the additional processing 23 to the CPU 10B through the inter-processor communication unit 401, so that the additional processing 23 is executed on the CPU 10B to transmit an execution result from the CPU 10B to the CPU 10A through the inter-processor communication unit 402 and a screen control routine or the like forming the basic processing 22 presents information reflecting the execution result of the additional processing 23 to a user.

The first example is structured such that at the execution of the additional processing 23 by the CPU 10B, when a request for access to the memory 50 or the input/output device (I/O) 60 is made, the access control unit 30 executes control for allowing the access to execute only an allowed access request to the memory 50 and the input/output device (I/O) 60. Then, in the CPU 10B, the additional processing 23 is executed on the OS 21B and when a processing request to the basic processing 22 or the OS 21A is issued from the additional processing 23, the request is notified to the CPU 10A through the inter-processor communication unit 401. In other words, the additional processing 23 is not allowed to directly operate the basic processing 22. For example, even when the additional processing 23 with malicious intent tries to drastically decrease execution performance of the basic processing on the CPU 10A side by frequently issuing a request to the CPU 10A to give loads, such attack as described above can be prevented to ensure security by the control by the inter-processor communication unit 401 to prevent transmission of such a request to the CPU 10A side.

In the example shown in FIG. 1, the inter-processor communication unit 401 controls information transfer from the CPU 10B to the CPU 10A and the inter-processor communication unit 402 controls information transmission from the CPU 10A to the CPU 10B. It is apparent that alternatively, one inter-processor communication device is structured to execute interactive transmission and reception of data. In the first example, when a plurality of CPUs 10A executing the basic processing 22 require communication between the CPUs, communication between CPUs is executed without using the inter-processor communication unit 40. This is also the case with a plurality of CPUs 10B which execute the additional processing 23. As will be described later, when some of the plurality of CPUs forming the CPU group 10B are dynamically switched as an element of the CPU group 10A, although the CPU group 10B logically belongs to the CPU group 10A, communication between the CPUs may be executed through the inter-processor communication unit 40.

The first example is assumed to enable downloading, installation and execution of an application program and a device driver to be executed as the additional processing 23. An added device driver is incorporated into the OS 21B and executed on the CPU 10B and control of access to the input/output device 60 is executed under the monitoring by the access control unit 30.

In such a portable type information communication device as a mobile phone and PDA, the basic processing 22 and the OS 21A in FIG. 1 are in general stored in a rewritable non-volatile memory (EEPROM: Electrically Programmable and Erasable ROM) not shown and the CPU 10A fetches, decodes and executes an instruction code from the EEPROM. In other words, memories stored by the OSs 21A and 21B which execute the basic processing 22 and the additional processing 23, respectively, are separated from each other in terms of hardware on the basic processing side and the additional processing side. Then, while the instruction codes of the basic processing, the OS and the like are executed which are stored in the EEPROM, data of a table and the like which is initialized, referred to and updated by a program executed is expanded to the memory 50 formed of DRAM (Dynamic Random Access Memory) by the CPU 10A and 10B at the time of start-up of each OS. Then, as to the CPU 10B, the access control unit 30 manages a memory region to be read/written to limit an access to a memory region to be referred to by the CPU 10A. Also in other common information processing device than a portable type information communication terminal, it is apparent that memory into which the basic processing 22 and the OS21A are loaded and whose instruction code is fetched by the CPU 10A and memory into which the additional processing 23 and the OS21B are loaded and whose instruction code is fetched by the CPU 10B can be separately provided. Alternatively, it is possible in a common information processing device to provide a region into which the basic processing 22 and the OS 21A are loaded and a region into which the additional processing 23 and the OS 21B are loaded separately from each other in the memory 50 to manage a read/write access by the CPU 10B from/to the memory 50 by the access control unit 30. In this case, with codes to which the CPU 10A and the CPU 10B refer only stored in a common memory region, the access control unit 30 may execute access control such that the CPU 10B is allowed only read from the common memory region.

Also in a portable type information processing device, when a mounted battery has its remaining power reduced, the remaining power can be saved by forcibly shutting down other CPUs than that executes the basic processing or preferentially shutting down a CPU executing processing of lower reliability according to reliability of processing to be executed. This can be realized, for example, by such processing of making determination on CPU executing the basic processing based on information related to remaining battery power which is obtained by a unit for detecting remaining battery power and a unit for notifying a detection result and executing shut-down.

Furthermore, since a resource in a portable type information processing device, for example, a bandwidth of communication with the outside or the amount of non-volatile memory is further limited, a relative rate of resources ensured can be changed according to reliability. This can be realized, for example, by making such determination as to preferentially allow resources to be ensured when in a CPU executing the basic processing, reliability of processing to be executed is high and limit the resources when the reliability is low.

Figure 2:
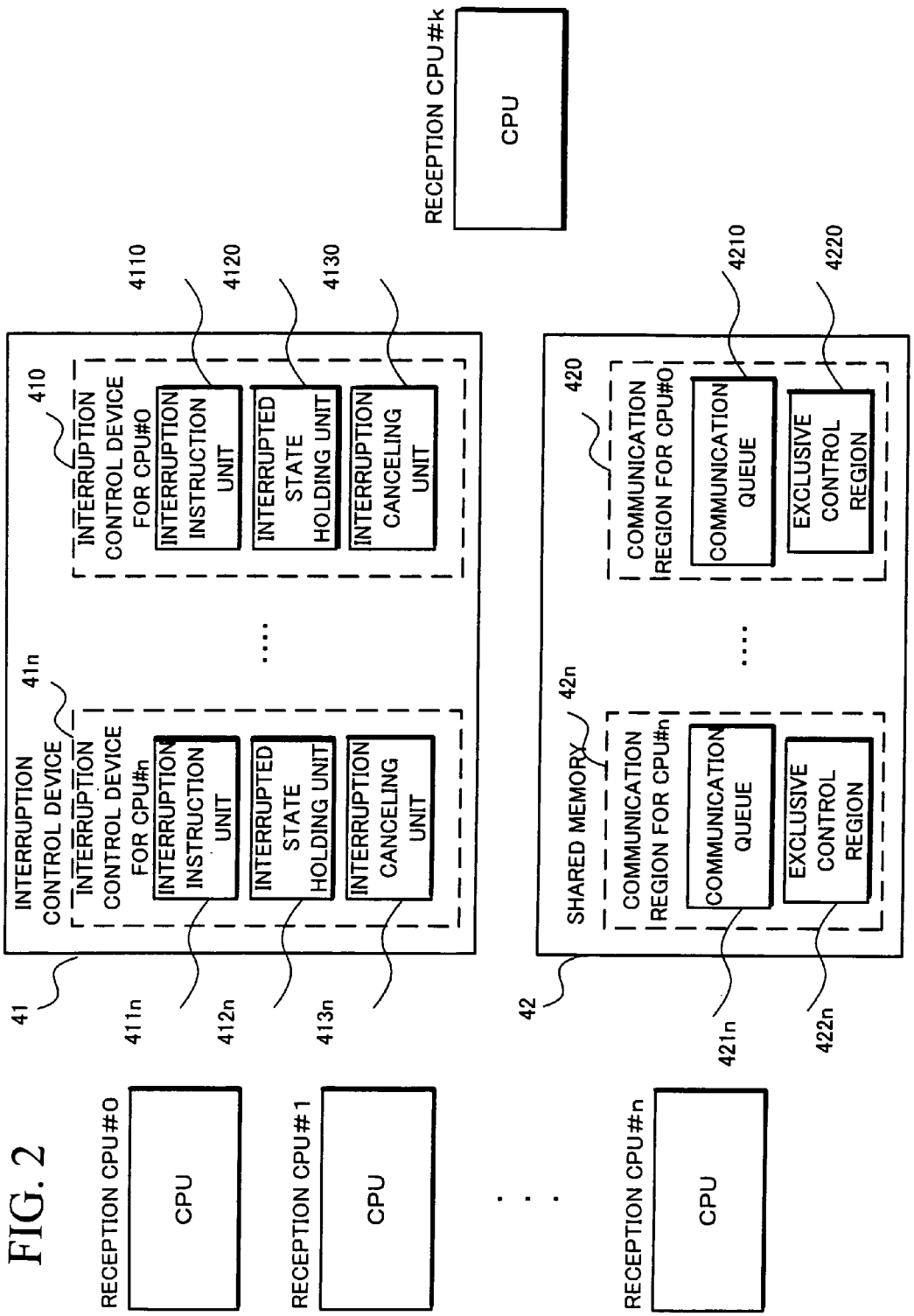
FIG. 2 is a diagram showing a structure of an inter-processor communication unit of the first example.

FIG. 2 is a diagram showing one example of a hardware structure of the inter-processor communication unit in the first example. With reference to FIG. 2, one set of an interruption control device 41 and a shared memory 42 disposed between CPUs (a CPU executing the basic processing and a CPU executing the additional processing) on the opposite sides form the whole of the inter-processor communication units 401 and 402 in FIG. 1. The interruption control device 41 comprises a number n of interruption control devices 410~41n for a CPU#0, a CPU#1, ... a CPU#n, each of which interruption control devices comprises an interruption instruction unit 411, an interrupted state holding unit 412 and an interruption canceling unit 413. The shared memory 42 comprises the number n of communication regions 420~42n for the CPU#0, the CPU#1, ... the CPU#n, each of which communication regions comprises a communication queue 421 for queuing or buffering transmission information (data, message) and an exclusive control region 422 for executing mutual exclusive control.

Assuming two regions, for example, the CPU#0 and the CPU#1, the interruption control device 411 for the CPU#1 and the communication region 421 for the CPU#1 form the inter-processor communication unit 401 from the CPU#0 to the CPU#1 and the interruption control device 410 for the CPU#0 and the communication region 420 for the CPU#0 form the inter-processor communication unit 402 from the CPU#1 to the CPU#0.

The interruption control device 41 and the shared memory 42 are assumed to be connected to the CPU#0, the CPU#1, ... the CPU #n through a bus. In the communication queue 421 of the shared memory 42, not transmission data itself but a buffer pointer (e.g. a buffer region address of the memory 50) which stores transmission data may be set.

In the first example, an exclusive control region 422i of a CPU#i in the shared memory 42 is provided to execute mutual exclusive control to prevent, when a communication region 42i of the CPU#i is already occupied by a certain CPU, other CPU from using the communication region 42i of the CPU#i. More specifically, the exclusive control region 422i of the CPU#i is used for storing synchronous management information such as semaphore including mutex or a flag.

A mutual exclusive control mechanism mounted on the shared memory 42 guarantees data consistency between a transmission CPU and a reception CPU.

In addition, due to the mutual exclusive control mechanism, the transmission side CPU is not allowed to accept an interruption request to the transmission CPU when the exclusive control region 422 is locked, thereby preventing unfair interruption generation such as frequent data transmission from the transmission CPU to the reception CPU.

The exclusive control region 422 may be used for lock management of enqueuing and dequeuing.

In FIG. 2, when it is structured to allow multiple interruption to one reception CPU through the interruption control device 41, the communication queue 421 and the exclusive control region 422 in a communication region of each CPU will be provided in multiple in the shared memory 422.

Although not limited in particular, as to the shared memory 42, a predetermined memory region of the memory 50 in FIG. 1 may be used as a shared memory or it may be provided in the inter-processor communication unit 40 separately from the memory 50. In addition, although not shown in the figure, interrupt request lines from the interruption control devices 410~41n may be connected in parallel to the reception CPU (the number of interruptions is increased) or connected in a daisy chain manner.

Upon receiving an interruption request from the interruption control device 41, the reception CPU notifies the interruption control device 41 of the request, the interruption control device 41 transfers an interruption device number (interruption vector information) to a data line not shown and the reception CPU generates an interruption vector from the interruption device number, so that an interruption service routine to be executed on the reception CPU is started through a scheduler, which interruption service routine executes a series of control of obtaining data from a communication queue of the corresponding shared memory 42 and releasing (unlocking) semaphore such as mutex in the exclusive control region to return from interruption.

Figure 3:
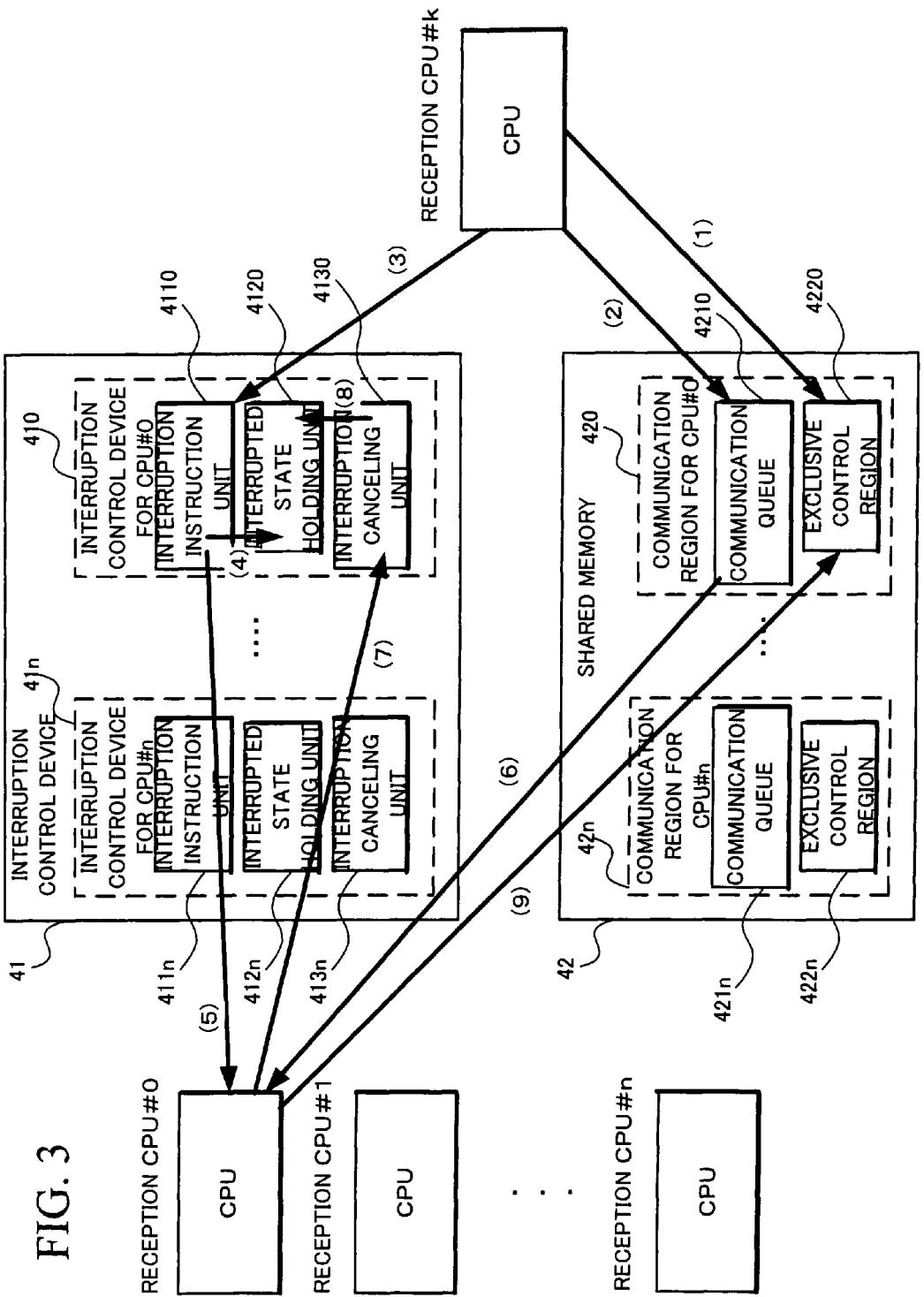
FIG. 3 is a diagram for use in explaining operation of the inter-processor communication unit of the first example.

FIG. 3 is a diagram for use in explaining an operation procedure of the inter-processor communication unit of the first example shown in FIG. 2, which illustrates a procedure in a case of transferring data from a CPU#k to the CPU#0. In FIG. 3, numerals beside arrows represent step numbers.

Step 1: The transmission CPU#k locks the exclusive control region of the communication region for the CPU#0 in the shared memory 42. When it is indicated that the exclusive control region of the communication region for the CPU#0 in the shared memory 42 is locked by other CPU, wait for the lock to be released, for example.

Step 2: After locking the exclusive control region of the communication region for the CPU#0 in the shared memory 42, the transmission CPU#k writes data to be transmitted to the reception CPU#0 into a communication queue of the CPU#0 communication region in the shared memory 42.

Step 3: The transmission CPU#k notifies an interruption request to the interruption instruction unit of the CPU#0 interruption control device in the interruption control device 41.

Step 4: The interruption instruction unit of the CPU#0 interruption control device updates the interrupted state holding unit of the CPU#0 interruption control device to set "interruption request exists".

Step 5: The interruption instruction unit of the CPU#0 interruption control device causes an interruption to the reception CPU#0.

Step 6: The reception CPU#0 receives an interruption from the interruption instruction unit of the CPU#0 interruption control device to take out data from the communication queue of the communication region for the CPU#0 in the shared memory 42. At this time, in the reception CPU#0, processing by the above-described interruption service routine is executed.

Step 7: After obtaining the data from the communication queue of the communication region for the CPU#0 in the shared memory 42, the reception CPU#0 notifies the interruption canceling unit for the CPU#0 of completion of the interruption processing.

Step 8: The interruption instruction unit of the CPU#0 interruption control device having received the taking-in processing completion notification from the reception CPU#0 updates the interrupted state holding unit of the CPU#0 interruption control device.

Step 9: The reception CPU#0 unlocks the exclusive control region of the communication region for the CPU#0 in the shared memory 42.

In the first example, when confirming concentration of interruption requests on a specific reception CPU, flow control such as control of an interruption request to the reception CPU or band control may be executed. In other words, a QoS (Quality of Service) guaranteeing function may be provided in the interruption control device 41 for restricting transfer of interruption requests sequentially/frequently from the transmission CPU side to the reception CPU side. For example, an interruption request involving no transfer of data to the reception CPU can not be considered as a target of exclusive control but can be successively issued in the plural. Then, it is possible, in a case where when interruption processing is yet to be completed on the reception CPU side, an interruption request from the transmission CPU side is generated to make "interruption request exits" of the interrupted state holding unit in the interruption control device 41 exceeds a fixed value, to execute control to make a following interruption request from the transmission CPU side be not allowed. This structure enables such an attack to be prevented as degradation in performance of the reception CPU caused by generation of a large amount of interruption requests involving no transfer to data to the reception CPU by the transmission CPU.

Figure 4:
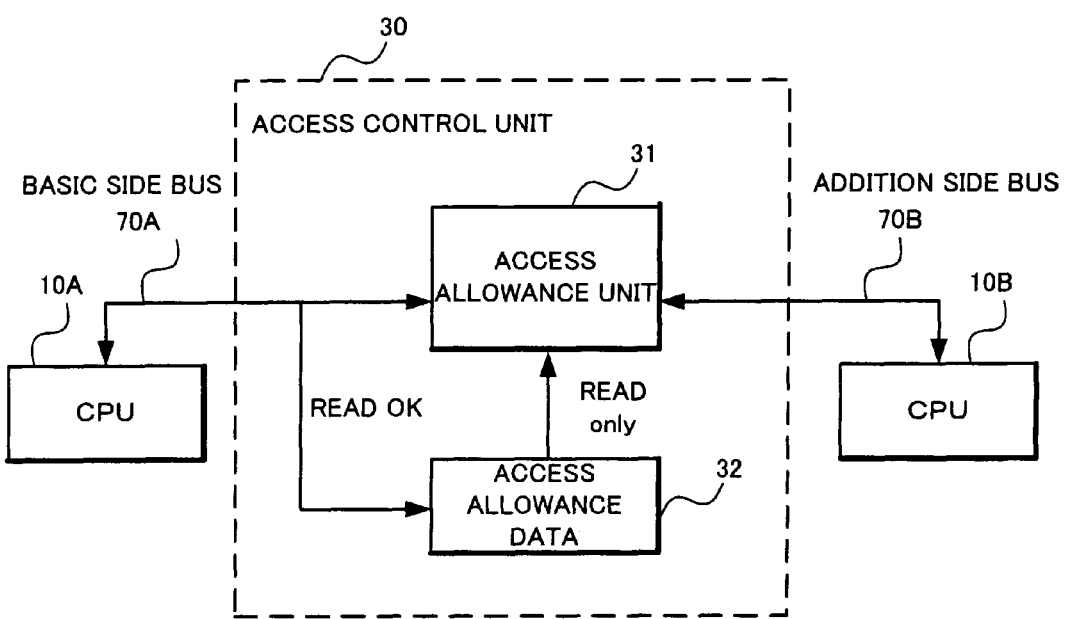
FIG. 4 is a diagram showing a structure of an access control unit of the first example.

FIG. 4 is a diagram showing a structure of the access control unit 30 in the first example shown in FIG. 1. With reference to FIG. 4, the access control unit 30 comprises an access allowance unit 31 connected to the CPU 10A executing the basic processing (22 in FIG. 1) through a basic side bus 70A and connected to the CPU 10B executing the additional processing (23 in FIG. 1) through an addition side bus 70B, and a storage unit which stores access allowance data 32.

The access allowance data 32 is allowed read/write by the CPU 10A. From the access allowance unit 31, only read is allowed. Then, the access allowance data 32 is allowed neither read nor write by the CPU 10B. In other words, there exists no data bus between the access allowance data 32 and the CPU 10B.

The access allowance unit 31 determines a kind of access (read/write) based on an access address signal and a control signal (access command) to the memory 50 (see FIG. 1) which are transferred to an address signal line and a control signal line of the addition side bus 70B and refers to information of the access allowance data 32 to determine whether the access in question is adequate or not. As a result of the determination, when the access is determined to be unfair, the access allowance unit 31 refrains from sending the access address and the control signal (access command) to the basic side bus 70A, thereby preventing an access from the CPU 10B side to the basic side bus 70A. In this case, the CPU 10B side having sent out the access address to the addition side bus 70B knows that the access in question fails by a bus error or no-replay to the read/write address from the memory 50 or the like.

The access allowance unit 31, when the input/output device (I/O) 60 is a memory mapped I/O, monitors the addition side bus 70B and detects the access address being an address corresponding to the input/output device and when detecting an I/O command (read/write or the like) on the data bus, determines whether the access in question is appropriate or not with reference to the information of the access allowance data 32. When the input/output device is not a memory mapped I/O, the unit decodes a device number of the input/output device and an I/O command which are to be transferred to the addition side bus 70B and refers to the information of the access allowance data 32 to determine whether the access is allowed or not.

In the first example, the access control unit 30 may comprise a band restriction unit for executing control of a data transfer amount per unit time. As one example, the access control unit 30 may comprise a unit for measuring and monitoring a volume of data transferred from the CPU 10B to the addition side bus 70B while the CPU 10B is in access operation, thereby executing control of stopping data transfer from the CPU 10B to the CPU 10A when, for example, data whose number of bytes exceeds a threshold value set in advance per unit time is transferred. At that time, even when the CPU 10B knows that the data transfer to the CPU 10A fails and retries, the access control unit 30 refrains from transferring data from the CPU 10B to the CPU 10A. The access control unit 30 may be alternatively structured to comprise a buffer to accumulate data transferred from the CPU 10B to the addition side bus 70B in the buffer and control a flow of data to be transferred to the CPU 10A.

Figures 5, 6:
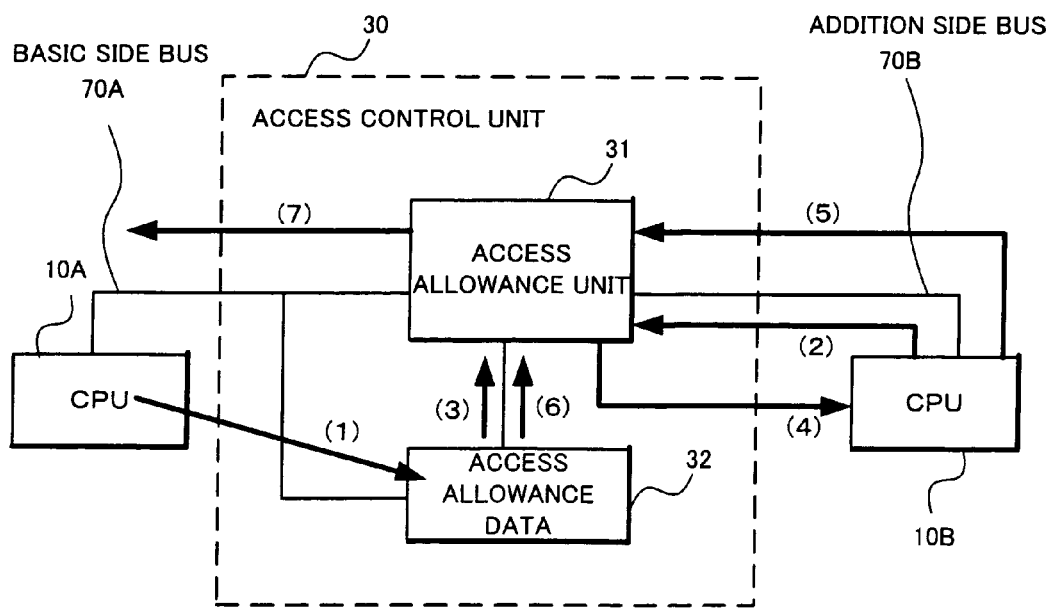
FIG. 5 is a diagram showing an example of access allowance data of the access control unit of the first example.
FIG. 6 is a diagram for use in explaining operation of the access control unit of the first example.

FIG. 5 is a diagram showing one example of the access allowance data 32 in the first example. With reference to FIG. 5, the access allowance data is stored in a table format, which includes a CPU which executes additional processing (a CPU connected to the addition side bus in FIG. 4), an allowed range address formed of a starting point address and an ending point address of a range in which access is allowed, and an allowed kind of access (a kind of read, read/write, and write). The allowed range addresses may overlap with each other in different CPUs. In the example shown in FIG. 5, allowed range addresses of CPUs #2 and #3 in the second row are from 0xC000000 to 0xF00000 and readable/writable (R/W) and allowed range addresses of the CPU #3 in the third row are from 0xE000000 to 0xF000000 which overlap with that of the second row. The larger the number of address allowance data, accordingly, the number of entries in the table becomes, the finer access control can be made. Although FIG. 5 illustrates R (readable), W (writable) and R/W (readable/writable) as an example for the sake of explanation, R (Readable) indicates information allowing only read and not allowing write, so that when W is set to be writable (also readable), R/W will be unnecessary. In addition, an address range from which read is not allowed (write is not allowed either) is not stored in the address allowance data 32. While in the example shown in FIG. 5, access allowance data has an address range and a kind of access with respect to each CPU whose access is allowed, the access allowance data may be further provided with information indicative of non-allowance of information as a kind of access to store an address range whose access is not allowed with respect to a CPU which executes additional processing.

The access allowance unit 31 in FIG. 4 receives an access request (address, read command) from the addition side CPU and refers to the allowed range address and a kind of access of the access allowance data 32, and in a case of an allowed access, allows the access. On the other hand, when it is not allowed, the unit makes the access be not allowed. In the example shown in FIG. 5, in a case of a CPU#4, it is set to be from the starting point address 1000 to the ending point address 2000 (hexadecimal) and a kind of access is set to be read (R). In a case of CPU#2 or #3, it is set to be from the starting point address 0xC000000 to the ending point address 0xF000000 (hexadecimal) and a kind of access is set to be read and write (R/W). In a case of the CPU#3, a kind of access of a range from the starting point address 0xE000000 and the ending point address 0xF000000 (hexadecimal) is set to be write (W).

FIG. 6 is a diagram for use in explaining one example of operation of the access control unit 30 in FIG. 4. In FIG. 6, numerals beside arrows indicate step numbers.

Step 1: The CPU 10A executing the basic processing causes the access allowance data 32 of the access control unit 30 to inhibit the CPU 10B executing all the additional processing from reading a certain address range.

Step 2: Assume that by the execution of the additional processing 23 or the like, the CPU 10B issues a request for read of the address range from which read is inhibited.

Step 3: The access allowance unit 31 reads the access allowance data 32 to check whether the relevant access is appropriate.

Step 4: The access allowance unit 31 returns an error to the CPU 10B. This is because read of the relevant address range by the CPU 10B is inhibited.

Step 5: The CPU 10B issues a request for read of other range than the above-described address range.

Step 6: The access allowance unit 31 reads and checks the access allowance data 32.

Step 7: The access allowance unit 31 allows the read access request from the CPU 10B and issues a read request to the basic side bus 70A.

Although in the first example, the description has been made of a case where the access control unit 30 comprises the access allowance unit 31 and the access allowance data 32 to execute access control based on access allowance information, the structure is not limited to that shown in the first example, and access refusal data in place of access allowance data (inversion) and an access refusal unit may be provided. In this case, when an access address from the CPU 10B executing the additional processing coincides with an address range in which access refusal is defined in access refusal data, the access refusal unit executes control for refusing an access.

As a modification example of the first example, the access allowance unit 31 may comprise a cache. In this case, an access address and access allowance data used in access determination are stored in the cache to determine, in access control determination to follow, whether there exists access allowance data of a relevant access address (address range) in the cache and in a case of cache-hit, realize speed-up of access determination. The cache is structured to comprise a tag address corresponding to a range of access addresses and access allowance data and comprise a cache-hit determination circuit for determining whether an access address of the addition side bus 70B hits the cache or not.

Figure 7:
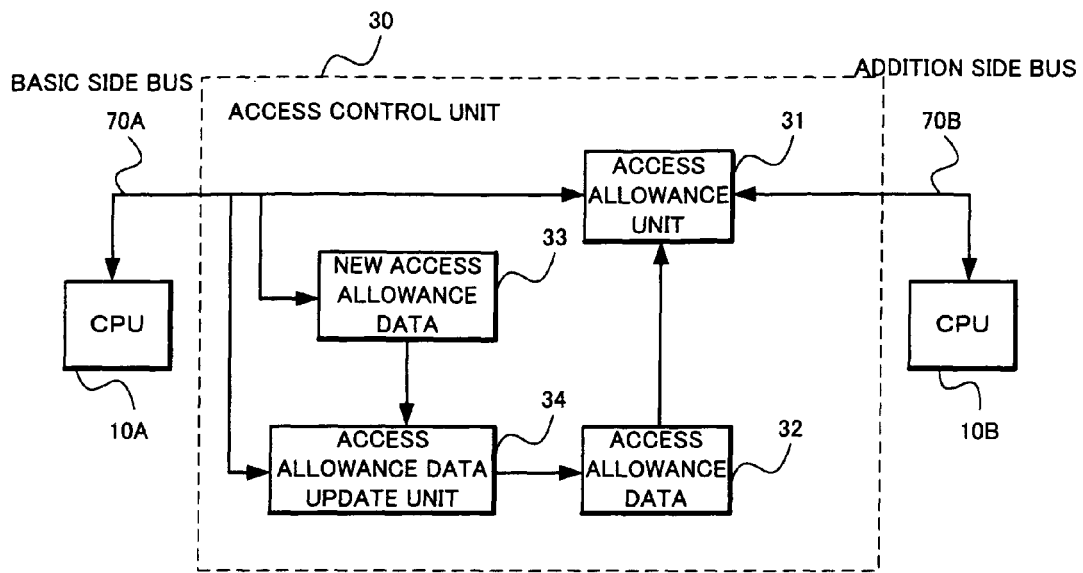
FIG. 7 is a diagram showing another structure of an access control unit 30 of the first example.

Furthermore, as a modification example of the first example, the access control unit 30 may comprise a new access allowance data 33 and an access allowance data update unit 34. With reference to FIG. 7, the access control unit 30 comprises, in addition to those of the first example shown in FIG. 6, the access allowance data update unit 34 connected to the basic side bus 70A and a storage unit storing the new access allowance data 33. Functions of these two units will be described in detail.

The new access allowance data 33 is a storage unit which allows read only from the access allowance data update unit 34 in addition to having the same feature as that of the access allowance data 32 shown in FIG. 6.

The access allowance data update unit 34 atomically overwrites the new access allowance data 34 by the contents of the new access allowance data 33 in response to a request from the CPU 10A through the basic side bus 70A.

In the modification example of the first example, a unit may be provided which executes not update of the access allowance data 32 but switching to the new access allowance data 33.

Such a structure as described above enables update of the access allowance data 32 to be atomically rewritten by a CPU, thereby enabling dynamical change of a region to be protected and a region to be restricted by the access control unit 30.

Figure 8:
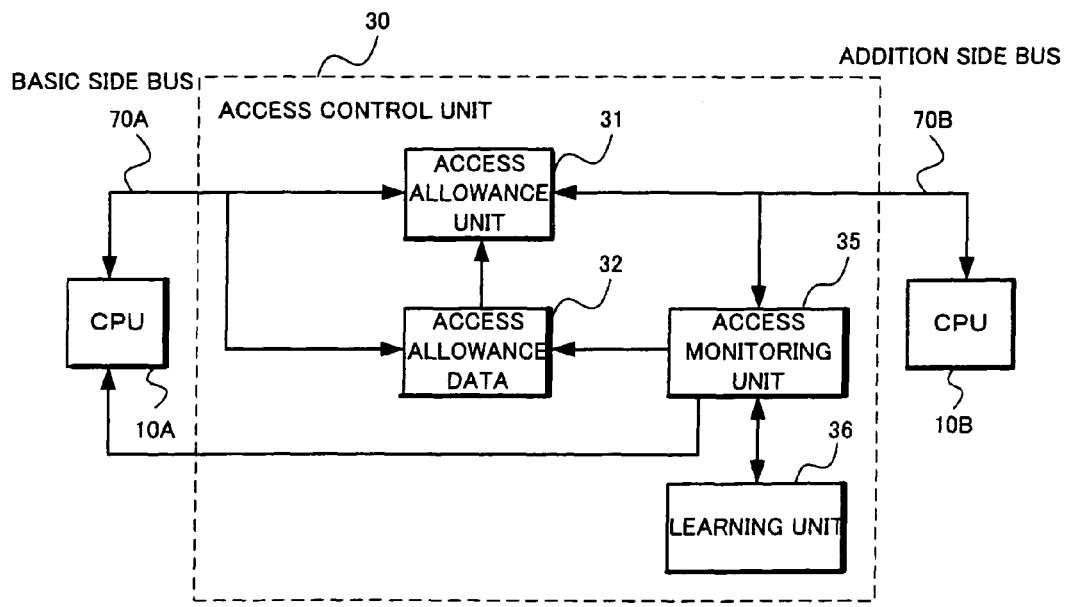
FIG. 8 is a diagram showing a further structure of the access control unit 30 of the first example.

FIG. 8 is a diagram showing another structure of the access control unit 30 of the first example. With reference to FIG. 8, the access control unit 30 comprises an access monitoring unit 35 and a learning unit 36 connected to the addition side bus 70B in addition to those of the first example shown in FIG. 6. Functions of these units will be detailed.

The access monitoring unit 35 obtains access information from the CPU 10B through the addition side bus 70B similarly to the access allowance unit 31.

Based on access information provided from the access monitoring unit 35, the learning unit 36 determines whether the reference is adequate or not. In a case, for example, where when the number of references to user protection data counted in advance exceeds a threshold value designated in advance, recognize the case as an abnormal condition and notify the access monitoring unit 35 of the condition to dynamically change the access allowance data 32 according to rules set separately. Depending on a case, notify the CPU 10A connected to the basic side bus 70A to start processing to be executed in an abnormal condition.

Such structure as described above enables autonomous limitation by accumulating operation of a CPU whose reliability is considered to be low as history information from among patterns referred in practice, thereby enabling safer execution control based on an operation situation of a CPU in real operation.

Also as a structure example, the access control unit 30 may comprise, in addition to the components shown in FIG. 6, all of the above-described new access allowance data 33, access allowance data update unit 34, access monitoring unit 35 and learning unit 36.

Figure 9:
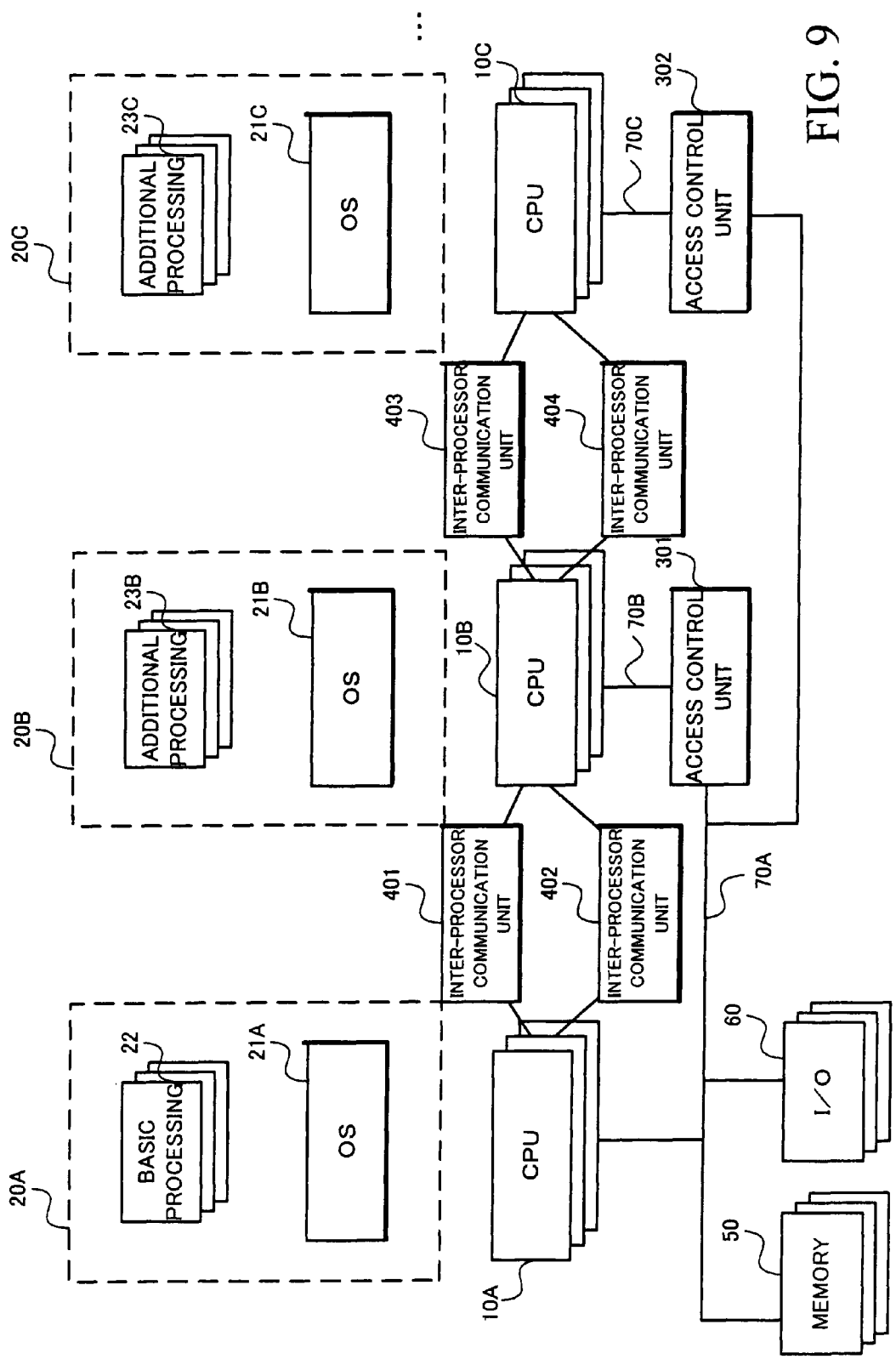
FIG. 9 is a diagram showing a hardware structure of an information processing device of a second example of the present invention.

FIG. 9 is a diagram showing a structure of a second example as a basic structure. With reference to FIG. 9, the second example has one set of software, an OS and a CPU on the additional processing side further added to the structure of FIG. 1. More specifically, a CPU 10C on a second additional processing side communicates with the CPU 10B for the first additional processing through the inter-processor communication unit. The CPU 10C on the second additional processing side is connected to the basic side bus 70A through a second access control unit 302.

Setting of the access control units 301 and 302 is executed by the CPU 10A executing the basic processing 22. In other words, the CPU 10A executing the basic processing 22 functions as a master processor. The CPU 10A executes concentric management of the memory 50 and the input/output device (I/O) 60.

The CPU 10C executing a second additional processing 23C communicates (transmission of data and command) with the CPU 10B executing a first additional processing 23B through an inter-processor communication unit 403, and the CPU 10B executing the first additional processing 23B communicates (transmission of data and command) with the CPU 10A executing the basic processing 22 through an inter-processor communication unit 401. In addition, the CPU 10C executing the second additional processing 23C executes only an access allowed to the memory 50 and the input/output device (I/O) 60 under the monitoring of the second access control unit 302, the CPU 10B executing the first additional processing 23B executes only an access allowed to the memory 50 and the input/output device (I/O) 60 under the monitoring of the first access control unit 301, and setting of access allowance data of the first access control unit 301 and the second access control unit 302 is all executed by the CPU 10A. With such structure, concentric management is executed to transfer processing between CPUs by an inter-processor communication unit 40. Also in the second example, a direct attack and the like to the CPU 10A executing the basic processing 22 from the additional processings 23B and 23C can be prevented. More specifically, similarly to the above-described first example, the additional processings 23B and 23C are not allowed to directly start the basic processing 22 or call up a sub-routine, and a request for starting the basic processing 22 is transmitted, for example, from the CPU 10C through the CPU 10B to the CPU 10A via the inter-processor communication unit and the CPU 10A having received the request in question, when it is a request from a CPU not authorized, fails to accept the request in question (details of which will be described in an exemplary embodiment of software which will be described later). Thus, in addition to the provision of authorization layers in the additional processing side CPU and the basic processing side CPU, processing through such hardware mechanisms as the inter-processor communication unit 40 and the access control unit 30 enables a direct attack to the basic processing and the like to be avoided. Since the inter-processor communication units 401~404 in the second example are assumed to have the same structure as that of first example shown in FIG. 2 and the access control units 301 and 302 are also assumed to have the same structure as that of first example shown in FIG. 4, description of detailed structures and operation thereof will be omitted.

Figure 10:
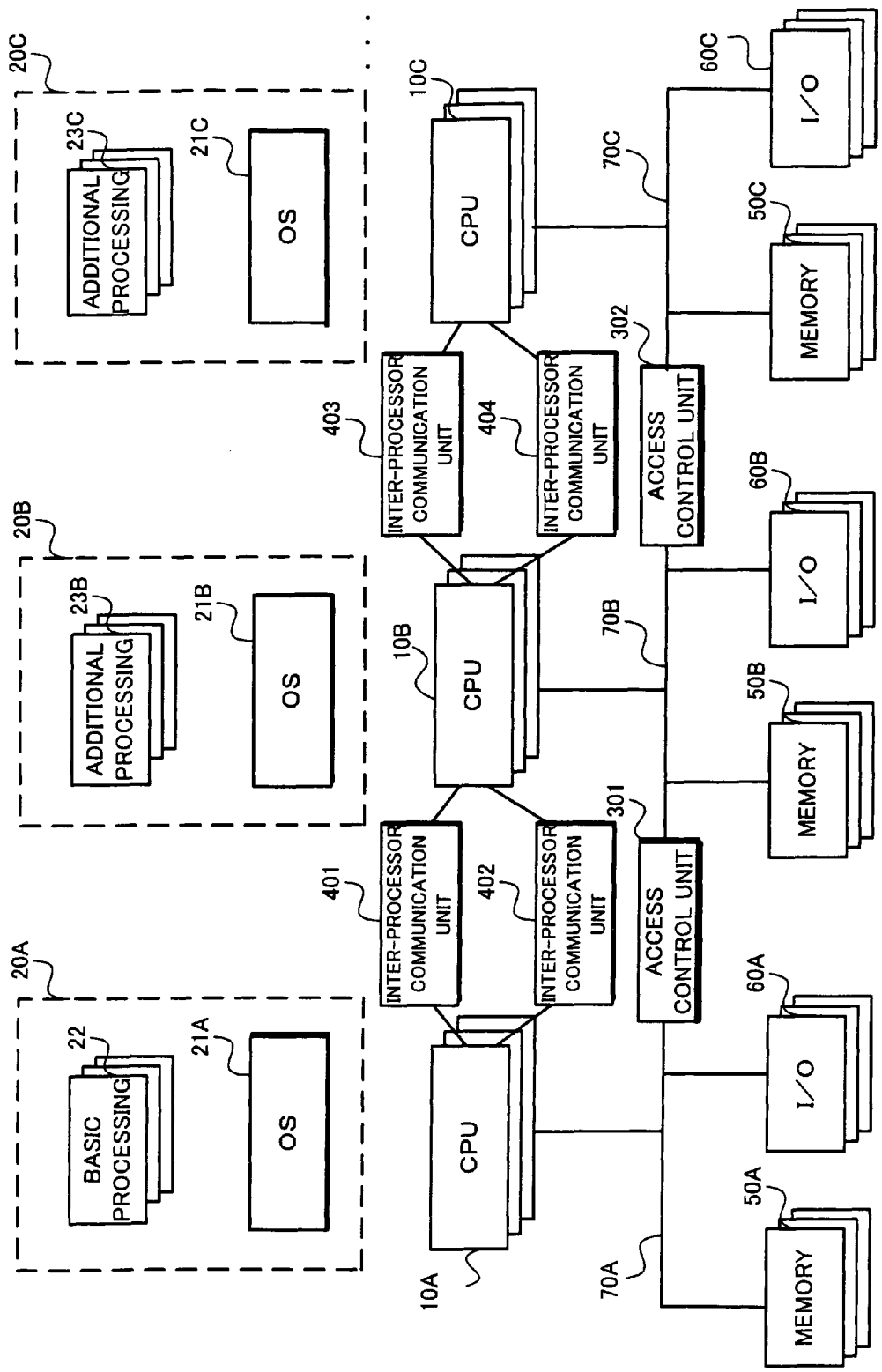
FIG. 10 is a diagram showing a hardware structure of an information processing device of a third example of the present invention.

FIG. 10 is a diagram showing a structure of a third example as a basic structure. With reference to FIG. 10, the third example, similarly to the structure shown in FIG. 9, is obtained by adding the additional processing side CPU 10C and the access control unit 302 to the structure shown in FIG. 1. The third example, unlike the above-described second example shown in FIG. 9, has memory and an input/output device (I/O) prepared for each CPU group of each set (domain).

The second additional processing CPU 10C is allowed to freely access allowed memory 50C and input/output device (I/O) 60C without access limitations. The first additional processing CPU 10B is allowed to access allowed memory 50B and input/output device (I/O) 60B without access limitations.

An access from the second additional processing side CPU 10C to basic processing side memory 50A and input/output device (I/O) 60A is controlled by double-staged structure of the second access control unit 302 and the first access control unit 301.

An access from the first additional processing side CPU 10B to the basic processing side memory 50A and input/output device (I/O) 60 has its access allowance determined by the first access control unit 301.

Access allowance data of the first access control unit 301 and access allowance data of the second access control unit 302 are set by the CPU 10A of the basic processing. The access allowance data of the second access control unit 302 may be set by the first additional processing CPU 10B. According to the third example, separating the memory and the input/output devices (I/O) on a domain basis and connecting CPUs in multiple stages by the inter-processor communication unit 40 enhances the function of protection from an attack by additional processing, thereby ensuring security.

Figure 11:
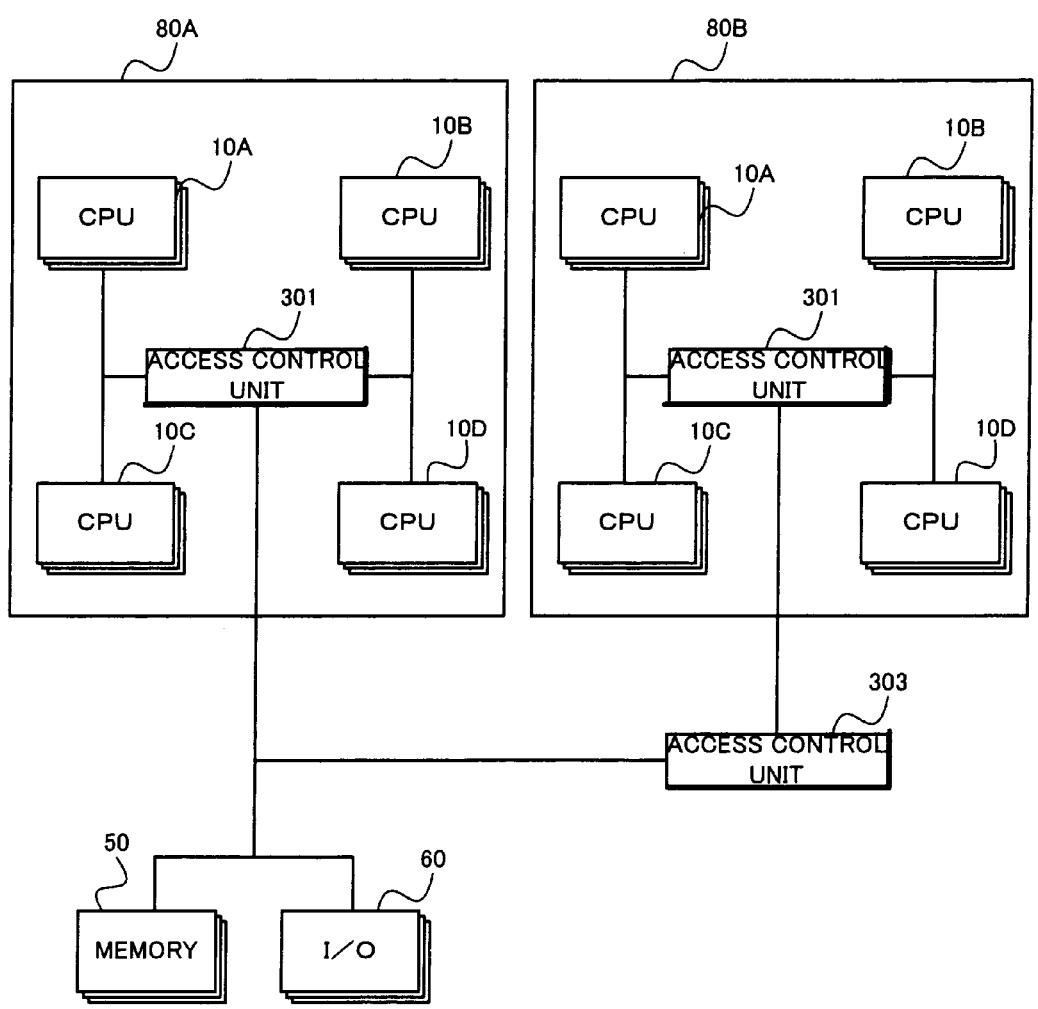
FIG. 11 is a diagram showing a hardware structure of a variation example of the information processing device of the third example.

FIG. 11 is a diagram showing a modification example of the third example, which is an example in which the first example shown in FIG. 1 is applied to two or more chips. With reference to FIG. 11, in addition to a plurality of chips 80 disposed each of which is formed of a combination of CPUs 10A, 10B, 10C and 10D and the access control unit 301, the individual chips 80 are coupled by an access control unit 303. In other words, a plurality of chips 80A and 80B are arranged to couple the chip 80A and the chip 80B or the like by the access control unit 303.

Providing a part of CPUs in a certain one chip 80 for use in executing the basic processing enables access limitation by the access control unit 301 in one chip 80, while it is possible to provide at least a part of CPUs in each chip 80 for use in executing the basic processing.

It is also possible to form a domain bridging over different chips 80 to control execution by the access control unit 303 between the respective chips 80.

In any case, appropriate setting of the access control unit 30 enables execution control in the basic structure of the information processing device to which the present invention is applied also between a plurality of chips 80.

In the above-described third example, the description has been made mainly of a hardware structure of the present invention, and a software structure of the present invention will be described in the following.

Figure 12:
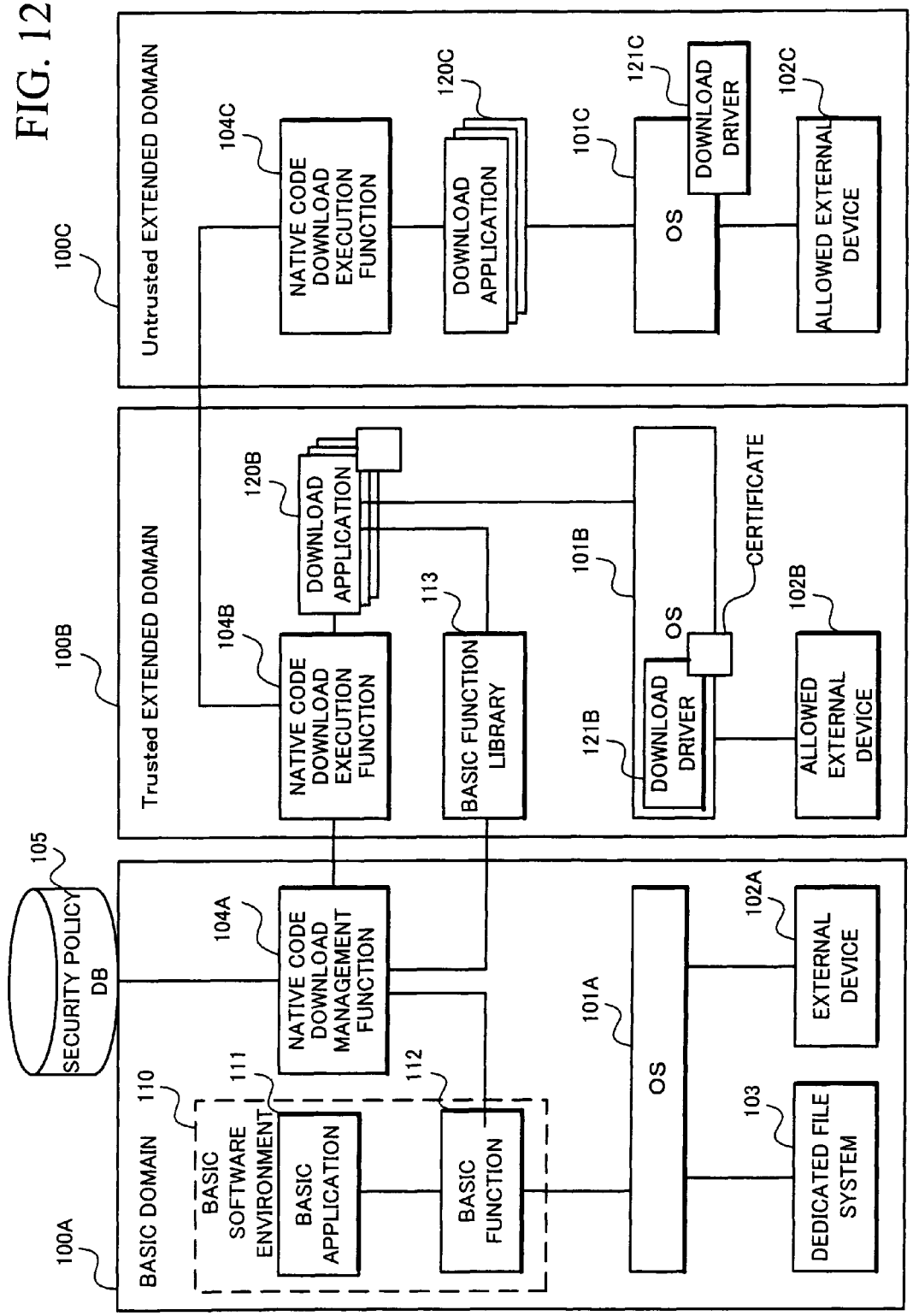
FIG. 12 is a diagram showing a software structure of the information processing device of the third example.

FIG. 12 is a diagram showing one example of a software structure implementing the present invention, which comprises a basic domain, a trusted extended domain and an untrusted extended domain. As a hardware structure shown in FIG. 12, the structure in FIG. 10 comprising three groups of CPUs or the like can be used. In this case, the basic domain as an execution environment for executing the basic processing can be made correspond to the software 20 and the OS 21A in FIG. 10, the trusted extended domain to the software 20B and the OS 21B in FIG. 10 and the untrusted extended domain to a software 20C and an OS 21C in FIG. 10.

With reference to FIG. 12, a basic domain 100A comprises a basic software 110 including a basic application program (referred to as "basic application") 111 and a basic performance 112, an OS 101A, a dedicated file system 103 and an external device 102A, and a native code download management function 104A and a security policy data base 105. Although not limited in particular, the basic function 112, when the information processing device of the third example is a portable type information communication terminal, realizes basic performances of a portable type information communication terminal including call processing such as calling and incoming call processing, Internet access and screen processing, which corresponds to the basic processing 22 of FIG. 1. The basic application 111 calls up the basic function 112 to execute processing and the basic function 112 executes an access to the file system or the external device through the OS. The external device includes a communication interface such as a wireless communication interface, an interface of a display device, an input interface such as a key or a pointing device, an SD (Secure Digital) memory card interface, a sound interface and the like.

A trusted extended domain 100B comprises a native code download execution function 104B, a download application program (referred to as "download application") 120B, a basic performance library (wrapper) 113, an OS 101B and an allowed external device 102B.

The OS 101B includes a download driver 121B with a certificate. The download driver 121B with a certificate executes input/output control of the allowed external device 102B.

An untrusted extended domain 100C comprises a native code download execution function 104C, a download application 120C, an OS 101C and an allowed external device 102C. A download driver 121C incorporated into the OS 101C executes input/output control of the allowed external device 102C.

As to a file input from the external device 102A of the basic domain 100A and downloaded, the native code download management function 104A refers to the contents of the security policy data base 105 to transfer an application of a trusted (with a trusted electronic certificate) native code to the trusted extended domain 100B and incorporate the download driver 121B of the trusted (with a trusted electronic certificate) native code into the OS 101B.

The native code download management function 104A transfers an untrusted (e.g. without an electronic certificate or a certificate whose contents are not proper, etc.) application to the untrusted extended domain 100C through the trusted extended domain 100B to incorporate an untrusted (without a certificate) download driver into the OS 101C of the untrusted extended domain.

While call of the basis function 112 from the trusted extended domain 100B is allowed, call of the basis function 112 from the untrusted extended domain 100C is not allowed. The untrusted extended domain 100C and the trusted extended domain 100B can work in cooperation.

Only when user's confirmation is made (OK) as to data from the untrusted domain, an application program operating in the trusted domain transfers the data to the basic function 112. Without user's confirmation, data from the untrusted domain will not be transferred to the basic function 112. From the trusted extended domain 100B directly to the basic function 112 of the basic domain 100A, no processing request can be issued.

Figure 13:
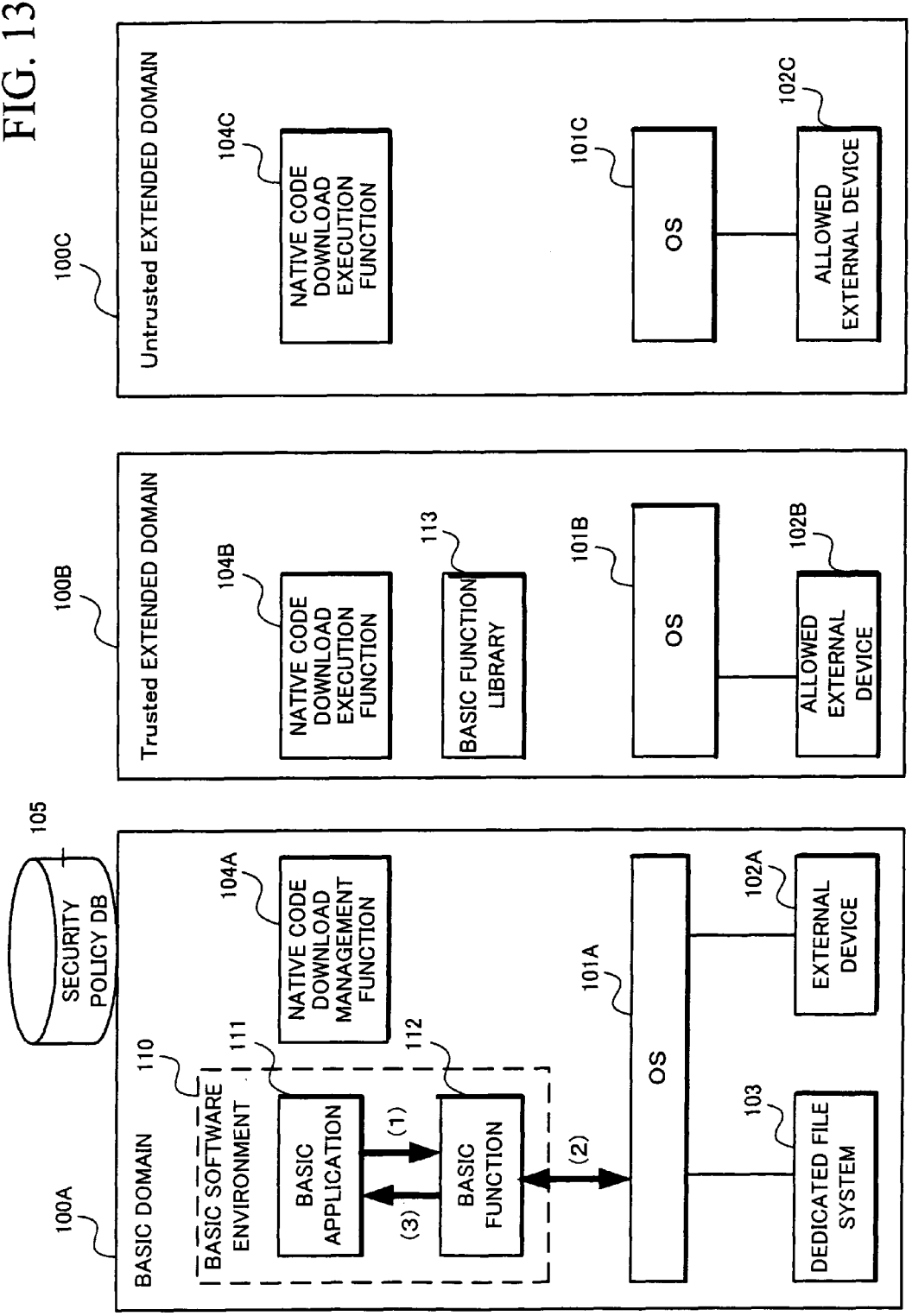
FIG. 13 is a diagram for use in explaining operation of the third example.

FIG. 13 is a diagram for use in explaining operation of the third example shown in FIG. 12, which shows execution of the basic application. In FIG. 13, a numeral attached to each arrow represents a step number at which information is transferred on the line in question.

Step 1: The basic application 111 of the basic domain 100A issues a processing request (e.g. addition of an address book) to the basic function 112.

Step 2: The basic function 112 processes the request in question by using the OS 101A.

Step 3: The basic function 112 notifies the basic application 111 whether the request is allowed or not.

Figure 14:
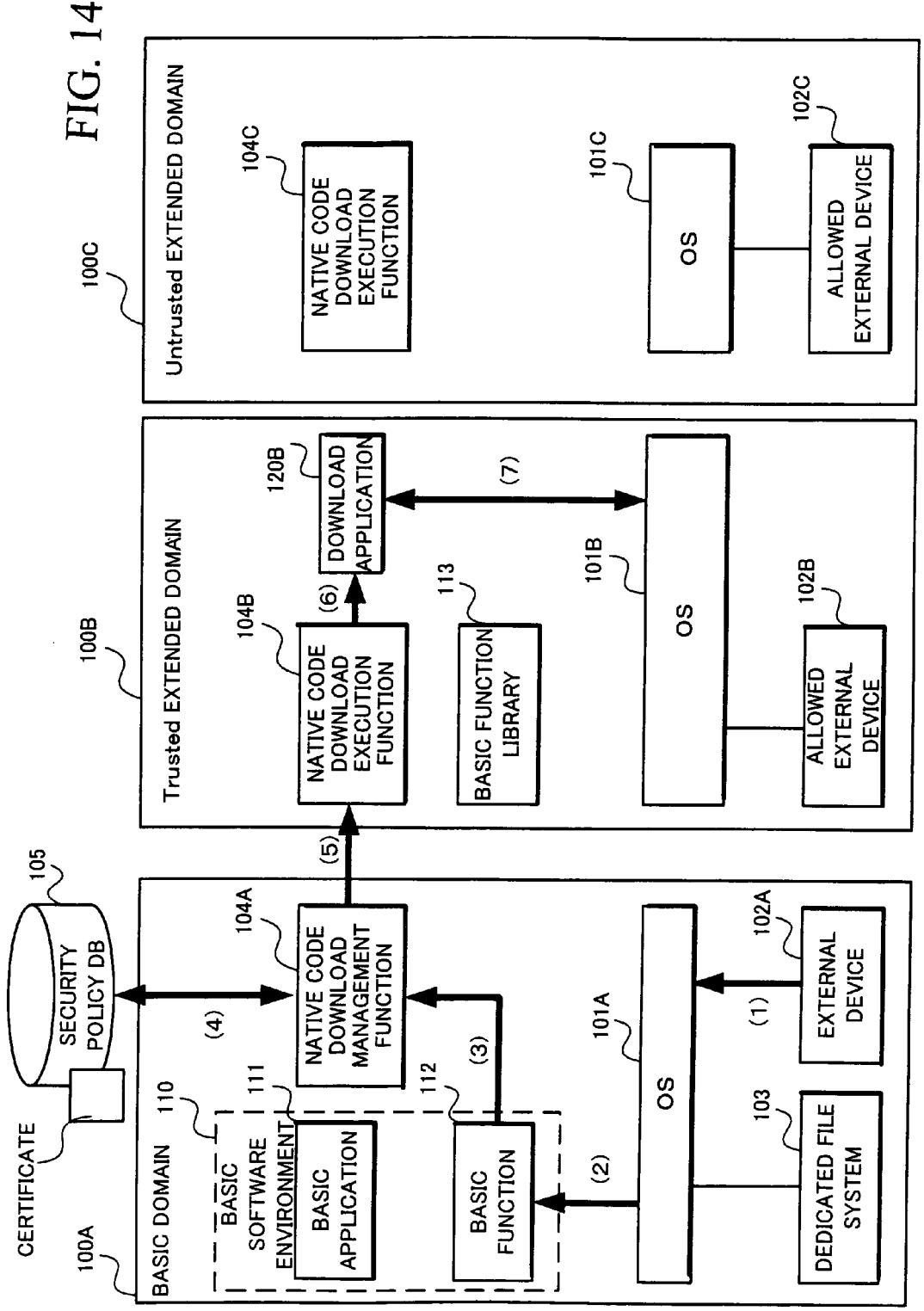
FIG. 14 is a diagram for use in explaining operation of the third example.

FIG. 14 is a diagram for use in explaining operation of the third example illustrated in FIG. 12, which shows a state of execution of download of a trusted application. In FIG. 14, a numeral attached to each arrow represents a step number at which information is transferred on the line.

Step 1: From the external device 102A (network or SD memory card or the like) on the basic domain 100A to the OS 101A, download data arrives.

Step 2: At the basic function 112, the download data is recognized as an additional application (download application) from such information as attribute information.

Step 3: The basic function 112 transfers the additional application to the native code download management function 104A, and the native code download management function 104A refers to the security policy data base 105 to check an electronic certificate attached to the additional application. As described above, with a public key and digital signing (encipherment of an organization to be certified or a public key by a secret key) stored in the electronic certificate, for example, when the native code download management function 104A authenticates the certificate, it deciphers a part of the digital signing by a public key to check whether the decipherment coincides with the contents of data of the certificate and when they coincide, determine that the data of the certificate can be trusted. Further attaching digital signing formed of digest of the application enables examination whether the downloaded application is altered.

Step 4: The native code download management function 104A preserves download information together with the electronic certificate in the security policy data base 105.

Step 5: When the electronic certificate is proper as a result of check, the native code download management function 104A of the basic domain 100A transmits the download application to the native code download execution function 104B of the trusted extended domain 100B to request execution. Data transmission from the native code download management function 104A of the basic domain 100A to the native code download execution function 104B of the trusted extended domain 100B is executed by using the inter-processor communication unit 40 in FIG. 9 or FIG. 10.

Step 6: The native code download execution function 104B of the trusted extended domain 100B executes control to execute the received download application.

Step 7: The download application is executed on the trusted extended domain.

Figure 15:
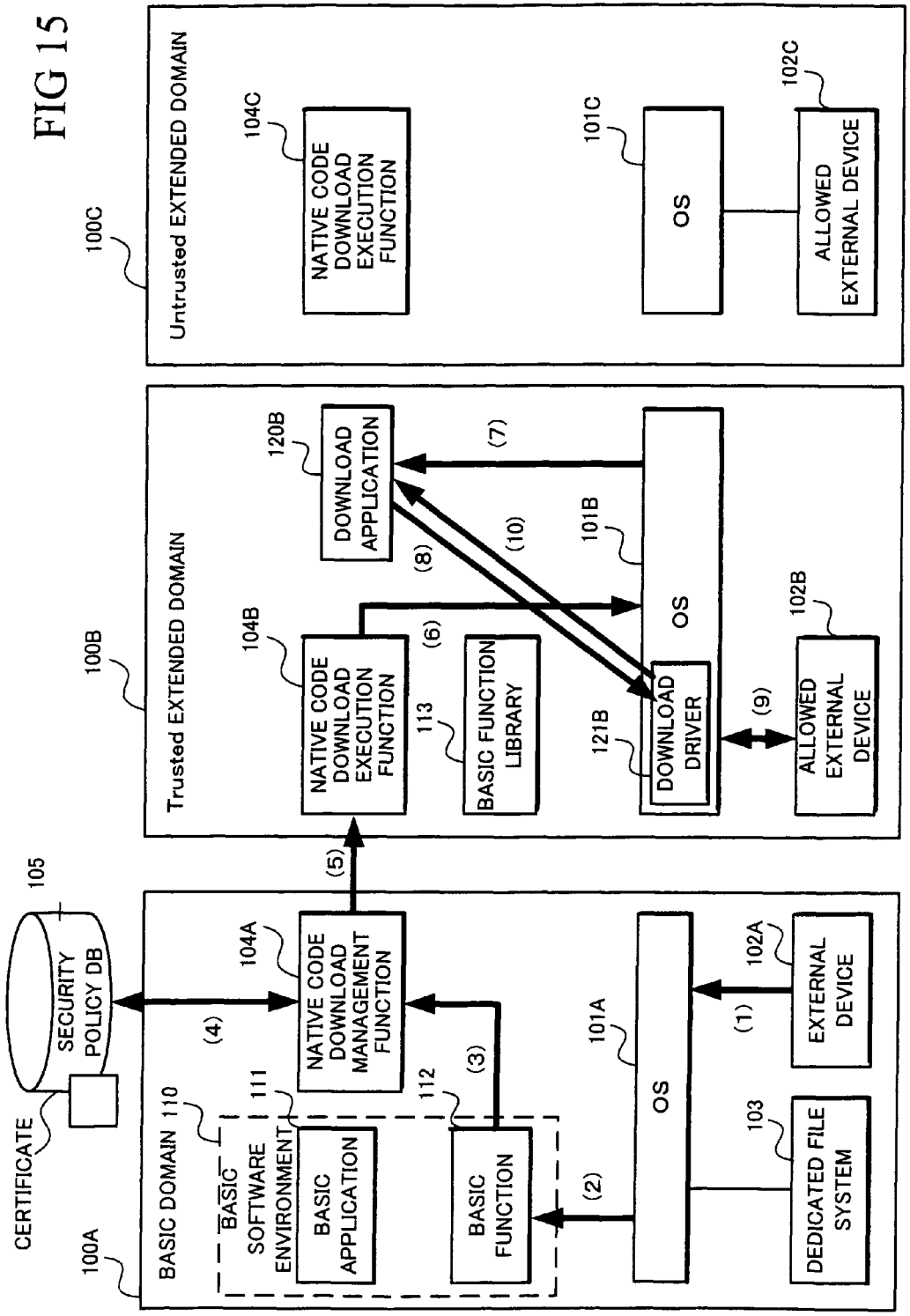
FIG. 15 is a diagram for use in explaining operation of the third example.

FIG. 15 is a diagram for use in explaining operation of the third example shown in FIG. 12, which is a diagram showing download execution of a trusted driver. Trusted driver, for example, represents a driver downloaded whose electronic certificate attached thereto has a proper collation result. In FIG. 15, a numeral attached to each arrow represents a step number at which information is transferred on the relevant line.

Step 1: From the external device 102A (network or SD card or the like) on the basic domain 100A to the OS 101A, download data arrives.

Step 2: At the basic function 112, the download data is recognized as an additional device driver (download driver) from attribute information, automatic install information and the like.

Step 3: The basic function 112 transfers the received driver to the native code download management function 104A. The native code download management function 104A refers to the security policy data base 105 to check an electronic certificate attached to the download data.

Step 4: The native code download management function 104A preserves download information together with the electronic certificate in the security policy data base 105.

Step 5: The native code download management function 104A transmits the download driver to the native code download execution function 104B of the trusted extended domain to request execution of installation. Data transmission from the native code download management function 104A of the basic domain 100A to the native code download execution function 104B of the trusted extended domain 100B is executed by using the inter-processor communication unit 40 in FIG. 9 or FIG. 10.

Step 6: The native code download execution function 104B of the trusted extended domain automatically installs the received download driver. Although not limited in particular, a download driver in the third example may be a resident type driver which, after its installation, is incorporated into a certain region of the OS 101B by re-starting a CPU.

Step 7: The OS 101B of the trusted extended domain notifies to an already executed application or displays that the download driver is installed.

Step 8: In the trusted extended domain, the already executed application 102B refers to the installed download driver 121B.

Step 9: The download driver 121B installed and loaded into the OS 101B of the trusted extended domain accesses the allowed external device 102B.

Step 10: The download driver 121B returns data from the external device 102B to the download application 120B.

Figure 16:
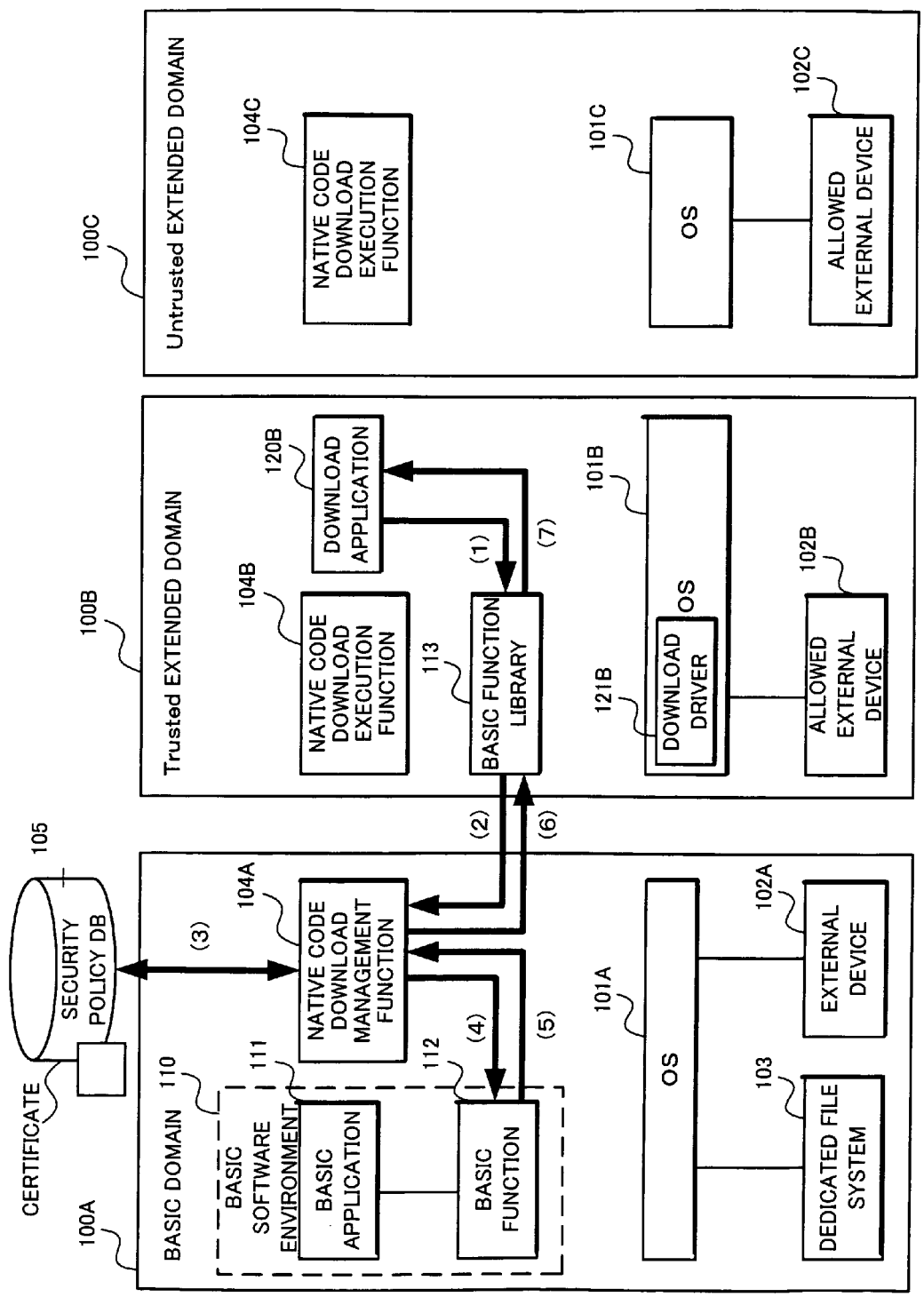
FIG. 16 is a diagram for use in explaining operation of the third example.

FIG. 16 is a diagram for use in explaining operation of the third example shown in FIG. 12, which is a diagram showing operation executed when a trusted application (download application) of the trusted extended domain uses a basic function of the basic domain. In FIG. 16, a numeral attached to each arrow represents a step number at which information is transferred on the relevant line.

Step 1: In the trusted extended domain 100B, the download application 120B requests the basic function library 113 to execute processing of the basic function 112 of the basic domain 100A. The basic function library 113 is a library collecting routines for executing the processing of the basic function 112 of the basic domain 100A, which is started by the download application 120B.

Step 2: The basic function library 113 of the trusted extended domain 100B enciphers the request by using a key (public key or the like) of an electronic certificate held by the download application 120B and transmits the enciphered request to the native code download management function 104A of the basic domain 10A. Transmission of the request from the basic function library 113 of the trusted extended domain 100B to the native code download management function 104A of the basic domain 100A is executed through the inter-processor communication unit 40 in FIG. 9 or FIG. 10.

Step 3: The native code download management function 104A of the basic domain 100A decodes the received request to check whether a request transmission source of the request is adequate or not by using the electronic certificate. Although in this example, the request is checked by using encipherment and decoding of the request, it is apparent that an arbitrary method can be used that enables an application and an electronic certificate to be correlated.

Step 4: The native code download management function 104A of the basic domain 100A makes a request to the basic function 112 when the check results in finding that the request is OK.

Step 5: The basic function 112 of the basic domain 100A processes the request in question received from the native code download management function 104A and after finishing the processing, notifies the native code download management function 104A of the basic domain 100A that the processing is completed.

Step 6: The native code download management function 104A of the basic domain 100A notifies the basic function library 113 of the trusted extended domain 100B that the processing is completed. Transmission of the notification from the native code download management function 104A of the basic domain 100A to the basic function library 113 of the trusted extended domain 100B is executed through the inter-processor communication unit in FIG. 9 or FIG. 10.

Step 7: The trusted extended domain basic function library 113 notifies the download application 120B of the completion of the processing as a response to the request.

Figure 17:
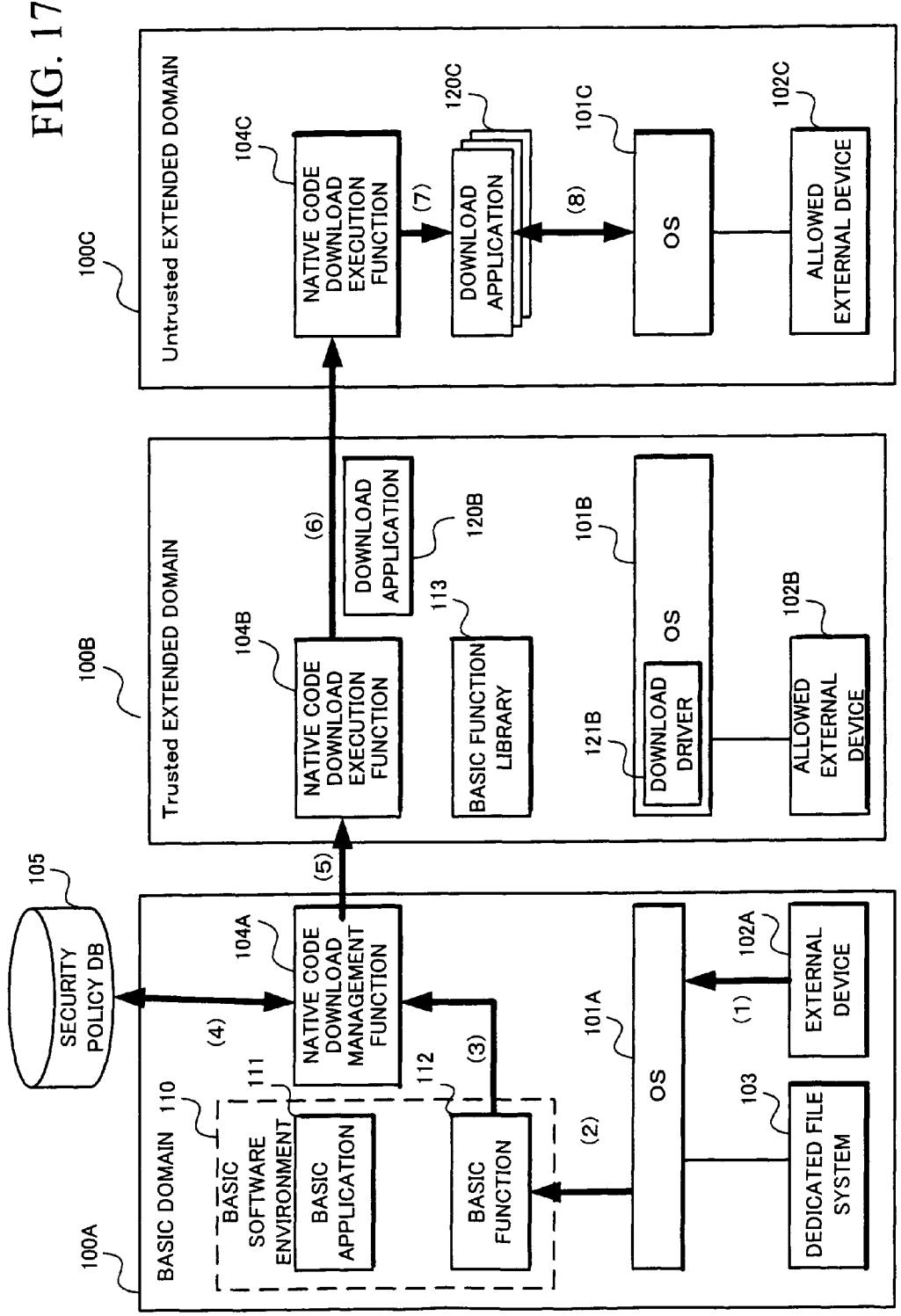
FIG. 17 is a diagram for use in explaining operation of the third example.

FIG. 17 is a diagram for use in explaining operation of the third example shown in FIG. 12, which is a diagram showing an execution procedure for downloading an untrusted application of the untrusted extended domain. In FIG. 17, a numeral attached to each arrow represents a step number at which information is transferred on the relevant line.

Step 1: From the external device 102A (network or SD card or the like) on the basic domain 100A to the OS 101A, download data arrives.

Step 2: The basic function 112 of the basic domain 100A analyzes attribute information or the like to recognize the download data as an application (download application).

Step 3: The basic function 112 of the basic domain 100A transfers the download application to the native code download management function 104A. The native code download management function 104A determines that no electronic certificate is attached to the application or that the electronic certificate is not proper.

Step 4: The native code download management function 104A of the basic domain 100A preserves download information in the security policy data base 105.

Step 5: The native code download management function 104A of the basic domain 100A transmits the downloaded application to the native code download execution function 104B of the trusted extended domain. Application transmission from the native code download management function 104A of the basic domain 100A to the native code download execution function 104B of the trusted extended domain is executed through the inter-processor communication unit 40 in FIG. 9 or FIG. 10.

Step 6: The native code download execution function 104B of the trusted extended domain 100B transmits the application to the native code download execution function 104C of the untrusted extended domain 100C to request execution. Application transmission from the native code download execution function 104B of the trusted extended domain 100B to the native code download execution function 104C of the untrusted extended domain 100C is executed through the inter-processor communication unit 40 in FIG. 9 or FIG. 10.

Step 7: The native code download execution function 104C of the untrusted extended domain starts the received download application 120C.

Step 8: The download application 120C starts operation in the untrusted extended domain 100C. In this case, the download application 120C of the untrusted extended domain operates on the OS 101C of the untrusted extended domain to allow only an access to the allowed external device 102C.

Figure 18:
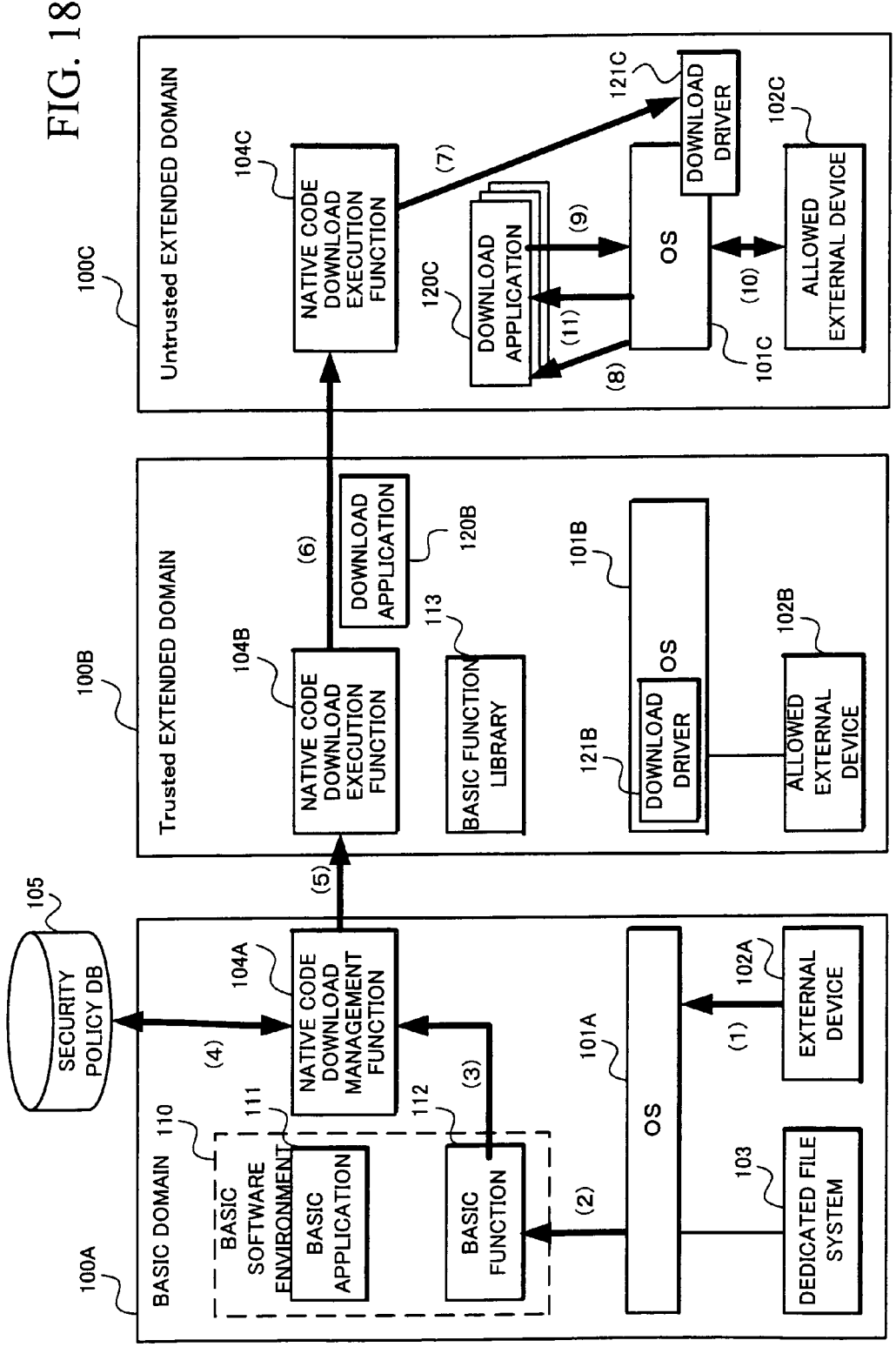
FIG. 18 is a diagram for use in explaining operation of the third example.

FIG. 18 is a diagram for use in explaining operation of the third example shown in FIG. 12, which is a diagram showing a state of download execution of an untrusted driver. In FIG. 18, a numeral attached to each arrow represents a step number at which information is transferred on the relevant line.

Step 1: From the external device 102A (network or SD card or the like) on the basic domain 100A to the OS 101A, download data arrives.

Step 2: Upon started by the arrival of the download data, the basic function 112 analyzes the download data such as attribute information, install information or the like to recognize the data as a device driver (download driver).

Step 3: The basic function 112 transfers the download driver to the native code download management function 104A, so that the native code download management function 104A finds that no electronic certificate is attached to the download driver or that although the electronic certificate is attached, its contents are not proper.

Step 4: The native code download management function 104A of the basic domain 100A preserves only download information in the security policy data base 105.

Step 5: The native code download management function 104A transmits the download driver to the native code download execution function 104B of the trusted extended domain 100B. Download driver transmission from the native code download management function 104A to the native code download execution function 104B of the trusted extended domain 100B is executed through the inter-processor communication unit 40 in FIG. 9 or FIG. 10.

Step 6: The native code download execution function 104B of the trusted extended domain 100B transfers the received download driver to the native code download execution function 104C of the untrusted extended domain 100C. Transfer of the download driver from the native code download execution function 104B of the trusted extended domain 100B to the native code download execution function 104C of the untrusted extended domain 100C is executed through the inter-processor communication unit 40 in FIG. 9 or FIG. 10.

Step 7: The native code download execution function 104C of the untrusted extended domain 100C installs the received download driver 121C.

Step 8: The OS 101C notifies the already executed application 120C that the driver 121C is installed or displays it on the screen (to notify a user).

Step 9: In the untrusted extended domain 100C, the already executed application 120C refers to the installed download driver 121C.

Step 10: In the untrusted extended domain 100C, the installed download driver 121C accesses the allowed external device 102C through the OS 101C in the untrusted extended domain.

Step 11: In the untrusted extended domain, the download driver 121C returns data obtained from the external device 102C to the download application 120C.

Figure 19:
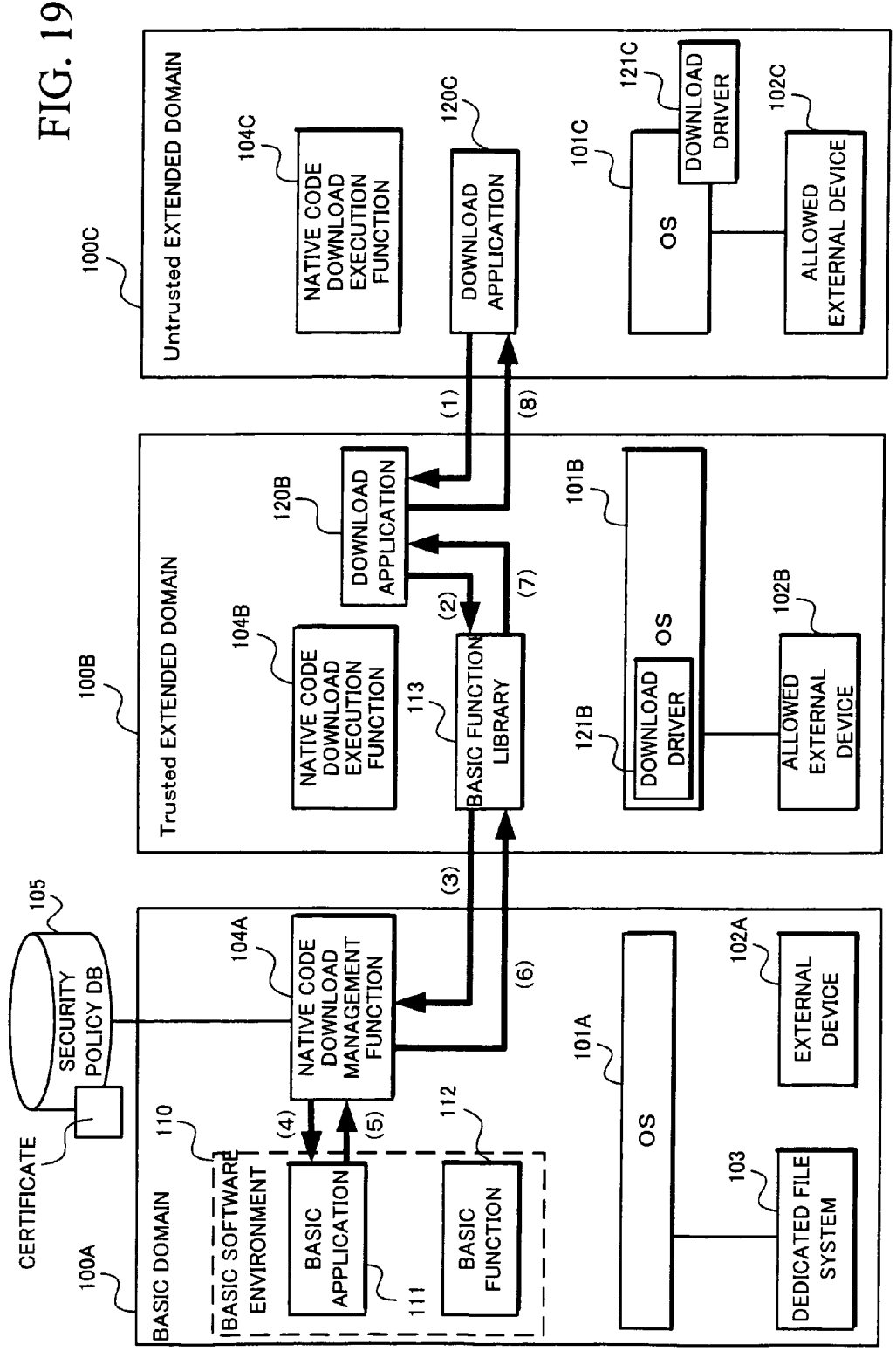
FIG. 19 is a diagram for use in explaining operation of the third example.

FIG. 19 is a diagram for use in explaining operation of the third example shown in FIG. 12, which is a diagram showing a state of cooperation between a trusted application and an untrusted application. In FIG. 19, a numeral attached to each arrow represents a step number at which information is transferred on the relevant line.

Step 1: The download application 120C on the untrusted extended domain 100C transmits data to the download application 120B on the trusted extended domain 100B. Data transmission is ordinarily executed through the inter-processor communication unit 40 in FIG. 9 or FIG. 10.

Step 2: The download application 120B on the trusted extended domain 100B executes processing based on the received data to request the basic function library 113 to execute the basic function processing including information cooperated with the untrusted extended domain.

Step 3: The basic function library 113 on the trusted extended domain 100B enciphers the request by using an electronic certificate held by the application to transmit the encipherment to the native code download management function 104A on the basic domain 100A. Transmission of the request is ordinarily executed through the inter-processor communication unit 40 in FIG. 9 or FIG. 10.

Step 4: The native code download management function 104A of the basic domain 100A decodes the request to check security of the request by using the electronic certificate stored in the security policy data base 105. As a result of the check, when the request is proper, the native code download management function 104A asks a user for confirmation through the basic application 111. The basic application 111 includes applications of screen display and input. Although in this example, the correspondence relationship between an application and an electronic certificate is checked by using encipherment and decoding of the request, it is apparent that an arbitrary method can be used that enables an application and an electronic certificate to be correlated.

Step 5: Assume that "NO" is input as confirmation from the user.

Step 6: The native code download management function 104A notifies the basic function library 113 of the trusted extended domain 100B of non-allowance. Notification of the non-allowance is ordinarily made by the inter-processor communication unit 40 in FIG. 9 or FIG. 10.

Step 7: The basic function library 113 notifies the download application 120B of non-allowance.

Step 8: The download application 120B on the trusted extended domain 100B notifies the download application 120C on the untrusted extended domain 100C of non-allowance. Notification of the non-allowance is ordinarily made by the inter-processor communication unit 40 in FIG. 9 or FIG. 10.

Figure 20:
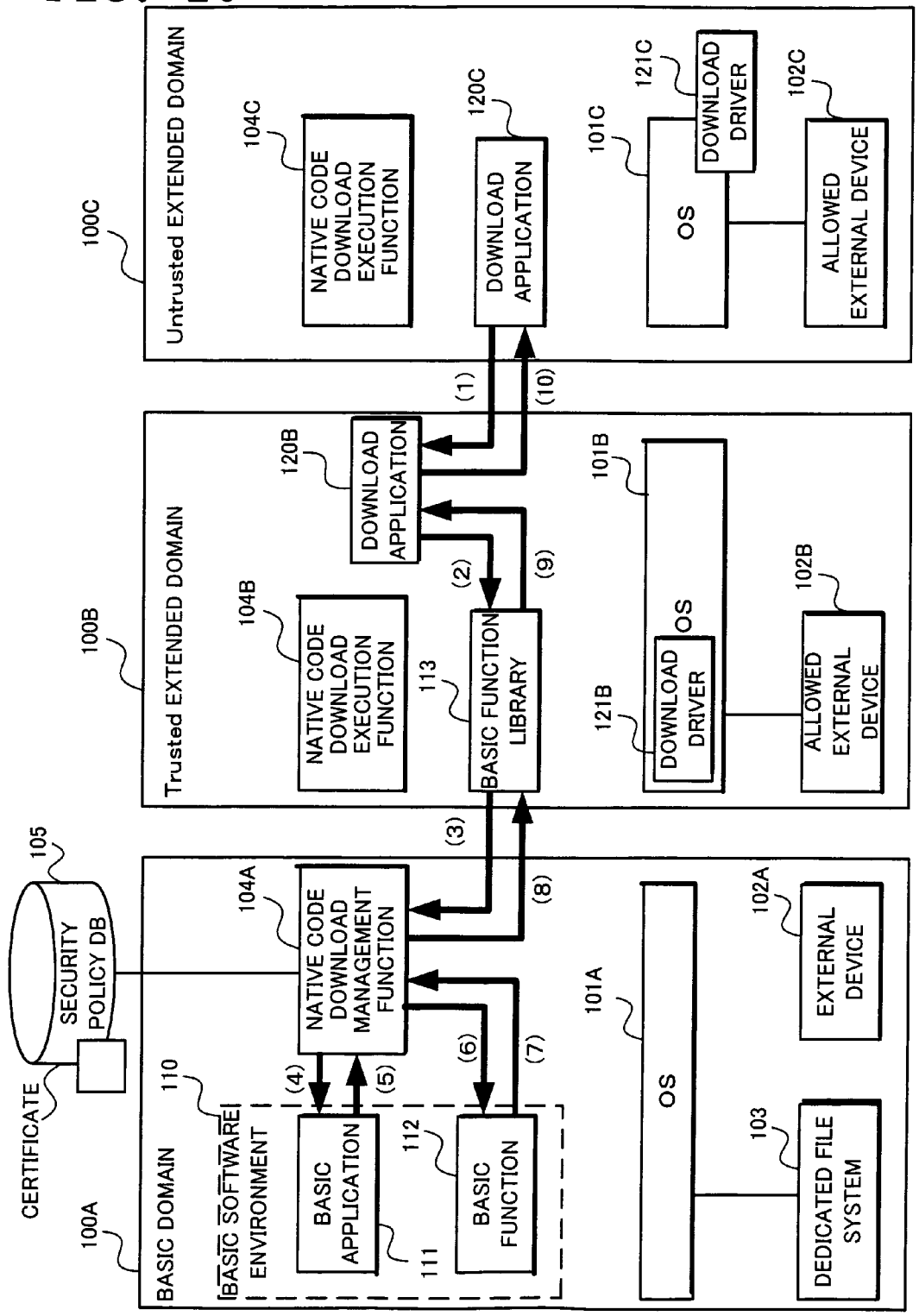
FIG. 20 is a diagram for use in explaining operation of the third example.

FIG. 20 is a diagram for use in explaining operation of the third example shown in FIG. 12, which is a diagram showing cooperation between a trusted application and an untrusted application. In FIG. 20, a numeral attached to each arrow represents a step number at which information is transferred on the relevant line.

Step 1: The download application 120C on the untrusted extended domain 100C transmits data to the download application 120B on the trusted extended domain 100B. Data transmission is executed through the inter-processor communication unit 40 in FIG. 9, FIG. 10 or the like.

Step 2: The download application 120B on the trusted extended domain 100B executes processing based on the received data to request the basic function library 113 to execute the basic function processing including information cooperated with the untrusted extended domain.

Step 3: The basic function library 113 on the trusted extended domain 100B enciphers the request by using an electronic certificate that the application 120B holds and transmits the enciphered request to the native code download management function 104A on the basic domain 100A. The request is ordinarily made by the inter-processor communication unit 40 in FIG. 9 or FIG. 10.

Step 4: The native code download management function 104A of the basic domain 100A decodes the request to check security of the request by using the electronic certificate stored in the security policy data base 105. As a result of the check, when the request is proper, the native code download management function 104A asks a user for confirmation through the basic application 111. Although in this example, the correspondence relationship between an application and an electronic certificate is checked by using encipherment and decoding of the request, it is apparent that an arbitrary method can be used that enables an application and an electronic certificate to be correlated.

Step 5: In this case, "YES" is input as confirmation by the user.

Step 6: The native code download management function 104A of the basic domain 100A makes a request to the basic function 112.

Step 7: The basic function 112 processes the request and notifies the native download management function 104A of processing completion.

Step 8: The native code download management function 104A of the basic domain 100A notifies the basic function library 113 of the trusted extended domain 100B of the completion. Notification of the completion is made by the inter-processor communication unit 40 in FIG. 9 or FIG. 10.

Step 9: The basic function library 113 of the trusted extended domain 100B notifies the download application 120B of the completion.

Step: 10: The download application 120B of the trusted extended domain 100B notifies the download application 120C of the untrusted extended domain 100C of the completion. Notification of the completion is made by the inter-processor communication unit 40 in FIG. 9 or FIG. 10.

Figure 21:
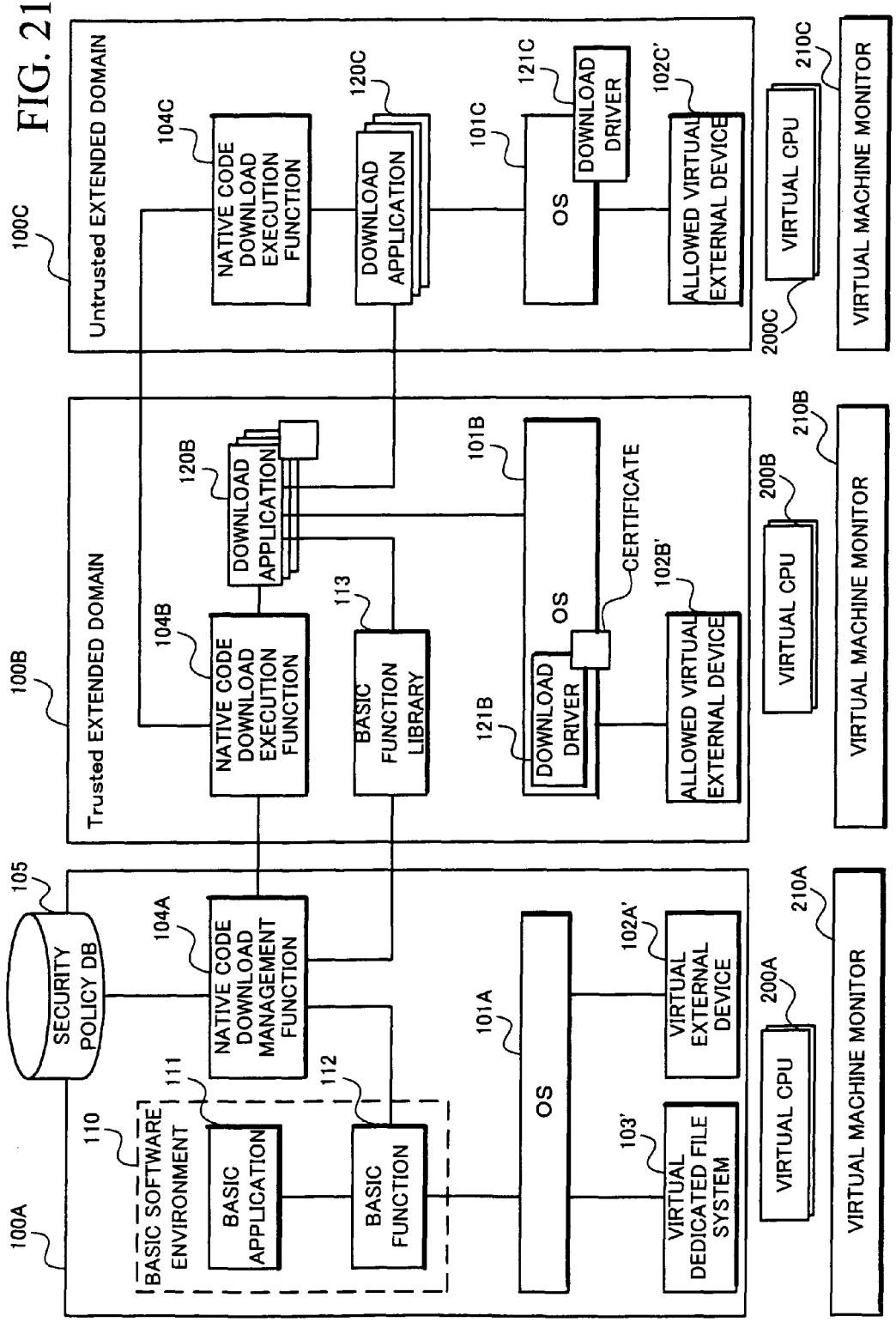
FIG. 21 is a diagram showing a structure of an information processing device of a fourth example of the present invention.

FIG. 21 is a diagram showing a fourth example structure as a basic structure. Between an OS and a CPU, a virtual machine monitor (a software layer executed by a CPU with an OS provided therebetween) is provided. This makes a CPU, an I/O and a memory resource be virtual. Between the OS and the CPU, the virtual machine monitor maps virtual hardware (e.g. virtual input/output device) on an actual hardware device. With respect to each of the basic domain, the trusted extended domain and the untrusted extended domain, the OS executes control of input/output (I/O) with a virtual dedicated file system and a virtual external device, and with virtual CPUs 200A, 200B and 200C and virtual machine monitors 210A, 210B and 210C provided between the OS and the CPU, maps a virtual dedicated file system 103', and virtual external devices 102A', 102B' and 102C' to corresponding real file system and real external devices.

According to the fourth example, unlike the hardware structure shown in FIG. 10 and the software structure shown in FIG. 12, a virtual CPU corresponding to the basic domain, for example, is not fixed and a CPU of the trusted extended domain or the like can be mapped as a virtual CPU of the basic domain. The virtual machine monitor requires, at its packaging, no modification of existing OS, application program, CPU and the like. According to the fourth example, the number of CPUs in each domain is variable to form a virtual CPU. As a software structure, structures of the basic domain, the trusted extended domain and the untrusted extended domain are the same as the structures shown in FIG. 12 with only a difference being that a device and a file system are a virtual device and a virtual file system.

Figure 22:
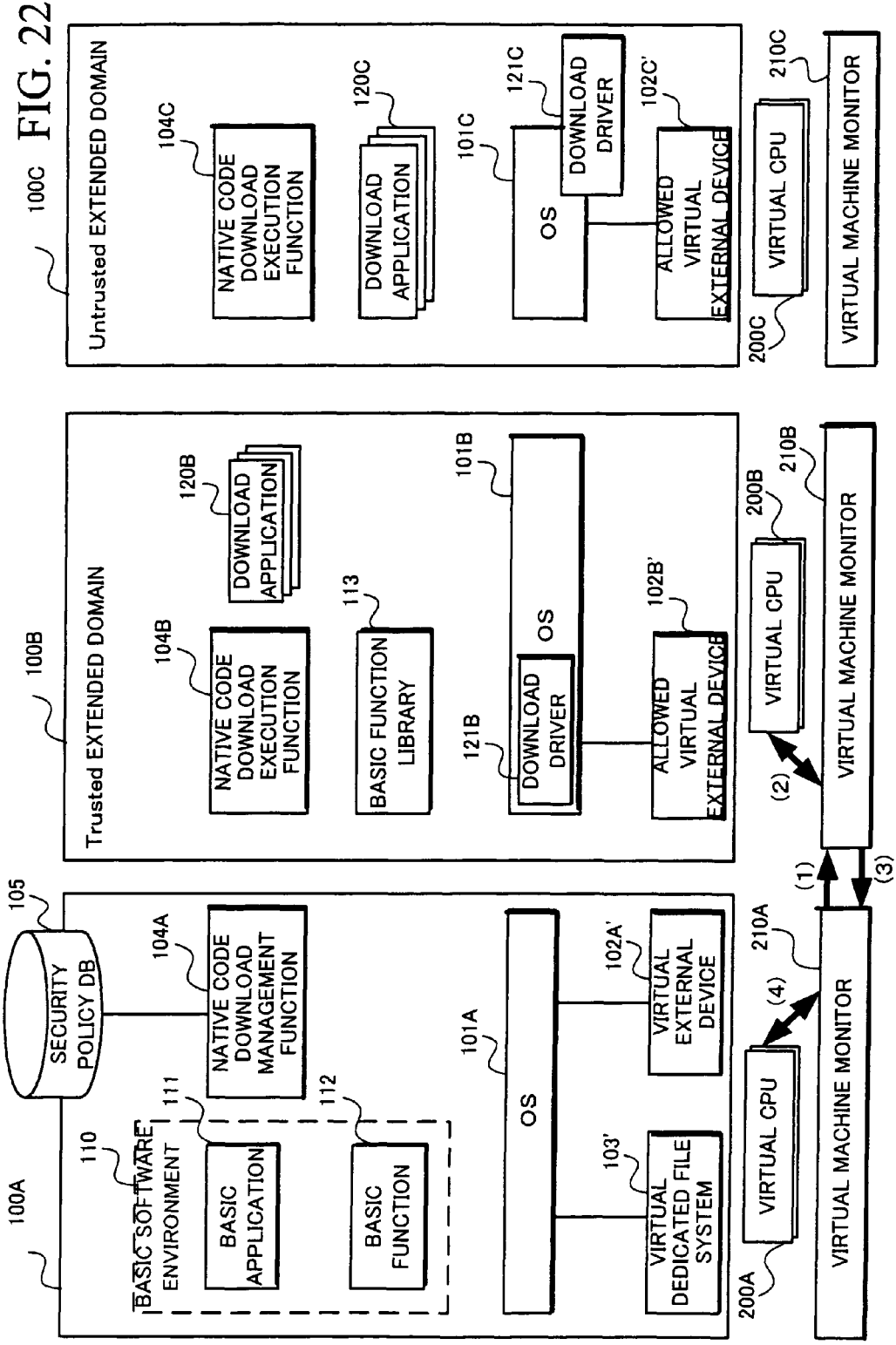
FIG. 22 is a diagram for use in explaining operation of the fourth example.

FIG. 22 is a diagram showing one example of a processing procedure of the fourth example illustrated in FIG. 21. In FIG. 22, a numeral attached to each arrow represents a step number.

Step 1: The virtual machine monitor 210A of the basic domain 100A requests the virtual machine monitor 210B on the trusted extended domain 100B for transfer of a CPU.

Step 2: The virtual machine monitor 210B on the trusted extended domain 100B reduces virtual CPU resources.

Step 3: The virtual machine monitor 210B on the trusted extended domain 100B notifies the virtual machine monitor 210A on the CPU on the basic domain 100A of a transferable CPU.

Step 4: The virtual machine monitor 210A on the basic domain 101A sets an access control unit and the like to increase the number of virtual CPUs.

The fourth example enables a CPU of another group to operate as a CPU of the basic domain. Since application downloading processing is the same as the above-described processing operation of the third example (FIG. 13 through FIG. 20), no description will be made thereof.

As a modification example of the fourth example, a virtual machine monitor may be operated in a secure mode. This arrangement further improves security.

Figure 23:
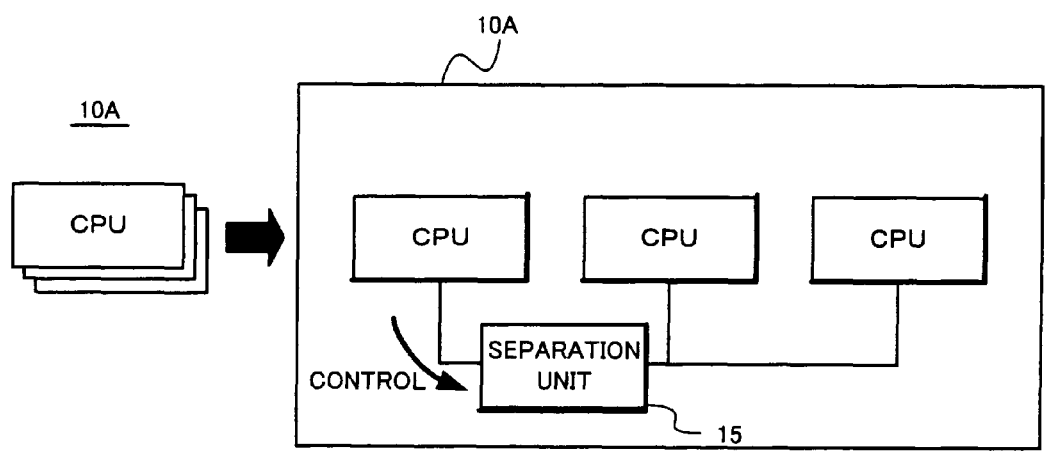
FIG. 23 is a diagram for use in explaining operation of the fourth example.

In a case where in each of the above-described software example, a CPU group of each domain operates as a multi-processor, all the channels operable in cooperation in hardware are designed to be controlled by the basic domain 100A such as shoot-down for flushing all the entries of TLB (Translation Lookaside Buffer: address translation table provided in an address management unit) for invalidating a bus to maintain cache coherence and a virtual multi-processor. In addition, as shown in FIG. 23, a CPU group of each domain (e.g. the CPU groups 10A and 10B having a multi-CPU structure shown in FIG. 1) may be structured to operate divisionally through a separation unit 15. This facilitates control at the time of transferring a CPU of a certain domain to other domain, thereby coping with graceful degrading of a failing multi-processor and the like.

While in the above-described first to fourth examples, the description has been made, as an example, with respect to the information communication terminal device which downloads and executes additional processing (application, device driver) of a native code from outside the device such as a network, the present invention is not limited to such information communication terminal device and is applicable to an arbitrary information processing device.

(First Exemplary Embodiment)

Description will be made of a first exemplary embodiment in which the present invention is applied to any of the information processing devices shown in the foregoing as a basic structure. As to the same structure and operation as those shown in the basic structure, their description will be appropriately omitted.

(Structure of the First Exemplary Embodiment)

Figure 24:
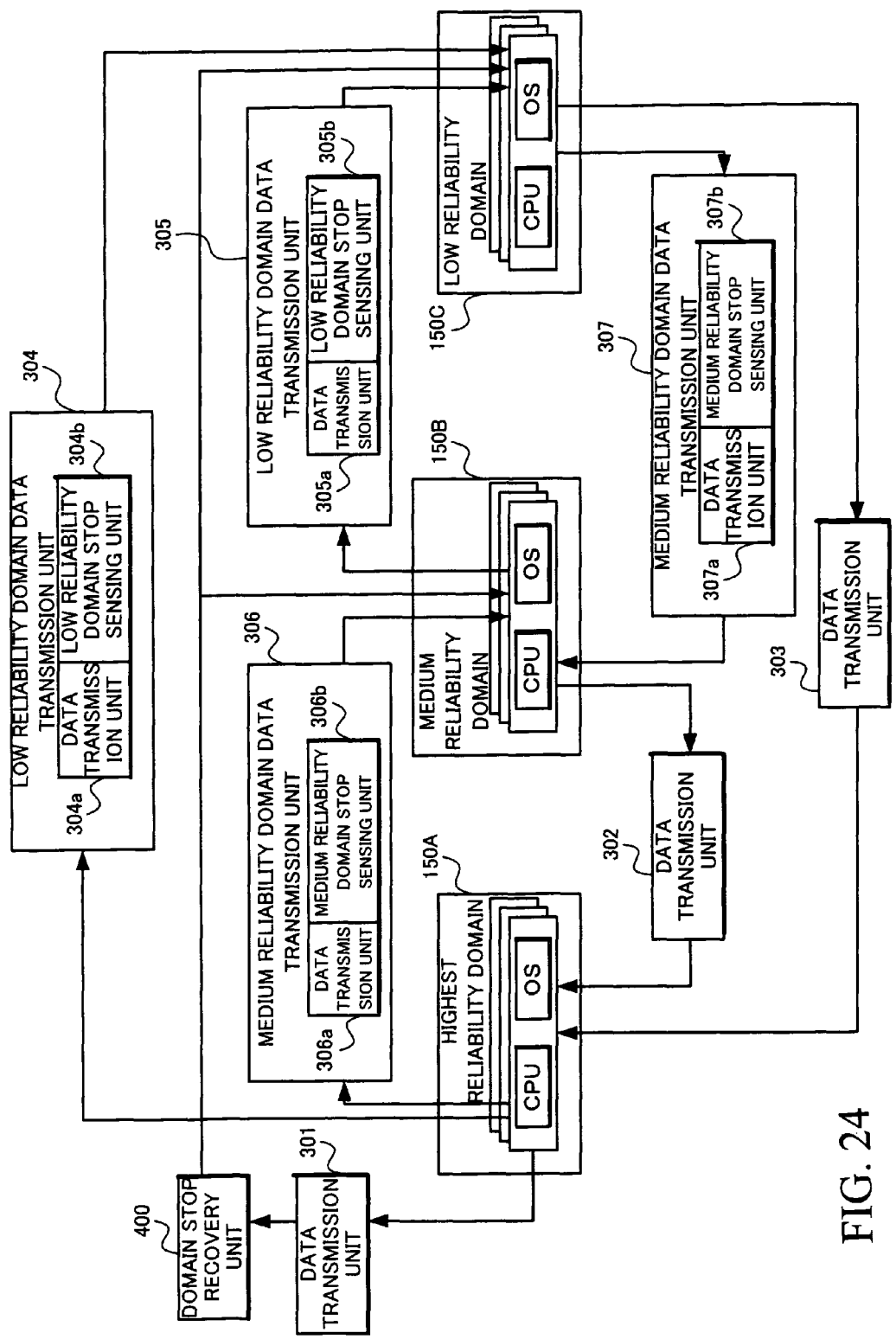
FIG. 24 is a diagram showing a structure of an information processing device according to a first exemplary embodiment of the present invention.

As shown in FIG. 24, the information processing device according to the first exemplary embodiment of the present invention is formed of a multiprocessor, which comprises a highest reliability domain 150A, a medium reliability domain 150B and a low reliability domain 150C, data transmission units 301, 302 and 303, low reliability domain data transmission units 304 and 305, medium reliability domain data transmission units 306 and 307, and a domain stop recovery unit 400 and has a function of executing, when notified of a request for recovery and the like from a domain, processing corresponding to the notified request or a function of executing processing corresponding to a notified request when the request is proper.

The information processing device according to the first exemplary embodiment of the present invention may be a parallel processing system by an OS for a single processor which enables an OS for a single processor that each domain has and an existing application to operate on a multi-processor without modifying them and enables the existing application to realize parallel processing by a multi-processor.

In this case, higher-speed processing is enabled than that in a case where an application is operated on a single processor, and parallel processing can be also realized by a simpler structure than that of a parallel processing system in which a multiprocessor each comprises an independent OS.

The highest reliability domain 150A corresponds to the above-described structure formed of the software 20A and the CPU 10A in the second example in FIG. 9 and the third example shown in FIG. 10 and the structure formed of the basic domain 100A, the virtual CPU 200A and the virtual machine monitor 210A of the fourth example in FIG. 21 and similarly to the basic domain 100A, has a basic application or basic software. Among these basic application and basic software are those having such functions as mailer, browser, i-mode (registered trademark) and an address book.

The highest reliability domain 150A also has a function of communicating, by its own CPU and OS, data related to a processing request issued in the domain, data related to control and the like with the medium reliability domain 150B and the low reliability domain 150C.

Since the highest reliability domain 150A is a domain which executes processing whose security level is equal to or higher than a fixed level and which is provided separately from other domains and because, for example, it fails to execute a native code externally downloaded and also because it has the highest reliability, the domain enables recovery from such a failure as a stopped state as to all the remaining domains.

In addition, since the highest reliability domain 150A is connected to the low reliability domain data transmission unit 304 and the medium reliability domain data transmission unit 306 dedicated for a communication path to domains other than the highest reliability domain 150A and the data transmission units 302 and 303 dedicated for a communication path from other domains than the highest reliability domain 150A and a communication path to each domain is separately provided, write of various kinds of data is allowed only to the highest reliability domain 150A.

The medium reliability domain 150B corresponds to the above-described structure formed of the software 20B and the CPU 10B of the second example in FIG. 9 and of the third example in FIG. 10 and the structure formed of the trusted extended domain 100B, the virtual CPU 200B and the virtual machine monitor 210B of the fourth example in FIG. 21.

The medium reliability domain 150B has a function of communicating, by its own CPU and OS, data related to a processing request issued in the domain, data related to control and the like with the highest reliability domain 150A and the low reliability domain 150C.

The medium reliability domain 150B is a domain which has at least one processing whose security level is lower than that of the processing executed by the highest reliability domain 150A and which is provided separately from other domains and also executes, for example, only a code guaranteed to be trustful among native codes downloaded.

The low reliability domain 150C corresponds to the above-described structure formed of the software 20C and the CPU 10C of the second example in FIG. 9 and of the third example in FIG. 10 and the structure formed of the untrusted extended domain 100C, the virtual CPU 200C and the virtual machine monitor 210C of the fourth example in FIG. 21.

The low reliability domain 150C has a function of communicating, by its own CPU and OS, data related to a processing request issued in the domain, data related to control and the like with the highest reliability domain 150A and the medium reliability domain 150B.

The low reliability domain 150C is a domain which has at least one processing whose security level is lower than that of the processing executed by the medium reliability domain 150B and which is provided separately from other domains and also executes, for example, other code than a code guaranteed to be trustful among native codes downloaded.

The highest reliability domain 150A, the medium reliability domain 150B and the low reliability domain 150C may be formed as described in the following.

The highest reliability domain 150A is assumed to be a domain whose execution processing each having a security level of the highest reliability domain 150A is equal or higher than a security level of execution processing of the medium reliability domain 150B and which includes at least one processing whose security level is high as a set of basic domain execution processing, the medium reliability domain 150B is assumed to be a domain whose each execution processing having a security level of the medium reliability domain 150B is equal to or higher than a security level of execution processing of the low reliability domain 150C and which includes at least one processing whose security level is high as a set of execution processing of each domain, and the low reliability domain 150C is assumed to be a domain whose each execution processing having a security level of the medium reliability domain 150C is equal to or lower than a security level of execution processing of the medium reliability domain 150B and which includes at least one processing whose security level is low as a set of execution processing of each domain.

In this case, the highest reliability domain 150A executes processing whose security level is relatively higher than that of the medium reliability domain 150B, and the medium reliability domain 150B executes processing whose security level is relatively higher than that of the low reliability domain 150C.

Reliability in the first exemplary embodiment of the present invention represents one set for each stage of a security level based on an electronic certificate indicative of the degree of security applied to each processing or according to a certain security policy. For example, for each processing to which digital signing is applied, a security level is set based on a certain security policy.

Figure 25:
FIG. 25 is a diagram showing one example of reliability set in the first exemplary embodiment of the present invention.

FIG. 25 is a diagram showing a function significance setting table 700, which illustrates one example of reliability set in the first exemplary embodiment of the present invention.

As shown in FIG. 25, reliability is set as a security level according to significance of each level, for example, hierarchically, level A: password is required, level B: not to confirm twice, level C: to confirm at each execution, level D: to confirm at each access.

By using the above, reliability is applied to a domain according to a function to be executed. More specifically, reliability is set according to significance of contents of a failure recovery request by a domain.

As a result, such flexible recovery processing is enabled as, for example, allowing a recovery request for a subtle failure without uniformly refusing a recovery request from the low reliability domain 150C.

While only the same kind of security level may be arranged in one domain such as level A to the highest reliability domain 150A, level B to the medium reliability domain 150B and level C to the low reliability domain 150C, possible as reliability setting which enables flexible recovery processing is, for example, as shown in FIG. 25, arranging a level equal to or higher than level A and equal to or higher than level B to the highest reliability domain 150A according to significance of a function to be executed, a level equal to or higher than level B and equal to or higher than level C to the medium reliability domain 150B according to a function to be executed, and a level equal to or higher than level C and equal to or higher than level D to the low reliability domain 150C according to a function to be executed.

Thus set reliability may be managed, for example, by the highest reliability domain 150A and in such a case, determination of the highest reliability domain 150A enables priority of a function or processing to be executed to be defined according to reliability.

Reliability can be made based on any certificate or any security policy as long as it enables such setting as described above and can be arbitrarily set according to a function to be executed or the number of domains.

The data transmission units 301, 302 and 303 have a function of transmitting data related to a processing request issued in a domain, data related to control and the like and their structure examples include, for example, a shared memory and an inter-processor interruption, FIFO or a queue, a dual port memory, such a network as LAN, wire communication, radio communication and the like which may be realized by a common related technique having a function of transmitting data, whose structure is not in particular limited as long as it enables data transmission.

Data transmitted by the data transmission units 301, 302 and 303 includes information for identifying a requesting source domain which has issued a processing request, information for identifying a domain to be processed, information for identifying contents of processing and the like, and depending on a case, includes information related to an actual failure condition of a domain to be processed.

The data transmission units 301, 302 and 303 comprise a mechanism (not shown) for executing error notification to a higher layer in a transmission destination domain or error processing. This is because data transmission while the transmission destination domain is in recovery processing needs elimination of useless waiting until data transmission is completed by such a mechanism.

This is also the case with data transmission units 304a, 305a, 306a and 307a which will be described later.

The data transmission unit 301 has a function of notifying the domain stop recovery unit 400 of a processing request which requests recovery of the medium reliability domain 150B or the low reliability domain 150C and the like and which is issued by the highest reliability domain 150A.

The data transmission unit 302 has a function of notifying the highest reliability domain 150A of a processing request which requests recovery of the medium reliability domain 150B or the low reliability domain 150C and the like and which is issued by the medium reliability domain 150B.

The data transmission unit 303 has a function of notifying the highest reliability domain 150A of a processing request which requests recovery of the medium reliability domain 150B or the low reliability domain 150C and the like and which is issued by the low reliability domain 150C.

The low reliability domain data transmission units 304 and 305 comprise the data transmission units 304a and 305a, and low reliability domain stop sensing units 304b and 305b, respectively, and have a function of sensing what failure condition the low reliability domain 150C actually has at the time of data transmission to the low reliability domain 150C as a target domain.

The medium reliability domain data transmission units 306 and 307 comprise the data transmission units 306a and 307a and medium reliability domain stop sensing units 306b and 307b, respectively, and have a function of sensing what failure condition the medium reliability domain 150B actually has at data transmission to the medium reliability domain 150B as a target domain.

The data transmission units 304a, 305a, 306a and 307a have the same functions as those of the above-described data transmission units 301, 302 and 303 as described above.

The low reliability domain stop sensing units 304b and 305b have the function of sensing whether the low reliability domain 150C is actually in the stopped state or not at the time of data transmission to the low reliability domain 150C by the data transmission unit 304a or 305a.

With the sensing function, whether the low reliability domain 150C is in the stopped state is sensed by determining whether data in question is received by the low reliability domain 150C as a transmission destination domain, for example. More specifically, sensing is realized by measuring time or the number of times of a failure in reception of the data in question by the low reliability domain 150C. For preventing an increase in processing loads of the highest reliability domain 150A and the medium reliability domain 150B, time required for the sensing processing in question should be desirably as shorter as possible.

When sensing the low reliability domain 150C being in the stopped state, the low reliability domain stop sensing units 304b and 305b notify the highest reliability domain 150A that the low reliability domain 105C is in the stopped state.

The medium reliability domain stop sensing unit 306b has the same structure and function as those of the low reliability domain stop sensing units 304b and 305b and has a function of sensing whether the medium reliability domain 150B is actually in the stopped state (sensing failure contents of the domain) or not at the time of data transmission to the medium reliability domain 150B by the data transmission unit 306a.

With the sensing function, whether the medium reliability domain 150B is in the stopped state is sensed by determining whether data in question is received by the medium reliability domain 150B as a transmission destination domain, for example. More specifically, determination can be made by measuring time or the number of times of a failure in reception of the data in question by the medium reliability domain 150B. For preventing an increase in processing loads of the highest reliability domain 150A, time required for the sensing processing in question should be desirably as short as possible.

Upon confirming that the medium reliability domain 150B is in the stopped state, the medium reliability domain stop sensing unit 306b notifies the highest reliability domain 150A that the medium reliability domain 150B is in the stopped state.

As will be described later, the medium reliability domain stop sensing unit 306b, when authorized to allow recovery processing of the medium reliability domain 150B, may directly notify the domain stop recovery unit 400 that the medium reliability domain 150B is in the stopped state to execute the recovery processing of the medium reliability domain 150B by using the domain stop recovery unit 400.

In this case, since the highest reliability domain 150A fails to execute processing related to allowance to the recover processing, such effect as mitigating processing loads of the highest reliability domain 150A can be obtained.

On the other hand, the medium reliability domain stop sensing unit 307b, which is a unit for sensing stop of a domain whose reliability is higher than its own domain, has a function of sensing whether the medium reliability domain 150B is actually in the stopped state or not at the time of data transmission to the medium reliability domain 150B by the data transmission unit 306a.

With the sensing function, whether the medium reliability domain 150B is in the stopped state or not is sensed by determining whether data in question is received by the medium reliability domain 150B as a transmission destination domain, for example. More specifically, determination can be made by measuring time or the number of times of a failure in reception of the data in question by the medium reliability domain 150B. Since the shorter the time of the sensing processing in question becomes, the lower is reliability of genuineness of information notified to the highest reliability domain 150A by the low reliability domain 150C, longer time needs to be provided for the sensing processing in question.

Upon sensing that the medium reliability domain 150B is in the stopped state, the medium reliability domain stop sensing unit 307b notifies the highest reliability domain 150A that the medium reliability domain 150B is in the stopped state.

In addition, each of the above-described domain stop sensing units is allowed to sense whether a domain whose stop is to be sensed is actually in the stopped state or not by such a method set forth in the following, for example.

(1) Sensing is realized by counting existence/non-existence of a response of a check packet periodically transmitted by a transmission source domain to a transmission destination domain as a target whose stop is to be sensed. More specifically, time and a number of times when no response is received is counted. The time and the number of times in question to be counted may be changed according to a difference in reliability.

(2) Sensing is realized by counting stop/run-away information displayed by a transmission destination domain. More specifically, cease of information which is to be periodically updated by the transmission destination domain is counted.

Setting of each of the above-described time and number of times, update information counting frequency and the like may be set by a domain whose reliability is higher than that of the transmission destination domain. Setting change, however, which exceeds a lowest threshold value, is assumed to be impossible.

Each of the above-described domain stop sensing units may check whether a domain whose stop is to be sensed is actually in the stopped state by arbitrarily combining each of the above-described sensing processing manners, relevant time, number of times, update information and the like.

The domain stop recovery unit 400 has a function of executing various kinds of processing requests including recovery processing such as reset of a CPU in a domain as a target, re-boot of an OS, re-boot of the domain itself, and rollback to an environment on a specific time and date, for example, month and day, or recovery of a communication path and re-start of an application based on the recovery request and the like notified by the highest reliability domain 150A through the data transmission unit 301. Furthermore, the unit is structured to be accessible only from the highest reliability domain 150A to accept a processing request from the highest reliability domain 150A unconditionally.

When other domains than the highest reliability domain 150A make a request for processing such as recovery processing, the domain stop recovery unit 400 refuses all the requests.

More specifically, a recovery condition can be determined according to reliability of an individual domain by allowance or refusal of a recovery request from the domain. Recovery condition in the present exemplary embodiment is, for example, defined to allow all the recovery requests from the highest reliability domain, while refusing all the recovery requests from other domains.

Figure 26:
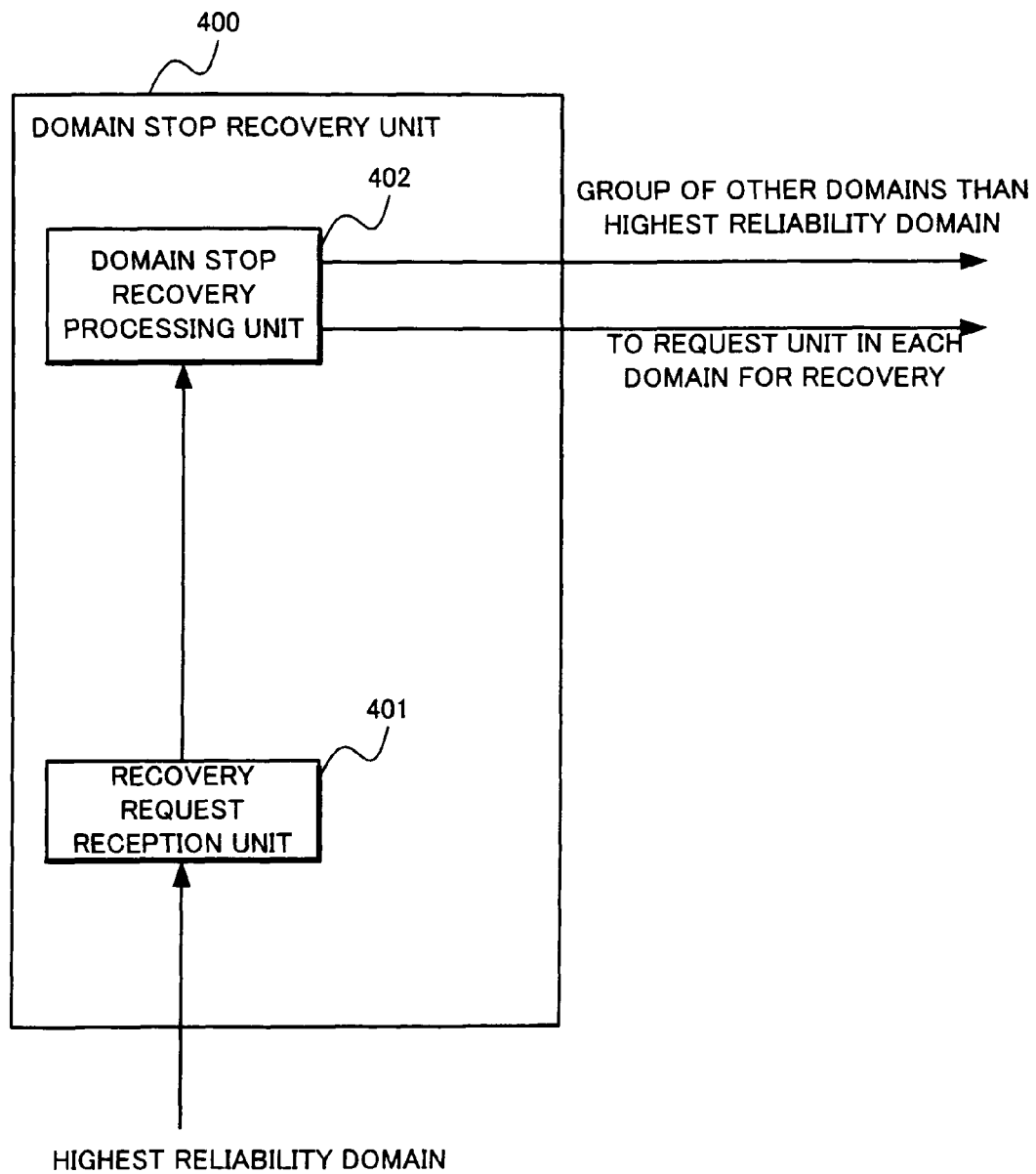
FIG. 26 is a diagram showing a structure of a domain stop recovery unit 400 of the information processing device according to the first exemplary embodiment of the present invention.

FIG. 26 shows a structure of the domain stop recovery unit 400.

As shown in FIG. 26, the domain stop recovery unit 400 comprises a recovery request reception unit 401 and a domain stop recovery processing unit 402.

The recovery request reception unit 401 has a function of receiving a recovery request (processing request) from the highest reliability domain 150A through the data transmission unit 301 to notify the domain stop recovery processing unit 402 of the processing request.

Based on a processing request notified from the recovery request reception unit 401, the domain stop recovery processing unit 402 identifies processing contents such as which domain is to be proceed and which processing is requested to ask a relevant domain for relevant processing contents.

In a case, for example, where a processing request notified by the highest reliability domain 150A is a request for recovery processing of the stopping medium reliability domain 150B, the domain stop recovery processing unit 402 asks the stopping medium reliability domain 150B for recovery processing.

In communication, since a communication partner is defined in each layer, processing contents vary according to a kind of failure sensed in each layer. Recovery contents vary, for example, with a state of stoppage sensed in each layer.

Figure 27:
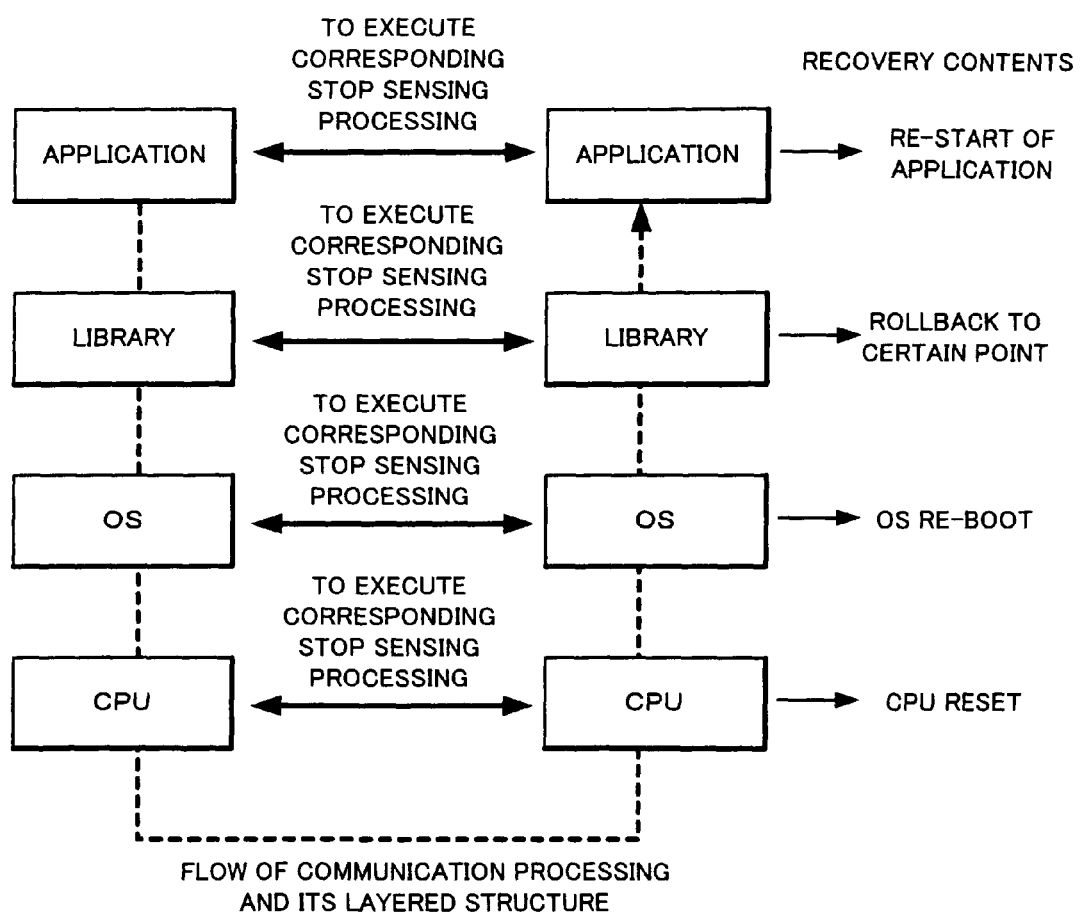
FIG. 27 is a diagram showing one example of a correspondence relationship between contents of communication processing (processing contents) and a layered structure of communication at the information processing device according to the first exemplary embodiment of the present invention.

FIG. 27 shows one example of a correspondence relationship between contents of communication processing (processing contents) and its layered structure.

As shown in FIG. 27, a layered structure of each domain is sequentially formed, for example, of an application layer, a library layer, an OS layer and a CPU layer starting from an upper layer, and the domain stop recovery processing unit 402 executes stop sensing processing corresponding to each layer which is determined in advance to execute communication processing (recovery processing).

Contents of communication processing (recovery processing contents) include re-start of an application in the application layer, rollback to a certain time point in the library layer, OS re-boot in the OS layer and CPU rollback in the CPU layer.

Since a program for operating the information processing device in the first exemplary embodiment needs to stably realize a function implemented by each of the above-described units and means, it is preferably stored and executed in the highest reliability domain 150A which is subjected to no effect of externally downloaded additional processing.

Here, a hardware structure of the information processing device according to the first exemplary embodiment will be described.

Figure 28:
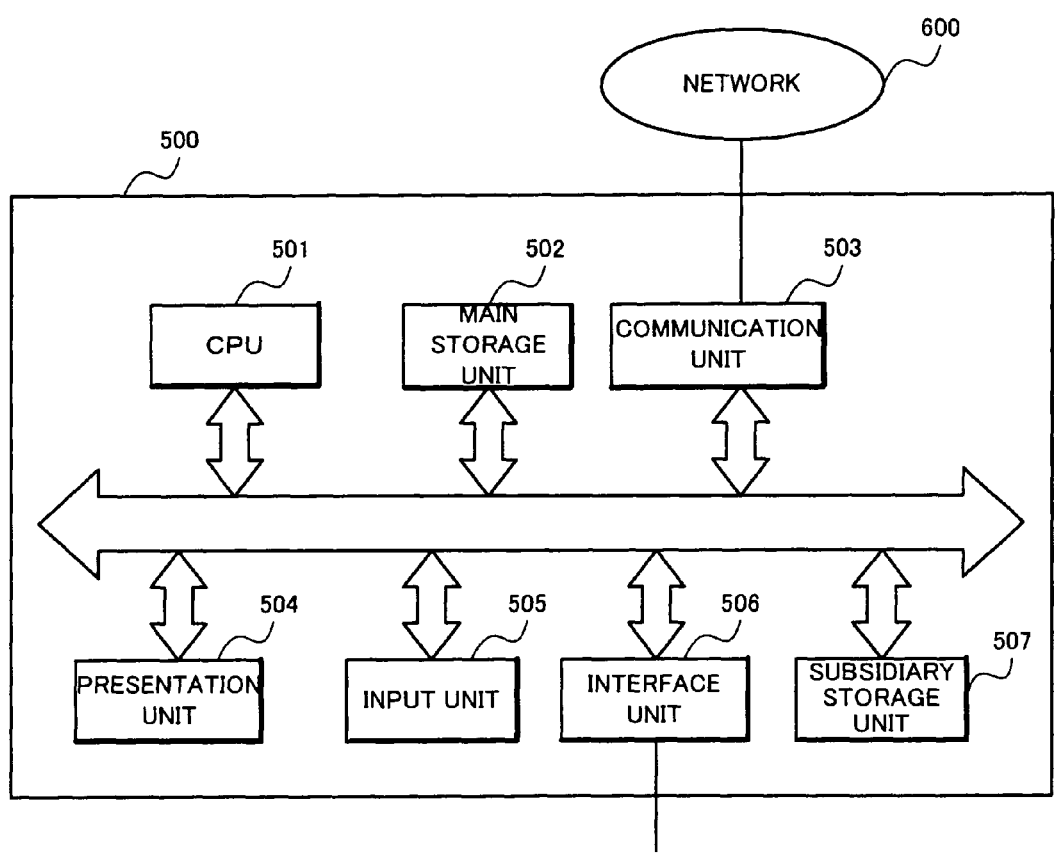
FIG. 28 is a block diagram showing one example of a hardware structure of the information processing device according to the first exemplary embodiment of the present invention.

FIG. 28 is a block diagram showing one example of a hardware structure of the information processing device according to the first exemplary embodiment.

With reference to FIG. 28, the information processing device according to the first exemplary embodiment, which can be realized by comprising the same hardware structure as that of a common computer device, comprises a plurality of CPUs (Central Processing Unit) 501, a main storage unit 502 used as a data working region or a data temporary save region which is a main memory such as a RAM (Random Access Memory), a communication unit 503 for transmitting and receiving data through an internet 600, a presentation unit 504 such as a liquid crystal display, a printer or a speaker, an input unit 505 such as a key operation unit, an interface unit 506 connected to a peripheral apparatus for transmitting and receiving data, a subsidiary storage unit 507 as a hard disk device formed of such a non-volatile memory as a ROM (Read Only Memory), a magnetic disk or a semiconductor memory, and a system bus 508 which connects each of the above-described components of the present information processing device with each other.

The information processing device according to the first exemplary embodiment has its operation realized not only as hardware by mounting a circuit part formed of a hardware part such as LSI (Large Scale Integration) in which a program realizing such a function is incorporated inside the information processing device but also as software by executing a program which provides each function of each of the above-described means and units on the CPU 501 on the computer processing device.

(Operation of First Exemplary Embodiment)
(Processing Request by Highest Reliability Domain 150A)

Figure 29:
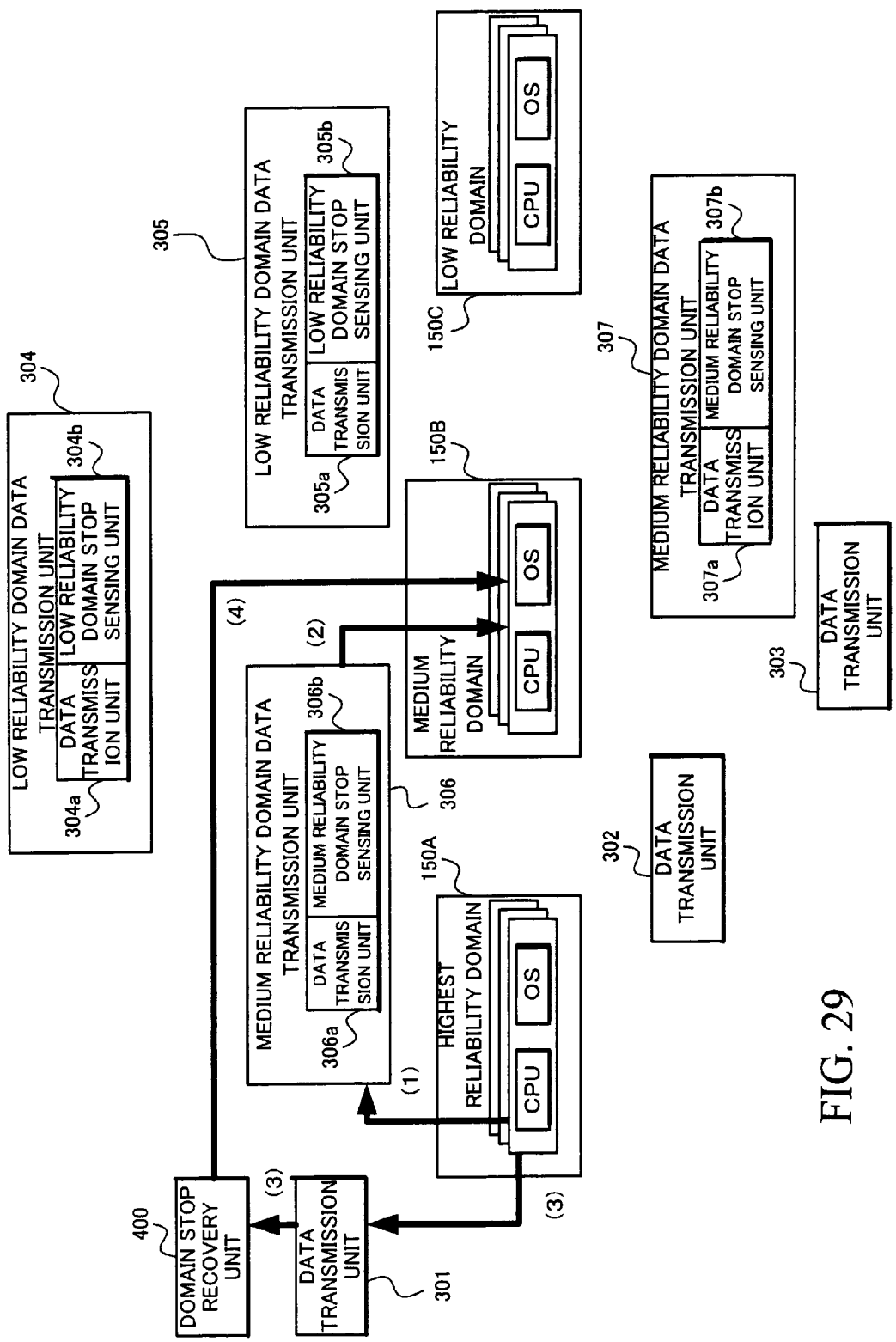
FIG. 29 is a diagram for use in explaining one example of operation of the information processing device according to the first exemplary embodiment of the present invention.

FIG. 29 is a diagram for use in explaining one example of operation of the first exemplary embodiment shown in FIG. 24, which illustrates stop sensing-recovery processing of the medium reliability domain 150B by the highest reliability domain 150A. In FIG. 29, a numeral attached to each arrow represents a step number at which information is transferred on the line in question.

First assume that as an initial state, the medium reliability domain 150B abnormally stops.

Step 1: The highest reliability domain 150A transmits data to the medium reliability domain 150B through the data transmission unit 306a of the data transmission unit 306A with a medium reliability domain stop sensing function.

Step 2: The medium reliability domain stop sensing unit 306b of the data transmission unit 306 with a medium reliability domain stop sensing function senses the medium reliability domain 150B stopping.

Step 3: Upon sensing the medium reliability domain 150B stopping by the medium reliability domain stop sensing unit 306b, the highest reliability domain 150A requests the domain stop recovery unit 400 to recover the medium reliability domain 150B through the data transmission unit 301.

Step 4: Based on the recovery request from the highest reliability domain 150A, the domain stop recovery unit 400 recovers the medium reliability domain 150B.

Figure 30:
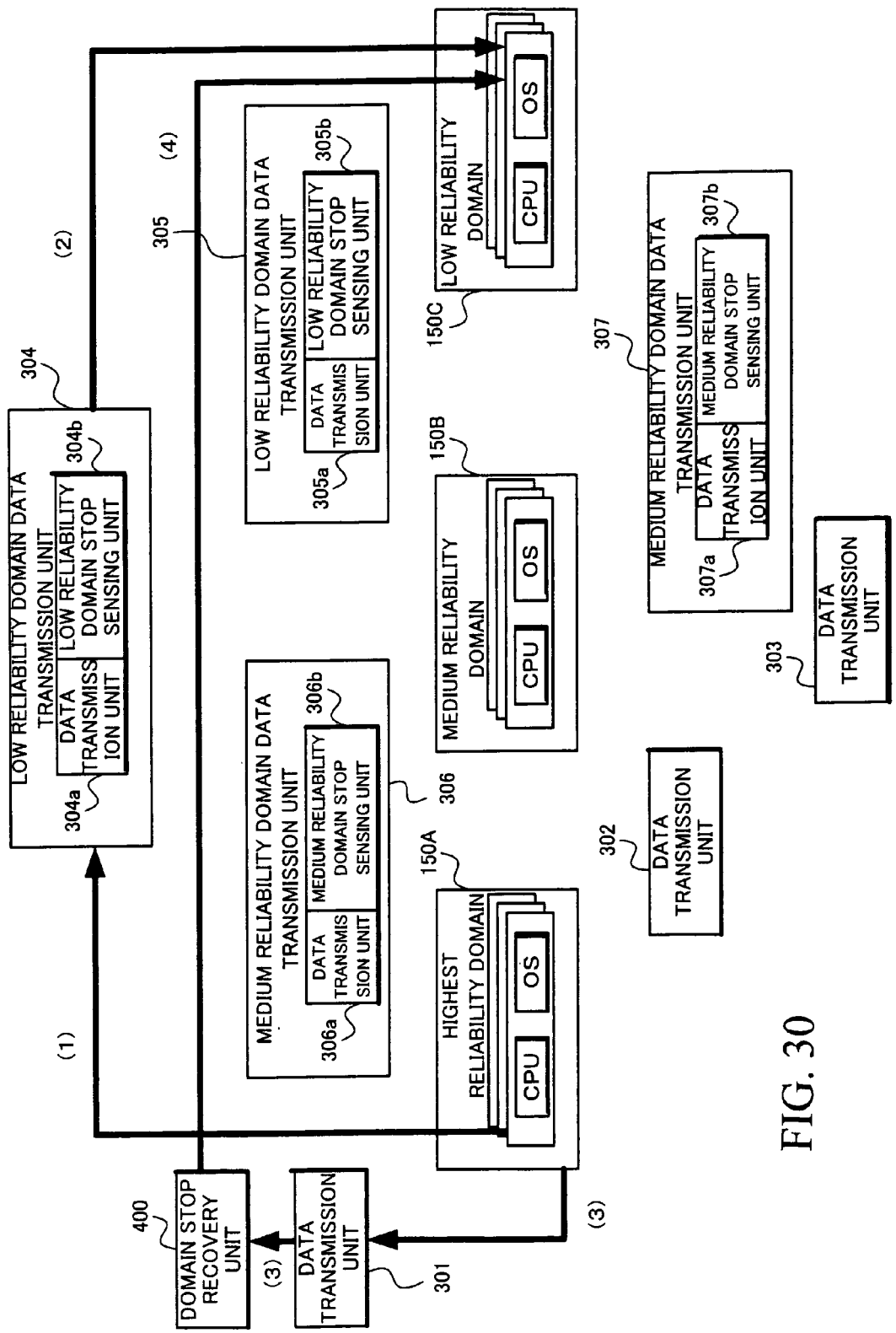
FIG. 30 is a diagram for use in explaining one example of operation of the information processing device according to the first exemplary embodiment of the present invention.

FIG. 30 is a diagram for use in explaining one example of operation of the first exemplary embodiment shown in FIG. 24, which illustrates stop sensing recovery processing of the low reliability domain 150C by the highest reliability domain 150A. In FIG. 30, a numeral attached to each arrow represents a step number at which information is transferred on the line in question.

First assume that as an initial state, the low reliability domain 150C abnormally stops.

Step 1: The highest reliability domain 150A transmits data to the low reliability domain 150C through the data transmission unit 304a of the data transmission unit 304 with a low reliability domain stop sensing function.

Step 2: The medium reliability domain stop sensing unit 304b of the data transmission unit 304 with a low reliability domain stop sensing function senses the low reliability domain 150C stopping.

Step 3: Upon sensing the low reliability domain 150C stopping by the low reliability domain stop sensing unit 304b, the highest reliability domain 150A requests the domain stop recovery unit 400 to recover the low reliability domain 150C through the data transmission unit 301.

Step 4: Based on the recovery request from the highest reliability domain 150A, the domain stop recovery unit 400 recovers the low reliability domain 150C.

(Processing Request by Medium Reliability Domain 150B)

Figure 31:
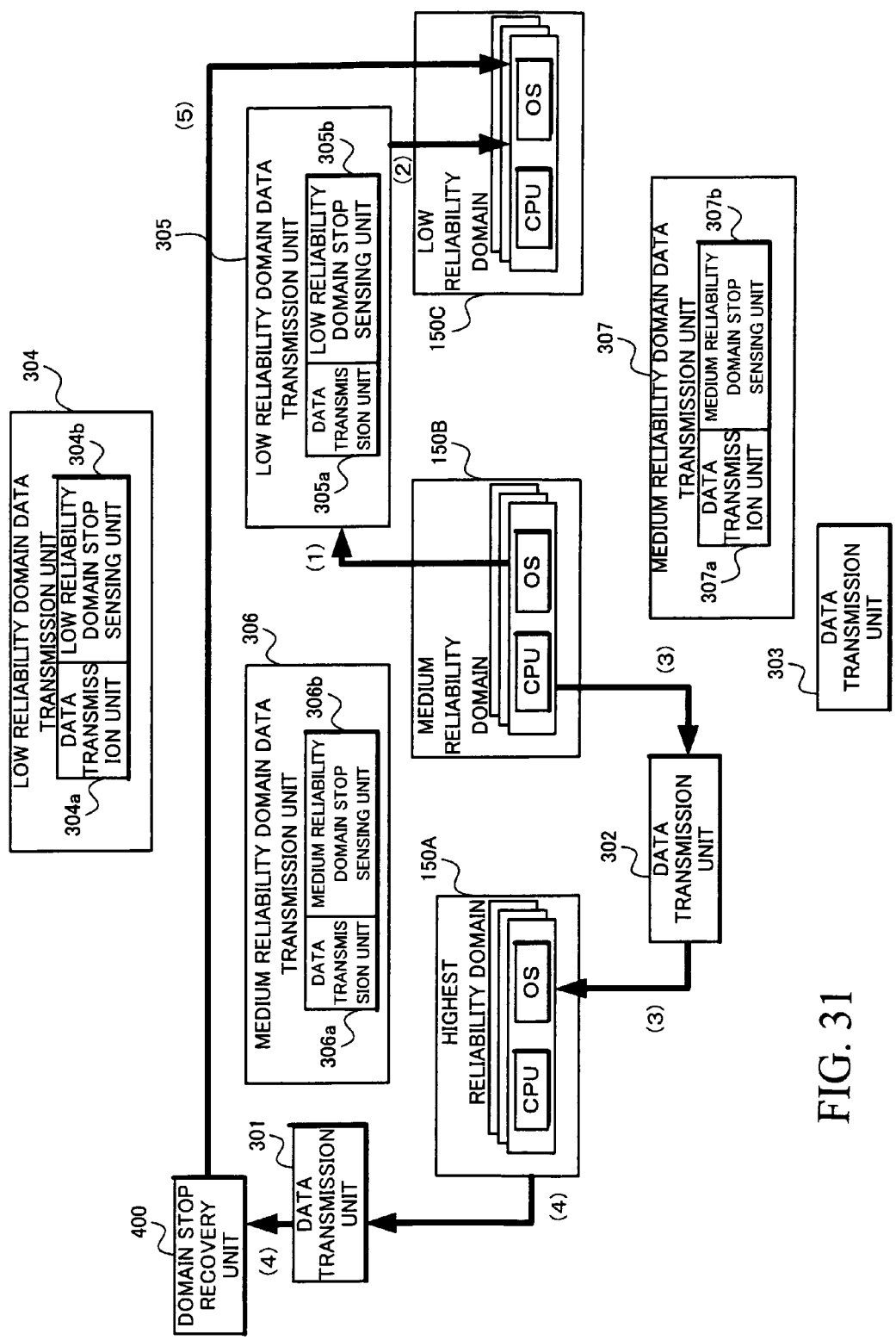
FIG. 31 is a diagram for use in explaining one example of operation of the information processing device according to the first exemplary embodiment of the present invention.

FIG. 31 is a diagram for use in explaining one example of operation of the first exemplary embodiment shown in FIG. 24, which illustrates stop sensing-recovery processing of the low reliability domain 150C by the medium reliability domain 150B. In FIG. 31, a numeral attached to each arrow represents a step number at which information is transferred on the line in question.

First assume that as an initial state, the low reliability domain 150C abnormally stops.

Step 1: The medium reliability domain 150B transmits data to the low reliability domain 150C through the data transmission unit 305a of the data transmission unit 305 with a low reliability domain stop sensing function.

Step 2: The low reliability domain stop sensing unit 305b of the data transmission unit 305 with a low reliability domain stop sensing function senses the low reliability domain 150C stopping.

Step 3: Upon sensing the low reliability domain 150C stopping by the low reliability domain stop sensing unit 305b, the medium reliability domain 150B requests the highest reliability domain unit 150A to recover the low reliability domain 150C through the data transmission unit 302.

Step 4: The highest reliability domain 150A requests the domain stop recovery unit 400 to recover the low reliability domain 150C through the data transmission 301.

Step 5: The domain stop recovery unit 400 recovers the low reliability domain 150C based on the recovery request from the highest reliability domain 150A.

For confirming that the above-described low reliability domain 150C whose recovery is requested actually stops, the highest reliability domain 150A may sense existence/non-existence of stop by using the data transmission unit 304 with a low reliability domain stop sensing function between Step 3 and Step 4.

Alternatively, for confirming that the above-described low reliability domain 150C whose recovery is requested actually stops, the domain stop recovery unit 400 may sense existence/non-existence of stop by using the data transmission unit 304 with a low reliability domain stop sensing function between Step 4 and Step 5.

(Processing Request by Low Reliability Domain 150C)

Figure 32:
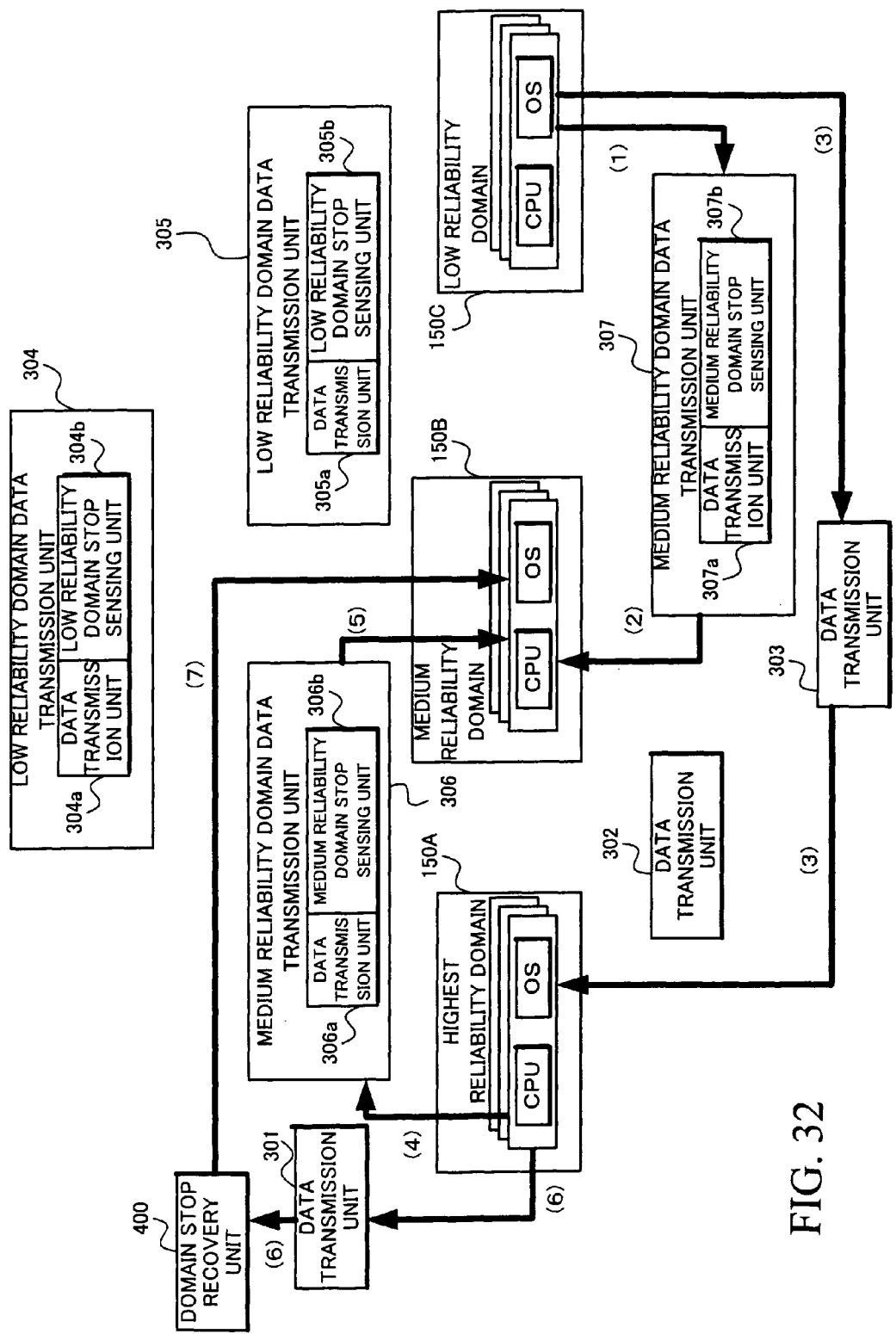
FIG. 32 is a diagram for use in explaining one example of operation of the information processing device according to the first exemplary embodiment of the present invention.

FIG. 32 is a diagram for use in explaining one example of operation of the first exemplary embodiment shown in FIG. 24, which illustrates stop sensing recovery processing of the medium reliability domain 150B by the low reliability domain 150C. In FIG. 32, a numeral attached to each arrow represents a step number at which information is transferred on the line in question.

First assume that as an initial state, the medium reliability domain 150B abnormally stops.

Step 1: The low reliability domain 150C transmits data to the medium reliability domain 150B through the data transmission unit 307a *of the data transmission unit* 307 *with a medium reliability domain stop sensing function*.

Step 2: The medium reliability domain stop sensing unit 307b of the data transmission unit 307 with a medium reliability domain stop sensing function senses the medium reliability domain 150B stopping.

Step 3: Upon sensing the medium reliability domain 150B stopping by the medium reliability domain stop sensing unit 307b, the low reliability domain 150C requests the highest reliability domain 150A to recover the medium reliability domain 150B through the data transmission unit 303.

Step 4: Since the low reliability domain 150C as a recovery requesting source domain has reliability which is lower than that of the medium reliability domain 150B as a recovery target domain and which is low reliability, for confirming genuineness of a target or contents of a recovery request, the highest reliability domain 150A transmits data to the medium reliability domain 150B through the data transmission unit 306a of the data transmission unit 306 with a medium reliability domain stop sensing function.

Step 5: The medium reliability domain stop sensing unit 306b of the data transmission unit 306 with a medium reliability domain stop sensing function senses the medium reliability domain 150B stopping to confirm that the medium reliability domain 150B actually stops.

Step 6: Upon confirmation that the medium reliability domain 150B actually stops, the highest reliability domain 150A requests the domain stop recovery unit 400 to recover the medium reliability domain 150B through the data transmission unit 301.

Step 7: Based on the recovery request from the highest reliability domain 150A, the domain stop recovery unit 400 recovers the medium reliability domain 150B.

Without execution of the relevant confirmation processing by the highest reliability domain 150A at Step 4 through Step 6, the domain stop recovery unit 400 may sense existence/non-existence of stop by using the data transmission unit 306 with a medium reliability domain stop sensing function between Step 6 and Step 7 to confirm that the above-described medium reliability domain 150B whose recovery is requested actually stops.

(Processing Request by the Same Reliability Domain)

Figure 33:
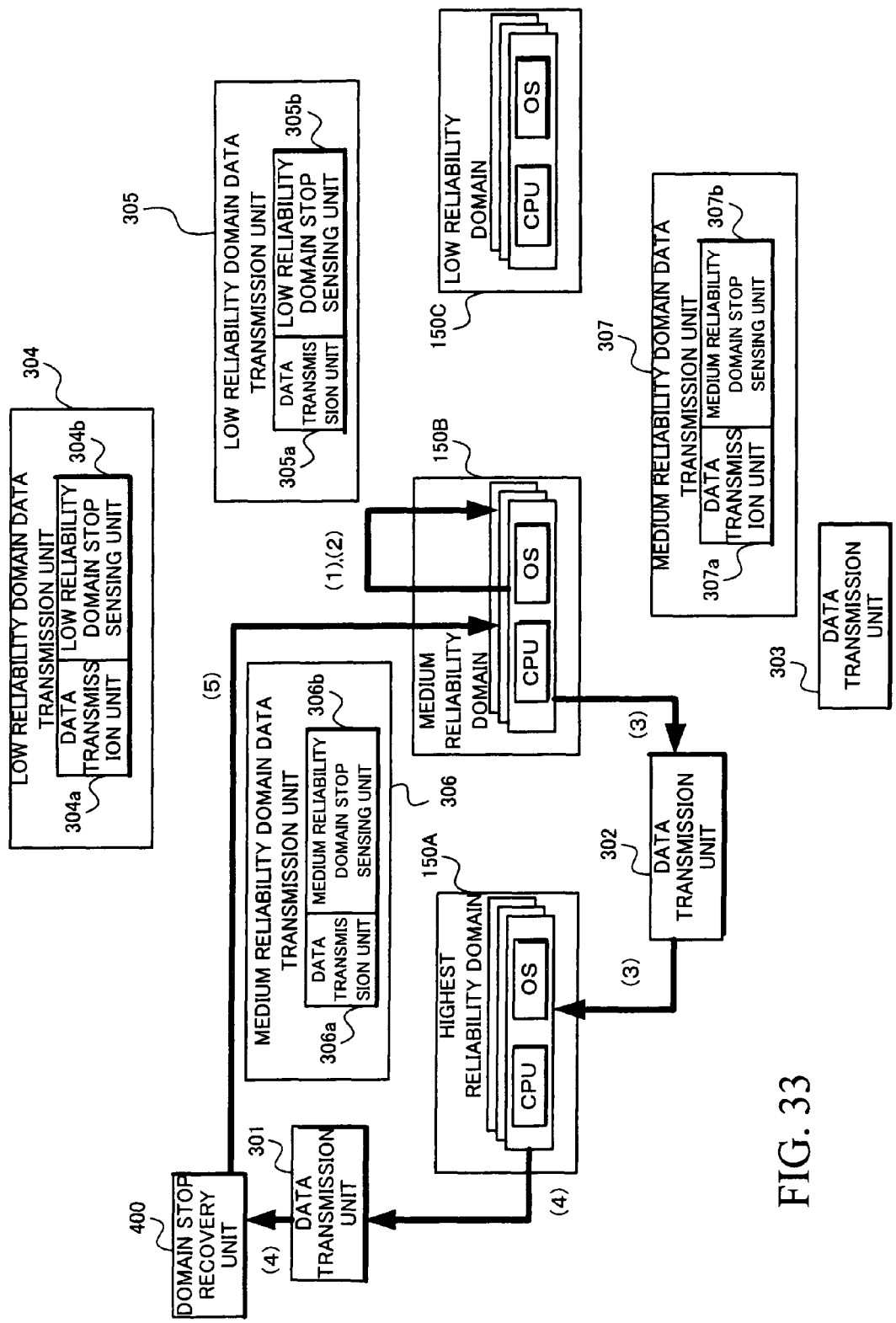
FIG. 33 is a diagram for use in explaining one example of operation of the information processing device according to the first exemplary embodiment of the present invention.

FIG. 33 is a diagram for use in explaining one example of operation of the first exemplary embodiment shown in FIG. 24, which illustrates stop sensing-recovery processing of other medium reliability domain 150B by the medium reliability domain 150B as an example of stop sensing•recovery processing in the same reliability domain. In FIG. 33, a numeral attached to each arrow represents a step number at which information is transferred on the line in question.

First assume that as an initial state, at least one medium reliability domain 150B in a group of the medium reliability domains 150B abnormally stops.

Step 1: Other medium reliability domain 150B not stopping transmits data to the above-described medium reliability domain 150B in the group of the medium reliability domains 150B.

Step 2: Stop of the above-described medium reliability domain 150B as a data transmission destination is sensed. Stop sensing processing in the same reliability domain is the same as stop sensing processing in the same domain among domains whose reliabilities are not set. Accordingly, since such stop sensing processing is a common technique, no description will be made.

Step 3: Upon sensing the above-described medium reliability domain 150B as a data transmission destination stopping, the medium reliability domain 150B as a transmission source of the data requests the highest reliability domain 150A to recover the above-described medium reliability domain 150B being in the stopped state through the data transmission unit 302.

Step 4: The highest reliability domain 150A requests the domain stop recovery unit 400 to recover the above-described medium reliability domain 150B in the stopped state through the data transmission unit 301.

Step 5: The domain stop recover unit 400 recovers the above-described medium reliability domain 150B in the stopped state based on the recovery request from the highest reliability domain 150A.

For confirming the above-described medium reliability domain 150B in the stopped state whose recovery is requested actually stops, the highest reliability domain 150A may sense existence/non-existence of stop by using the data transmission unit 306 with a medium reliability domain stop sensing function between Step 3 and Step 4.

Alternatively, for confirming the above-described medium reliability domain 150B in the stopped state whose recovery is requested actually stops, the domain stop recovery unit 400 may sense existence/non-existence of stop by using the data transmission unit 306 with a medium reliability domain stop sensing function between Step 4 and Step 5.

(Effects by First Exemplary Embodiment)

Thus, according to the first exemplary embodiment of the present invention, since each domain is separated based on reliability, the highest reliability domain 150A having such basic processing as mailer or browser will not be affected by such an attack from other domain than the highest reliability domain 150A and even when other domain than the highest reliability domain 150A stops, no basic processing of the information processing device such as mailer or browser will freeze. In other words, since such a malicious processing request as contains virus or a processing request for erroneous recovery will not be accepted from a domain with low reliability, freezing of the basic processing of the information processing device can be prevented.

In addition, since the highest reliability domain 150A is connected to the low reliability domain data transmission unit 304 and the medium reliability domain data transmission unit 306 dedicated for a communication path to other than the highest reliability domain 150A and the data transmission units 302 and 303 dedicated for a communication path from other domain than the highest reliability domain 150A and a communication path to each domain is provided, write of various kinds of data is allowed only to the highest reliability domain 150A to eliminate the need of exclusive control between the respective domains.

Furthermore, since other domain developing such a fault as stop than the highest reliability domain 150A can be recovered by the domain stop recovery unit, security of the highest reliability domain 150A can be ensured, while enabling continuous operation of the information processing device.

In addition, although since spontaneous domain recovery by a watchdog timer or the like has a problem that because time required for recovery of a data transmission destination domain can not be seen, coping with an error leads to degradation of performance to cause a case where spontaneous domain recovery can not be started, since according to the first exemplary embodiment of the present invention, at data transmission to the medium reliability domain 150B or the low reliability domain 150C, the highest reliability domain 150A is allowed to sense a failure occurring in these domains by means of the low reliability domain data transmission unit 304 and the medium reliability domain data transmission unit 306, recovery of these failures is enabled at the data transmission to avoid the above-described problem.

Furthermore, because the highest reliability domain 150A comprises two kinds of stop sensing units, the low reliability domain stop sensing unit 304b and the medium reliability domain stop sensing unit, stop sensing processing by the highest reliability domain 150A can be decentralized to enable speed-up.

In addition, since the highest reliability domain 150A is allowed to execute recovery processing by its own determination based on priority according to reliability, appropriate recovery of the information processing device is enabled such as preferential recovery starting with a necessary function. Even when, for example, a plurality of recovery requests are simultaneously made to a domain developing a fault, flexible and efficient recovery processing is enabled based on reliability of a domain as a requesting source of a recovery request or on priority according to reliability of processing contents indicated by the recovery request. It is also possible to suppress generation of unnecessary recovery processing or to execute minimum necessary recovery processing.

(Second Exemplary Embodiment)

Second exemplary embodiment corresponds to the first exemplary embodiment shown in FIG. 24, which adopts the same structure as that of the first exemplary embodiment but differs in that the domain stop recovery unit 400 has a stop confirmation unit 403 for receiving a request issued in various kinds of domains.

In the following, description will be made mainly of the differences from the above-described first exemplary embodiment and no description will be made of a component common to that of the first exemplary embodiment.

(Structure of Second Exemplary Embodiment)

Figure 34:
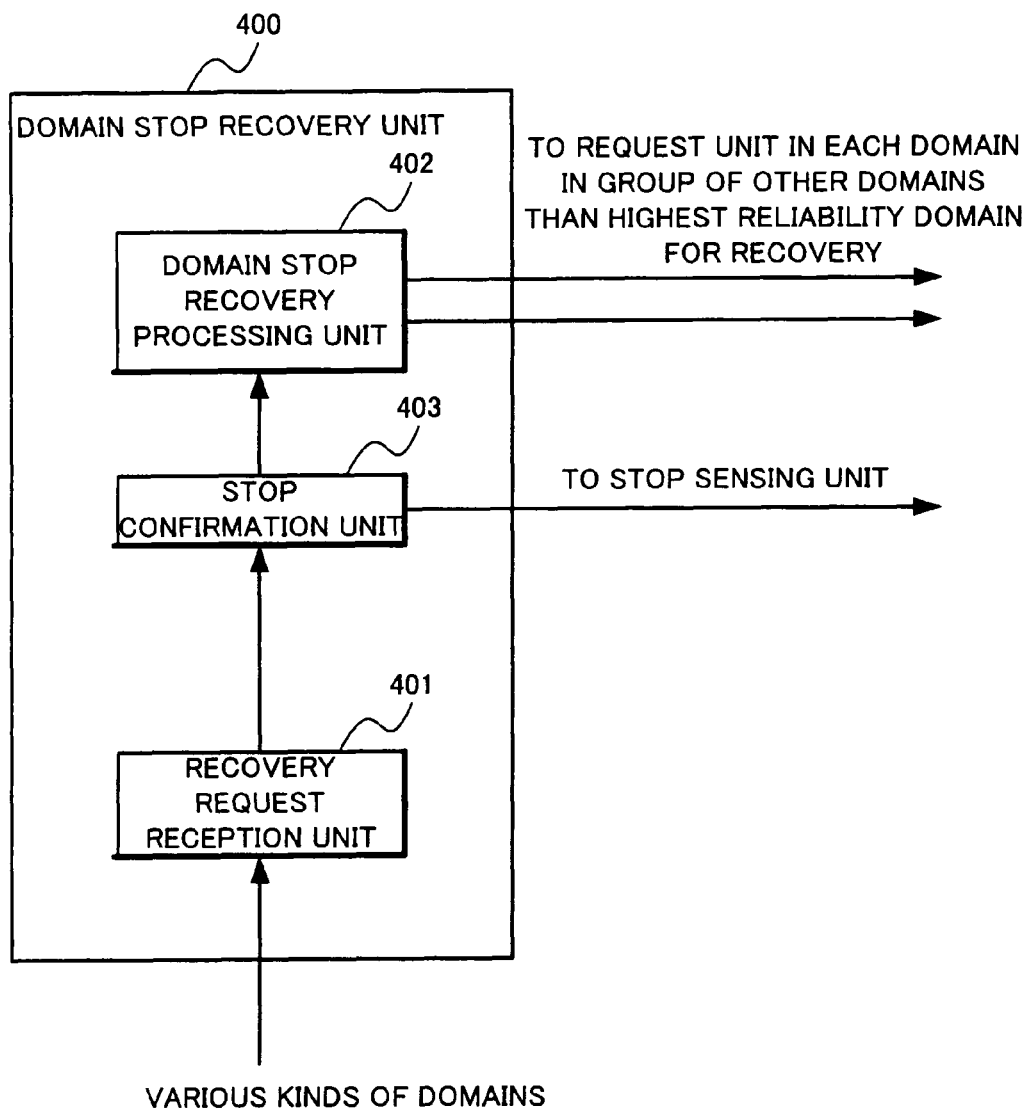
FIG. 34 is a diagram showing a structure of a domain stop recovery unit 400 of an information processing device according to a second exemplary embodiment of the present invention.

FIG. 34 is a diagram showing a structure of the domain stop recovery unit 400 according to the second exemplary embodiment.

As shown in FIG. 34, the domain stop recovery unit 400 according to the second exemplary embodiment differs from the first exemplary embodiment in having the stop confirmation unit 403.

The stop confirmation unit 403 has a function of obtaining information for identifying a requesting source domain which has issued a recovery request (processing request), information for identifying a domain to be processed, information for identifying contents of processing and the like from information notified from various kinds of domains through the recovery request reception unit 401 and sensing an actual failure condition of a domain to be processed by using the low reliability domain data transmission unit 304 or the medium reliability domain data transmission unit 306 to confirm genuineness of the obtained processing contents.

When thus confirming that the obtained contents of the processing are true, the stop confirmation unit 403 notifies the domain stop recovery processing unit 402 of information notified from various kinds of domains to request processing.

Upon requested for processing by the stop confirmation unit, the domain stop recovery processing unit 402 asks a predetermined unit in a domain to be processed for such processing as recovery based on the information notified by the stop confirmation unit 403.

In the second exemplary embodiment, the stop confirmation unit 403 that the domain stop recovery unit 400 has may comprise the low reliability domain data transmission unit 304 and the medium reliability domain data transmission unit 306, or alternatively, the stop confirmation unit 403 may be provided outside the domain stop recovery unit 400 to execute the above-described sensing processing based on information notified from various kinds of domains and make a processing request to the domain stop recovery processing unit 402 in the domain stop recovery unit 400.

(Operation of Second Exemplary Embodiment)
(Processing Request by Medium Reliability Domain 150B)

Figure 35:
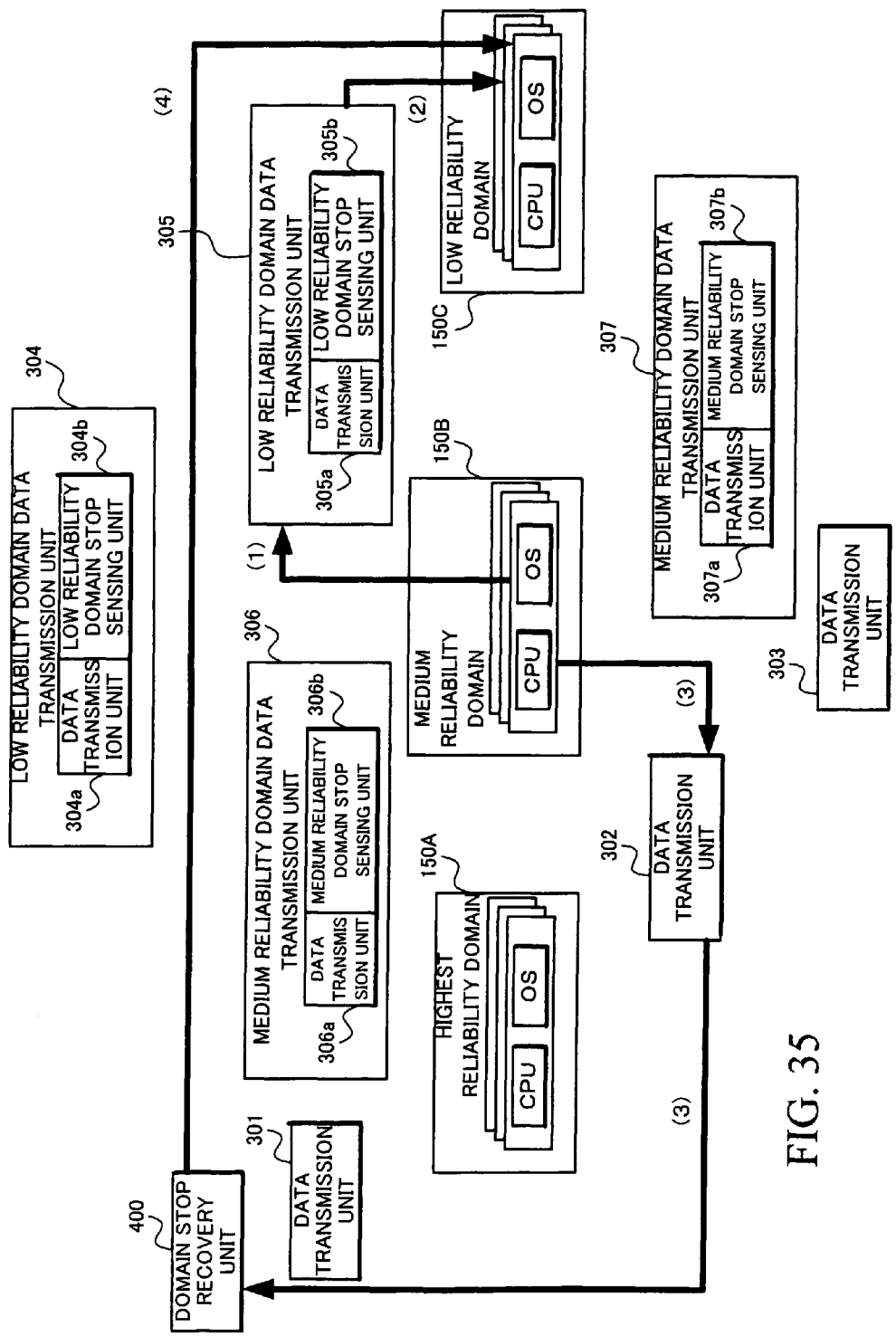
FIG. 35 is a diagram for use in explaining one example of operation of the information processing device according to the second exemplary embodiment of the present invention.

FIG. 35 is a diagram for use in explaining one example of operation executed when the first exemplary embodiment shown in FIG. 24 comprises the stop recovery unit 400 shown in FIG. 34, which illustrates stop sensing•recovery processing of the low reliability domain 150C by the medium reliability domain 150B. In FIG. 35, a numeral attached to each arrow represents a step number at which information is transferred on the relevant line.

This differs from the first exemplary embodiment shown in FIG. 24 in that the medium reliability domain 150B requests the domain stop recovery unit 400 for recovery of the low reliability domain 150C through the data transmission unit 302.

First, assume that as an initial state, the low reliability domain 150C abnormally stops and the medium reliability domain 150B is allowed to use the domain stop recovery unit 400 or has authorization to use the domain stop recovery unit 400.

Step 1: The medium reliability domain 150B transmits data to the low reliability domain 150C through the data transmission unit 305a of the data transmission unit 305 with a low reliability domain stop sensing function.

Step 2: The low reliability domain stop sensing unit 305b of the data transmission unit 305 with a low reliability domain stop sensing function senses the low reliability domain 150C stopping.

Step 3: Upon sensing the low reliability domain 150c stopping by the low reliability domain stop sensing unit 305b, the medium reliability domain 150B which is allowed to use the domain stop recovery unit 400 requests the domain stop recovery unit 400 to recover the low reliability domain 150C through the data transmission unit 302.

Step 4: The domain stop recovery unit 400 recovers the low reliability domain 150C based on the recovery request from the medium reliability domain 150B.

For confirming that the above-described low reliability domain 150C whose recovery is requested actually stops, the domain stop recovery unit 400 may sense existence/nonexistence of stop by using the data transmission unit 304 with a low reliability domain stop sensing function between Step 3 and Step 4.

Alternatively, in principle, for confirming such a failure as actual stop of the above-described low reliability domain 150C whose recovery is requested, the domain stop recovery unit 400 may sense existence/non-existence of stop or the like by using the data transmission unit 304 with a low reliability domain stop sensing function and when a recovery request is made from the medium reliability domain 150B, refrain from sensing existence/non-existence of such a failure as the above-described stop based on setting of reliability between Step 3 and Step 4.

(Processing Request by Low Reliability Domain 150C)

Figure 36:
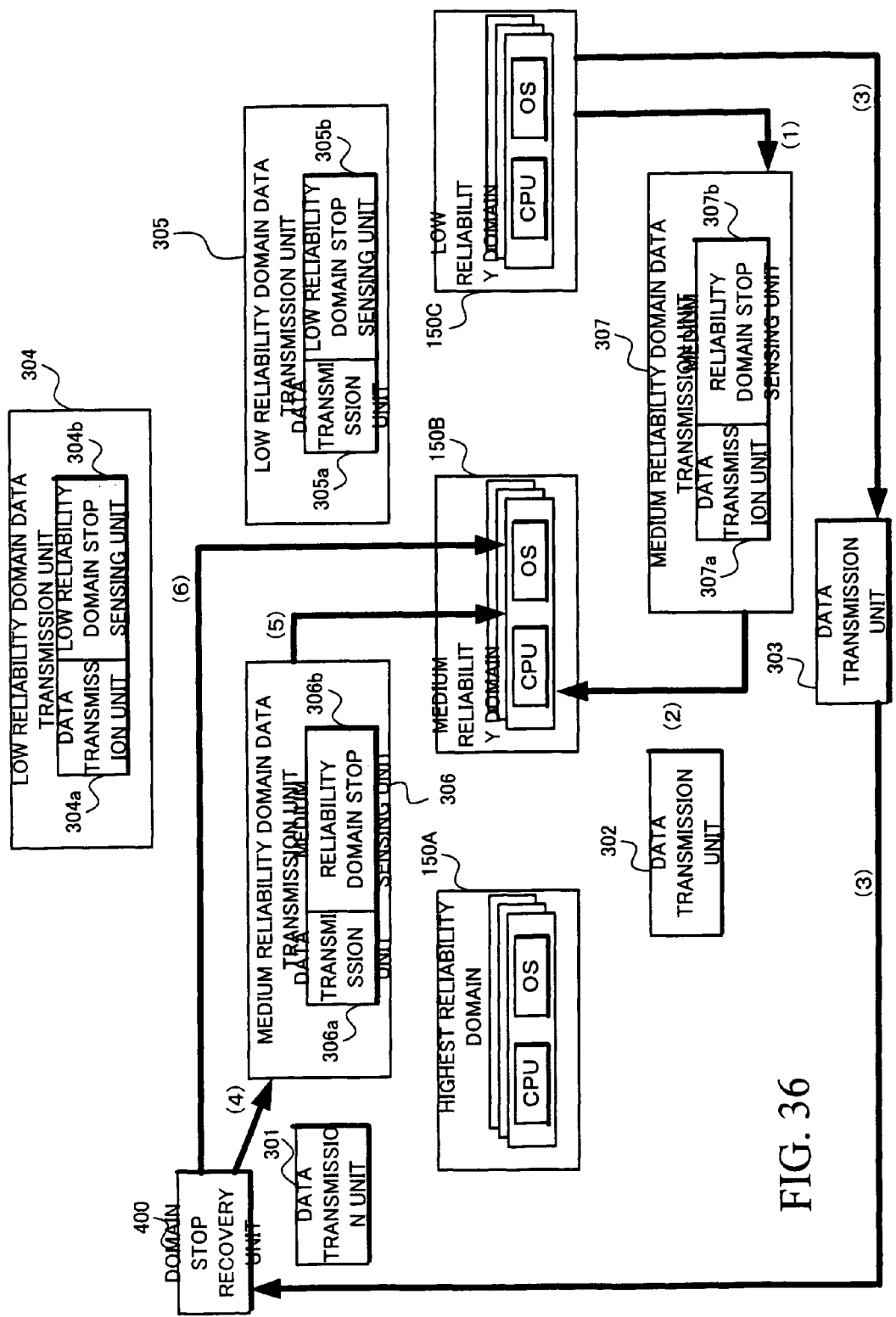
FIG. 36 is a diagram for use in explaining one example of operation of the information processing device according to the second exemplary embodiment of the present invention.

FIG. 36 is a diagram for use in explaining one example of operation executed when the first exemplary embodiment shown in FIG. 24 comprises the stop recovery unit 400 shown in FIG. 34, which illustrates stop sensing•recovery processing of the medium reliability domain 150B by the low reliability domain 150C. In FIG. 36, a numeral attached to each arrow represents a step number at which information is transferred on the relevant line.

This differs from the first exemplary embodiment shown in FIG. 24 in that the low reliability domain 150C requests the domain stop recovery unit 400 for recovery of the medium reliability domain 150B through the data transmission unit 303, and the domain stop recovery unit 400 senses data transmission to the medium reliability domain 150B and stop of the medium reliability domain 150B by using the data transmission unit 307 with a medium reliability domain stop sensing function.

First, assume that as an initial state, the medium reliability domain 150B abnormally stops and the low reliability domain 150C is allowed to use the domain stop recovery unit 400 or has authorization to use the domain stop recovery unit 400.

Step 1: The low reliability domain 150C transmits data to the medium reliability domain 150B through the data transmission unit 307a of the data transmission unit 307 with a medium reliability domain stop sensing function.

Step 2: The medium reliability domain stop sensing unit 307b of the data transmission unit 307 with a medium reliability domain stop sensing function senses the medium reliability domain 150B stopping.

Step 3: Upon sensing the medium reliability domain 150B stopping by the medium reliability domain stop sensing unit 307b, the low reliability domain 150C requests the domain stop recovery unit 400 to recover the medium reliability domain 150B through the data transmission unit 303.

Step 4: Since the low reliability domain 150C as a recovery requesting source domain has a reliability which is lower than that of the medium reliability domain 150B as a recovery target domain and which is low reliability, for confirming genuineness of a target or contents of a recovery request, the domain stop recovery unit 400 transmits data to the medium reliability domain 150B through the data transmission unit 306a of the data transmission unit 306 with a medium reliability domain stop sensing function.

Step 5: Upon sensing the medium reliability domain 150B stopping by the medium reliability domain stop sensing unit 306b of the data transmission unit 306 with a medium reliability domain stop sensing function, the domain stop recovery unit 400 confirms that the medium reliability domain 150B actually stops.

Step 6: Upon confirming that the medium reliability domain 150B actually stops, the domain stop recovery unit 400 recovers the medium reliability domain 150B based on the recovery request from the low reliability domain 150C.

(Processing Request by the Same Reliability Domain)

Figure 37:
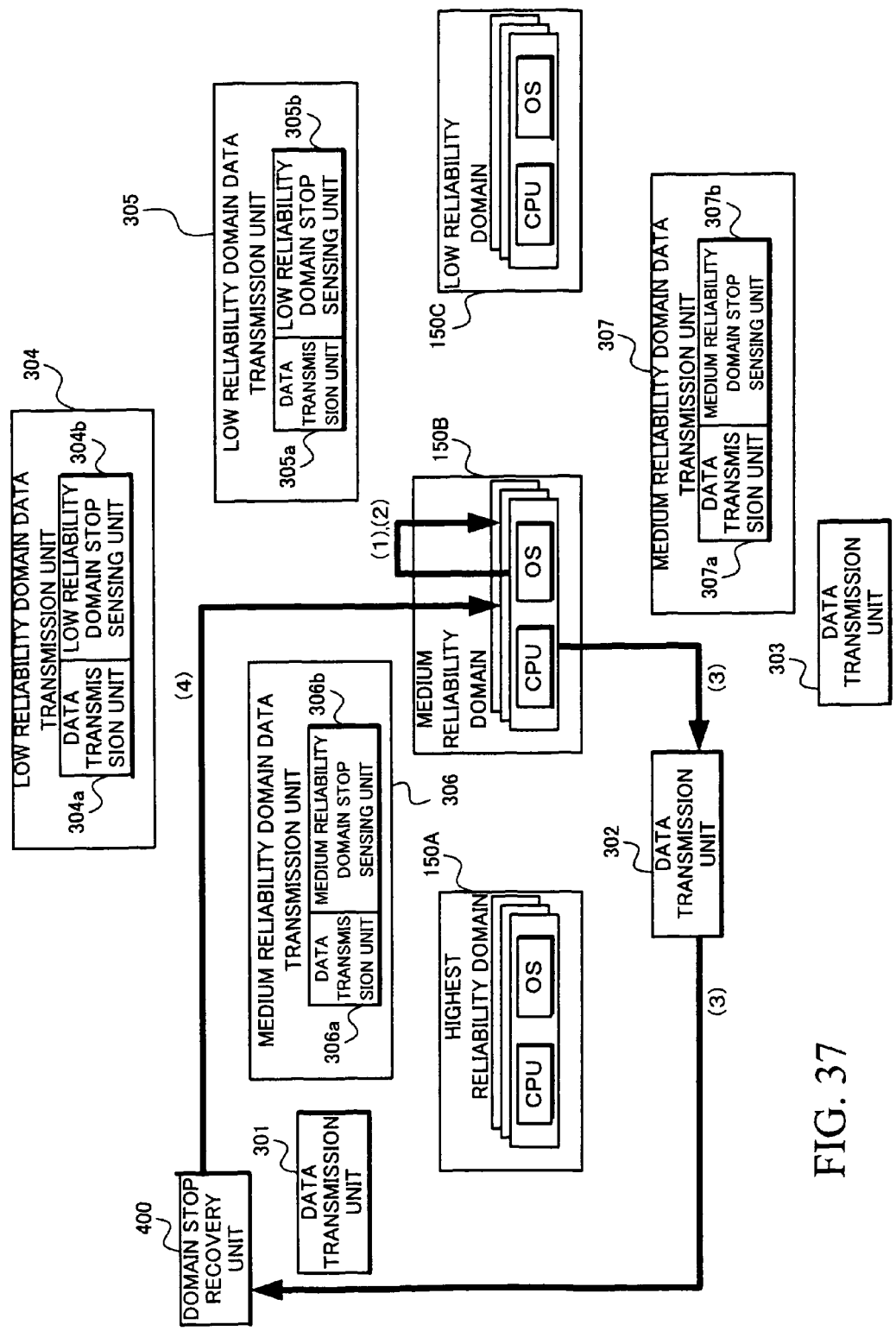
FIG. 37 is a diagram for use in explaining one example of operation of the information processing device according to the second exemplary embodiment of the present invention.

FIG. 37 is a diagram for use in explaining one example of operation executed when the first exemplary embodiment shown in FIG. 24 comprises the stop recovery unit 400 shown in FIG. 34, which illustrates stop sensing•recovery processing of other medium reliability domain 150B by the medium reliability domain 150B as one example of stop sensing•recovery processing in the same reliability domain. In FIG. 37, a numeral attached to each arrow represents a step number at which information is transferred on the line in question.

This differs from the first exemplary embodiment shown in FIG. 24 in that the medium reliability domain 150B requests the domain stop recovery unit 400 for recovery of other medium reliability domain 150B through the data transmission unit 302.

First assume that as an initial state, at least one medium reliability domain 150B in a group of the medium reliability domains 150B is allowed to use the domain stop recovery unit 400 or has authorization to use the domain stop recovery unit 400.

Step 1: Other medium reliability domain 150B not stopping transmits data to the above-described medium reliability domain 150B in the group of the medium reliability domains 150B.

Step 2: Stop of the above-described medium reliability domain 150B as a data transmission destination is sensed.

Step 3: Upon sensing the above-described medium reliability domain 150B as a data transmission destination stopping, the medium reliability domain 150B as a transmission source of the data which is allowed to use the domain stop recovery unit 400 requests the domain stop recovery unit 400 to recover the above-described medium reliability domain 150B being in the stopped state through the data transmission unit 302.

Step 4: The domain stop recovery unit 400 recovers the above-described medium reliability domain 150B in the stopped state based on the recovery request from the medium reliability domain 150B as a transmission source of the data in question.

For confirming that the above-described medium reliability domain 150B whose recovery is requested actually stops, the domain stop recovery unit 400 may sense existence/non-existence of stop by using the data transmission unit 306 with a medium reliability domain stop sensing function between Step 3 and Step 4.

(Effects of Second Exemplary Embodiment)

Thus, according to the second exemplary embodiment, the stop confirmation unit 403 executes the above-described sensing processing based on information notified by various kinds of domains. Accordingly, even when the highest reliability domain 150A is notified of a processing request by the medium reliability domain 150B or the low reliability domain 150C, it is unnecessary to sense an actual failure condition of a domain to be processed and confirm genuineness of the processing contents, so that processing loads of the highest reliability domain 150A can be mitigated.

(Third Exemplary Embodiment)

The third exemplary embodiment corresponds to the first exemplary embodiment shown in FIG. 24 and adopts the same structure as that of the first exemplary embodiment but differs in that the domain stop recovery unit 400 has a recovery processing control unit 404 which receives a request issued by various kinds of domains.

In the following, the differences from the above-described first embodiment will be mainly described.

(Structure of Third Exemplary Embodiment)

Figure 38:
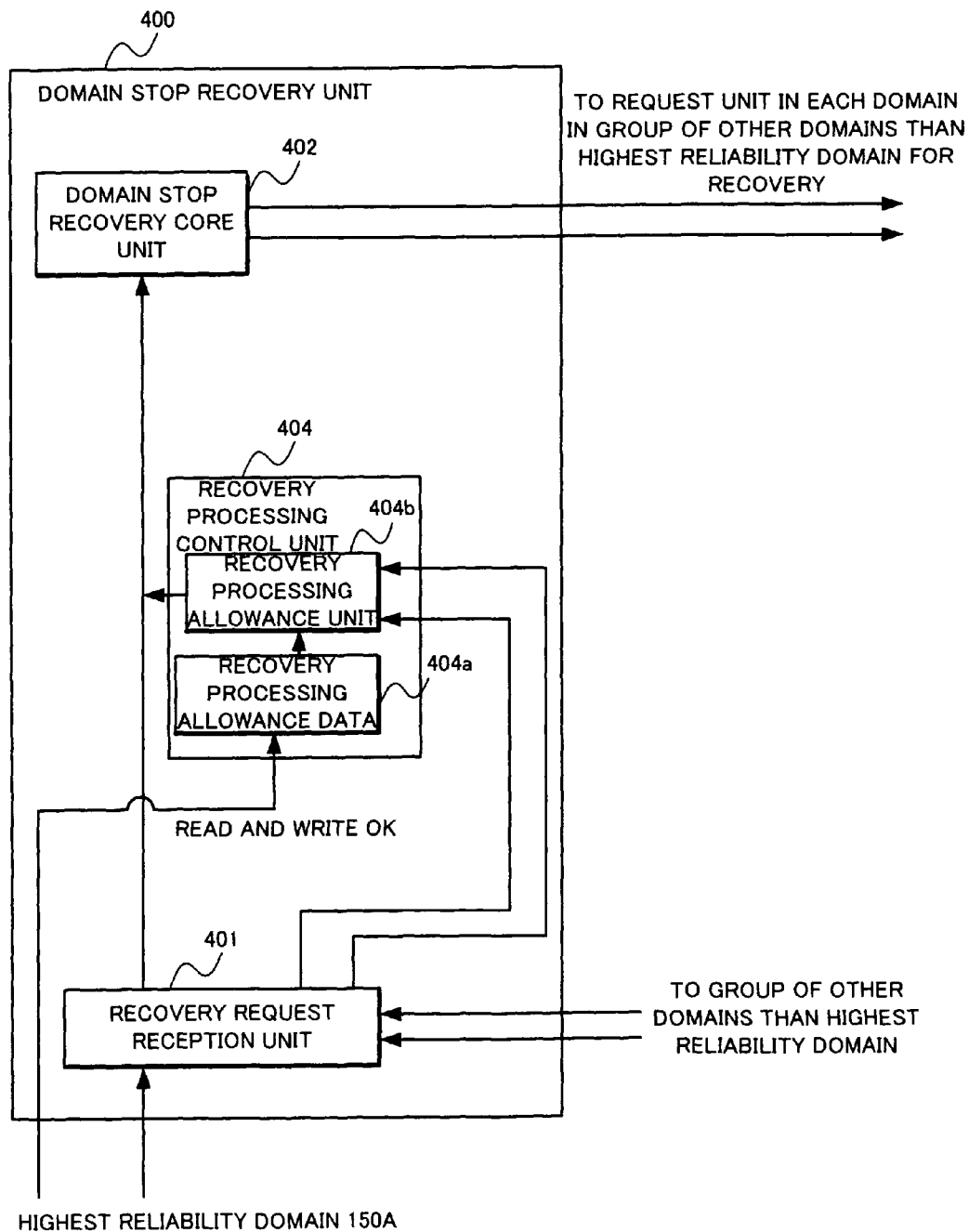
FIG. 38 is a diagram showing a structure of a domain stop recovery unit 400 of an information processing device according to a third exemplary embodiment of the present invention.

FIG. 38 is a diagram showing a structure of the domain stop recovery unit 400 according to the third exemplary embodiment.

As shown in FIG. 38, the domain stop recovery unit 400 according to the present exemplary embodiment differs from that of the first exemplary embodiment in having the recovery processing control unit 404.

In the following, differences from the above-described first embodiment will be mainly described.

The recovery processing control unit 404 has the same structure and function as those of the access control unit 30 shown in FIG. 4, comprises a storage unit storing recovery processing allowance data 404a and a recovery processing allowance unit 404b and has a function of determining whether a processing request notified from other domain than the highest reliability domain 150A through the recovery request reception unit 401 is allowed or not.

In addition, the recovery processing control unit 404, when notified of a processing request, notifies the domain stop recovery unit 400 only of the allowed processing request.

Here, with respect to a recovery request (processing request) received from each domain, the recovery request reception unit 401 notifies the domain stop recovery processing unit 402 of a recovery request (processing request) received from the highest reliability domain 150A and notifies the recovery processing allowance unit 404b of a recovery request (processing request) received from other domain than the highest reliability domain 150A.

The recovery processing control unit 404 executes control to allow other domain than the highest reliability domain 150A which is a domain required to have a low level security only a processing request in a form allowed in advance to a domain allowed in advance.

The recovery processing allowance data 404a is data set in advance by the highest reliability domain 150A with a processing request notified from other domain than the highest reliability domain 150A and predetermined processing contents to a predetermined domain correlated with each other, which data can be read•written from/to the highest reliability domain 150A. From the recovery processing allowance unit 404b, only read is allowed. Furthermore, from other domain than the highest reliability domain 150A, neither read nor write is allowed. In other words, there exists no data bus between the recovery processing allowance data 404a and other domain than the highest reliability domain 150A.

Figure 39:
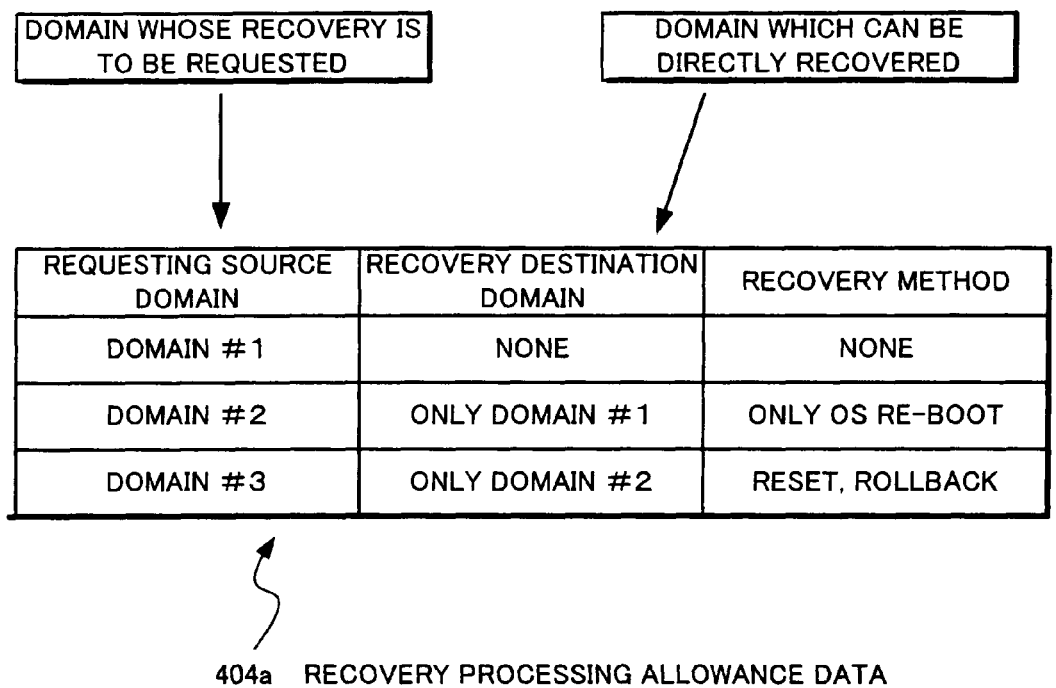
FIG. 39 is a diagram showing one example of contents of a recovery processing allowance data 404a of the information processing device according to the third exemplary embodiment of the present invention.

FIG. 39 shows one example of contents of the recovery processing allowance data 404a.

As shown in FIG. 39, for a certain requesting source domain as a domain on the side requesting recovery, the recovery processing allowance data 404a defines a recovery destination domain as a target of recovery processing and its recovery method.

In a case where the requesting source domain is a domain #1, defined are no recovery destination domain and no recovery method.

In a case where the requesting source domain is a domain #2, defined are the domain #1 only as a recovery destination domain and only OS reboot as a recovery method.

In a case where the requesting source domain is a domain #3, defined are the domain #2 only as a recovery destination domain and reset and rollback as a recovery method.

The recovery processing allowance unit 404b has a function of, upon receiving a processing request from other domain than the highest reliability domain 150A through the recovery request reception unit, referring to the requesting source domain of the recovery processing allowance data 404a, the recovery destination domain and the recovery method to determine whether to allow the processing request according to whether the processing request is relevant or not and when the request is an allowed processing request, issuing the processing request to the domain stop recovery unit 400. On the other hand, when the determination is made not to allow, the recovery processing allowance unit 404b refrains from issuing the request to the domain stop recovery unit 400.

In other words, in addition to allowance or refusal of a recovery request from an individual domain according to reliability of the domain as described in the first exemplary embodiment, recovery conditions can be determined according to a recovery destination domain and processing contents such as recovery processing. As a recovery condition in the present exemplary embodiment, for example, in addition to condition setting in the first exemplary embodiment to refuse all the recovery requests from the domain #1, defined is to partially allow a recovery request from the domain #2 and the domain #3 according to each recovery destination domain and processing contents. It is thus characterized in enabling minuter recovery condition setting.

(Operation of Third Exemplary Embodiment)

Figure 40:
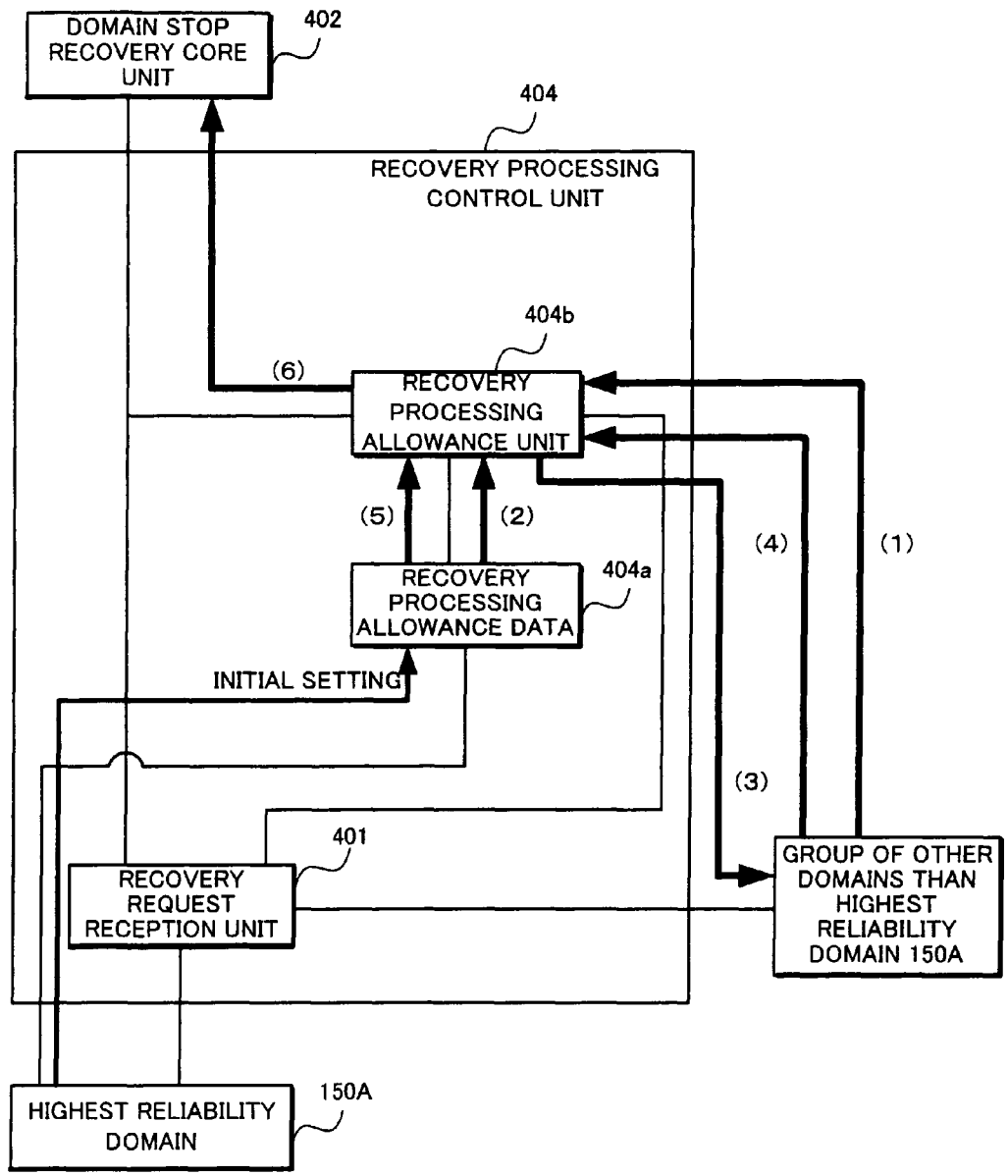
FIG. 40 is a diagram for use in explaining one example of operation of a recovery processing control unit 404 of the information processing device according to the third exemplary embodiment of the present invention.

FIG. 40 is a diagram for use in explaining one example of operation of the recovery processing control unit 404. In FIG. 40, a numeral beside an arrow represents a step number.

First, as initial setting, the highest reliability domain 150A defines contents of the recovery processing allowance data 404a.

Step 1: Assume that other domain than the highest reliability domain 150A issues a processing request not coincident with the recovery processing allowance data 404a.

Step 2: The recovery processing allowance unit 404b reads the recovery processing allowance data 404a by obtaining the processing request to determine whether to allow the processing request.

Step 3: The recovery processing allowance unit 404b returns an error to other domain than the highest reliability domain 150A. This is because the processing request fails to coincide with the recovery processing allowance data 404a.

Step 4: Other domain than the highest reliability domain 150A issues other processing request than the above-described processing request.

Step 5: The recovery processing allowance unit 404b reads the recovery processing allowance data 404a by obtaining the processing request to determine whether to allow the processing request.

Step 6: When allowing the processing request from other domain than the highest reliability domain 150A, the recovery processing allowance unit 404b issues the processing request to the domain stop recovery processing unit 402.

Although as a structure of the recovery processing control unit 404, the third exemplary embodiment has been described with respect to an example of executing control of a processing request based on the recovery processing allowance data 404a, and the recovery processing allowance data 404a comprising the recovery processing allowance unit 404b, the present invention is not limited to the structure of the present invention, and in place of the recovery processing allowance data (inverted), recovery processing refusal data and a recovery processing refusal unit may be provided. In this case, when a processing request from other domain than the highest reliability domain 150A coincides with a predetermined condition in any or all of a predetermined requesting source domain in which refusal of recovery processing is defined by the recovery processing refusal data, a recovery refusal destination domain and a recovery method, the recovery processing refusal unit executes control to refuse the processing request in question.

(Effects of Third Exemplary Embodiment)

Thus, since according to the third exemplary embodiment of the present invention, the recovery processing allowance unit 404b of the recovery processing control unit 404 executes control to allow only a processing request to a domain allowed in advance in a form allowed in advance based on the recovery processing allowance data 404a, it is possible to prevent various kinds of attacks to the highest reliability domain 150A requiring high level security by additional processing externally obtained by other domain than the highest reliability domain 150A by downloading or the like.

In addition, since the recovery processing control unit 404 decentralizes the recovery processing of the domain stop recovery unit 400 to speed up recovery processing.

As a variation example of the third exemplary embodiment, the recovery processing allowance unit 404b may comprise a cache. In this case, the recovery processing allowance data 404a used for determining allowance/non-allowance of a processing request is stored in the cache to determine, in determination of allowance/non-allowance of processing requests to follow, whether there exists the recovery processing allowance data 404a of the relevant processing request in the cache and in a case of cache-hit, realize speed up of determination on allowance/non-allowance of the processing request.

(Fourth Exemplary Embodiment)

The fourth exemplary embodiment corresponds to the first exemplary embodiment shown in FIG. 24 and adopts the same structure as that of the first exemplary embodiment but differs in that the domain stop recovery unit 400 has the stop confirmation unit 403 and the recovery processing control unit 404.

In the following, differences from the above-described first exemplary embodiment will be mainly described.

Figure 41:
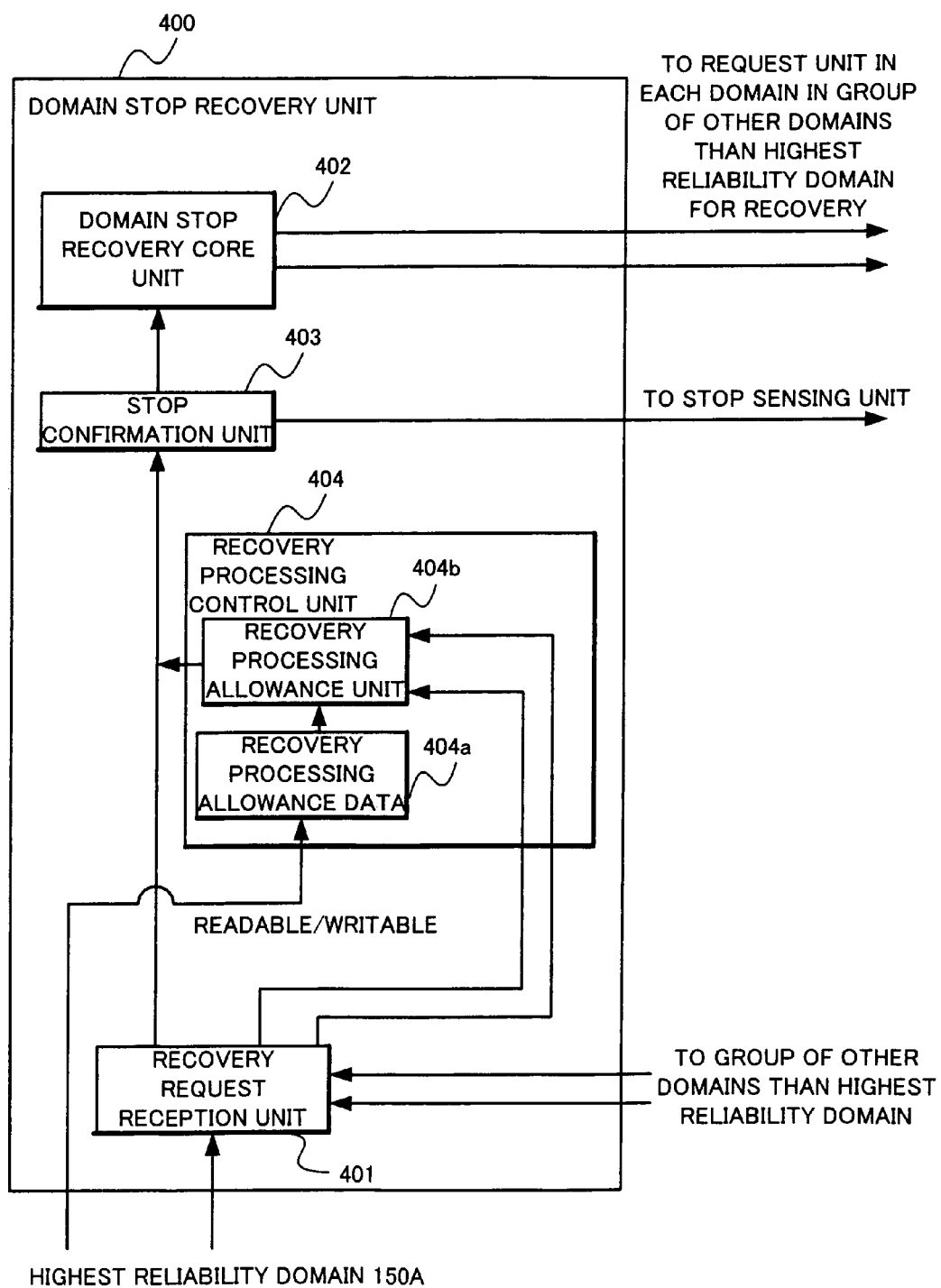
FIG. 41 is a diagram showing a structure of a domain stop recovery unit 400 of an information processing device according to a fourth exemplary embodiment of the present invention.
Figure 42:
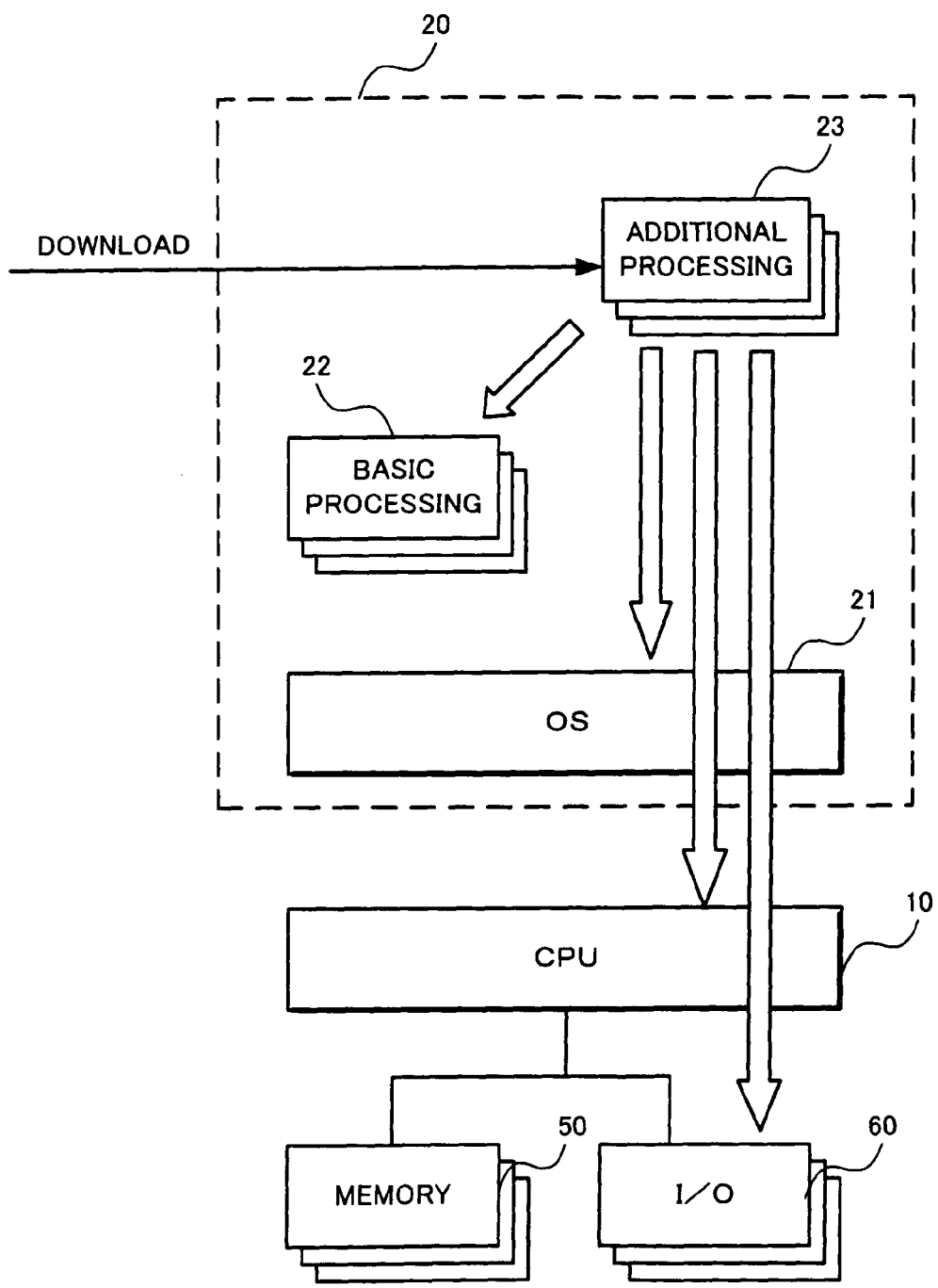
FIG. 42 is a diagram showing one example of a related system structure.
Figure 43:
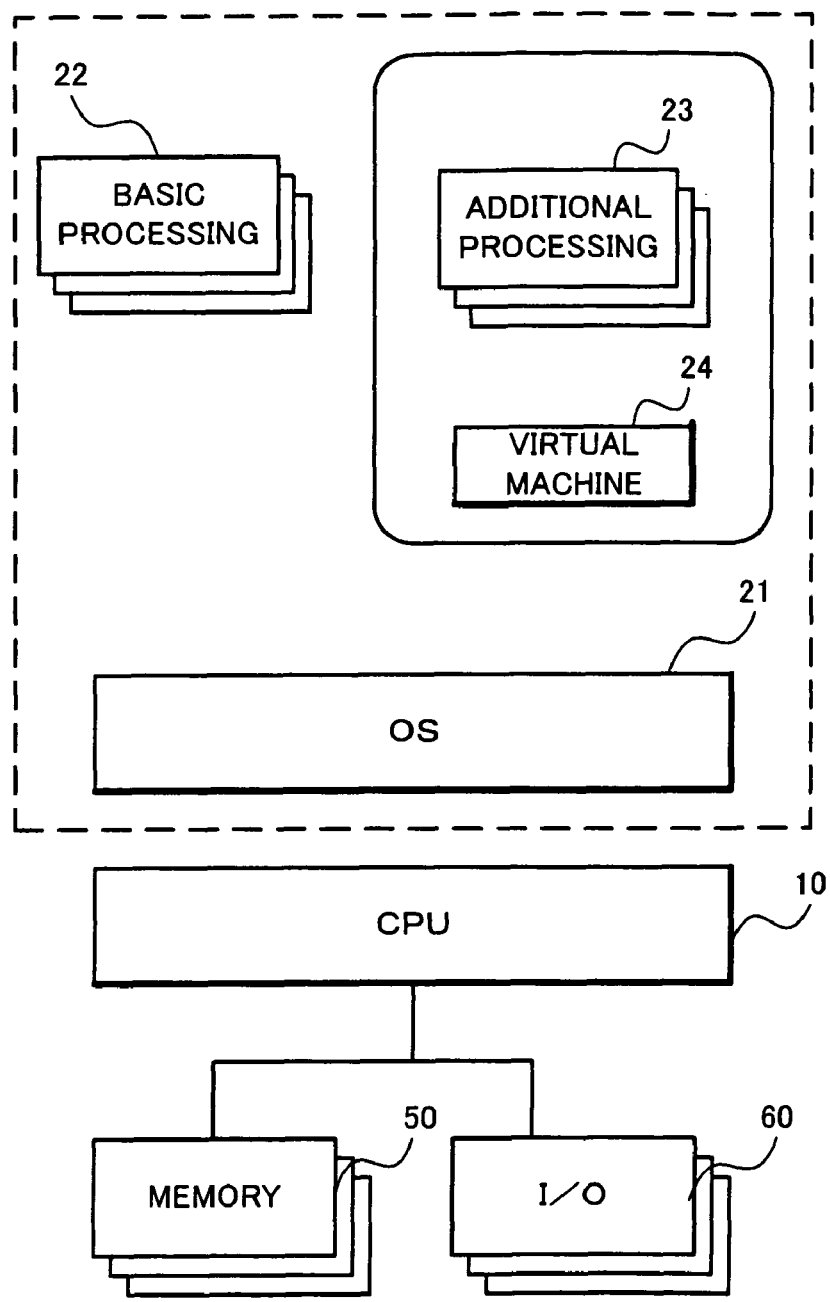
FIG. 43 is a diagram showing another example of a related system structure.
Figure 44:
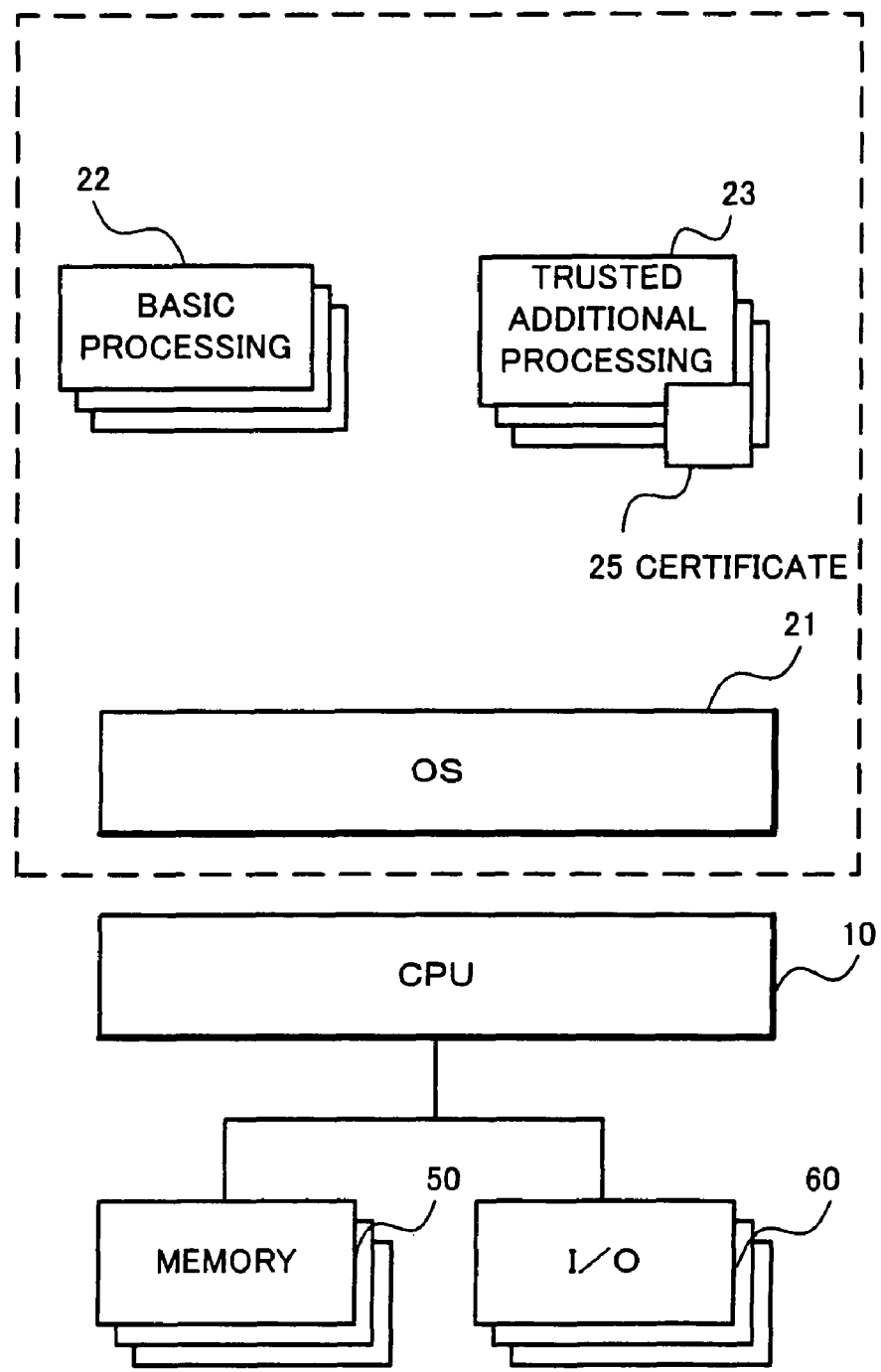
FIG. 44 is a diagram showing a further example of a related system structure.
Figure 45:
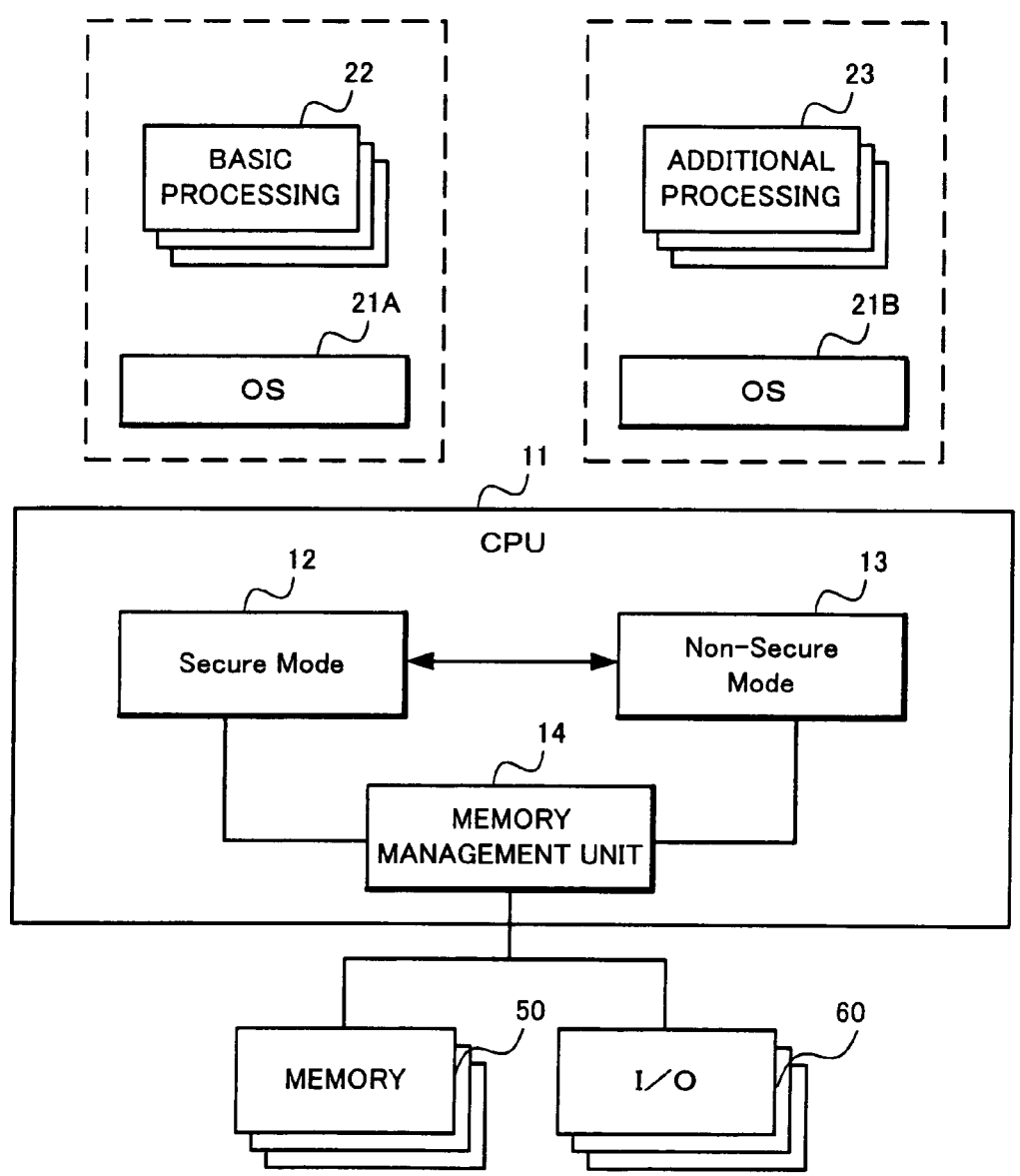
FIG. 45 is a diagram showing a still further example of a related system structure.

FIG. 41 is a diagram showing a structure of the domain stop recovery unit 400 according to the fourth exemplary embodiment.

As shown in FIG. 41, the domain stop recovery unit 400 according to the fourth exemplary embodiment differs from the first exemplary embodiment in having the stop confirmation unit 403 and the recovery processing control unit 404.

Here, since the stop confirmation unit 403 has the same structure as that of the stop confirmation unit 403 in the second exemplary embodiment and the recovery processing control unit 404 has the same structure as that of the recovery processing control unit 404 in the third exemplary embodiment, no description will be made thereof.

(Operation of Fourth Exemplary Embodiment)

In the domain stop recovery unit 400 according to the fourth exemplary embodiment, the recovery processing control unit 404 determines to allow or not allow a processing request from other domain than the highest reliability domain 150A similarly to the third exemplary embodiment, and the stop confirmation unit 403 obtains a processing request allowed by the recovery processing control unit 404 and similarly to the second exemplary embodiment, confirms genuineness of the content of processing related to the obtained processing request and when confirming that it is true, notifies the domain stop recovery processing unit 402 of information about the obtained processing request.

(Effects of Fourth Exemplary Embodiment)

Thus, according to the fourth exemplary embodiment of the present invention, since the recovery processing allowance unit 404b of the recovery processing control unit 404 executes control to allow only a processing request to a domain allowed in advance in a form allowed in advance based on the recovery processing allowance data 404a, it is possible to prevent various kinds of attacks to the highest reliability domain 150A requiring high level security by additional processing externally obtained by other domain than the highest reliability domain 150A by downloading or the like, thereby improving security of the highest reliability domain 150A.

In addition, since the recovery processing control unit 404 decentralizes the recovery processing of the domain stop recovery unit 400, speed-up of recovery processing can be realized.

Furthermore, the stop confirmation unit 403 executes the above-described sensing processing based on information related to a processing request allowed by the recovery processing allowance unit 404b. Accordingly, since even when the highest reliability domain 150A is notified of a processing request by the medium reliability domain 150B or the low reliability domain 150C, it is unnecessary to sense an actual failure condition of a domain to be processed and confirm genuineness of the content of the processing, it is possible to reduce processing loads on the highest reliability domain 150A, as well as appropriately recovering a failure actually occurring in a domain while ensuring security of the highest reliability domain 150A.

While the present invention has been described with respect to the plurality of preferred exemplary embodiments in the foregoing, the present invention is not limited to the above-described exemplary embodiments, and it can be implemented in variation within a range of its technical idea.

For example, while the present exemplary embodiment has been described with respect to the information processing device formed by three domains as an example, the number of domains is not limited to the three but be two or not less than four as long as the respective domains are separated as described in the present exemplary embodiment.

Furthermore, the present exemplary embodiment has been described, for example, with respect to a structure in which the recovery processing control unit 404 is provided in the domain stop recovery unit 400, the position of the recovery processing control unit 404 is not limited to be within the stop recovery unit 400 but to be outside the stop recovery unit 400, within the highest reliability domain 150A, or at a plurality of places. When the recovery processing control unit 404 is provided in the highest reliability domain 150A, the highest reliability domain 150A may determine whether to allow or not to allow a processing request from other domain than the highest reliability domain 150A and notify the domain stop recovery processing unit 402 of information of an allowed processing request.

According to the present exemplary embodiments of the invention, the following effects can be attained.

First effect is that a failure occurring in each domain is recovered upon a recovery request satisfying a recovery condition set in advance.

The reason is that since with a plurality of processors provided which form a plurality of domains according to processing contents to be executed, processors in different domains communicate with each other through a communication unit to execute failure recovery processing with respect to a domain developing a fault based on a failure recovery request notified from a domain and a recovery condition set in advance for each domain, a failure can be recovered in response to a recovery request satisfying a recovery condition set in advance for each failure occurring in each domain.

Second effect is that a predetermined domain among a plurality of domains can be recovered according to a recovery condition different from those of other domains.

The reason is that with a plurality of domains formed with a specific domain and other domains separated according to processing contents to be executed, failure recovery processing is executed with respect to a domain developing a fault based on a failure recovery request notified from the specific domain or other domains and based on a recovery condition set in advance for each of the specific domain and other domains. Accordingly, since a plurality of domains are formed with a specific domain and other domains separated according to processing contents to be executed, failure recovery processing is executed with respect to a domain developing a fault based on a failure recovery request notified from the specific domain or other domains and a recovery condition set in advance for each of the specific domain and other domains, the specific domain and other domains can be recovered according to different recovery conditions.

Third effect is that security of a domain which executes processing whose security level is higher than a certain fixed level can be ensured.

The reason is that with a specific domain being a domain which executes processing whose security level is higher than a certain fixed level and other domain being a domain having at least one processing whose security level is lower than that of the processing executed in the specific domain, the specific domain senses a failure in other domain through data transmission to other domain by a communication unit to make a failure recovery request to a recovery unit. Accordingly, the specific domain which executes processing whose security level is higher than a certain fixed level and other domain having at least one processing whose security level is lower than that of the processing executed in the specific domain are formed separately with each other and the specific domain which has detected a failure occurring in other domain and which executes processing whose security level is higher than a certain fixed level recovers other domain having at least one processing whose security level is lower than that of the processing executed in the specific domain through the recovery unit.

Fourth effect is improvement in availability of an information processing device.

The reason is that a domain whose security is ensured and which executes processing whose security level is higher than a certain fixed level detects a failure occurring in a domain having at least one processing whose security level is lower than that of the processing executed in the specific domain to recover the failure through a recovery unit.

Fifth effect is that a failure occurring in each domain can be recovered with a predetermined security level ensured.

The reason is that a recovery condition is defined based on a security level set for each processing contents indicated in a failure recovery request from a domain and a recovery unit executes failure recovery processing with respect to a domain developing a fault based on the failure recovery request notified from the domain and the recovery condition. Accordingly, a recovery request which satisfies the recovery condition defined based on a security level set for each processing contents is accepted.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-177811, filed on Jun. 17, 2005, the disclosure of which is incorporated herein in its entirety by reference.

The invention claimed is:

1. An information processing device, comprising:
a plurality of processors; and
a memory shared by said plurality of processors; wherein said plurality of processors form a plurality of domains which include one or a plurality of processors in said plurality of processors according to processing contents to be executed, and
the processors in different domains communicate with each other through a communication unit, and which further comprises
a recovery unit for executing, for a domain developing a fault, failure recovery processing based on a failure recovery request notification sent by said domain and a recovery condition set in advance for each said domain,
wherein said plurality of domains are structured separately as a specific domain and one or more other domains according to processing contents to be executed, and
said recovery unit executes, for a domain developing a fault, failure recovery processing based on a failure recovery request sent by said specific domain or said one or more other domains and a recovery condition set in advance for each of said specific domain and said one or more other domains,
wherein said specific domain is a domain executing processing whose security level is equal to or higher than a fixed security level,
said one or more other domains are a domain having at least one processing content whose security level is lower than a security level of processing executed in said specific domain,
said one or more other domains sense a failure in an other domain in accordance with a security level of the other domain and notify said specific domain of a recovery request for the failure of said other domain, and
said specific domain senses a failure in said other domain through a data transmission to said other domain by said communication unit and makes a recovery request for said failure to said recovery unit.

2. The information processing device according to claim 1, wherein
said sensing of a failure through a data transmission is executed according to whether a response is made or not from a domain as a destination of said data transmission within a predetermined time period or a predetermined number of times,
said specific domain is a domain executing basic processing as said processing whose security level is equal to or higher than a fixed security level, and for sensing a failure by said specific domain through a data transmission to said other domain, a time period shorter than said predetermined time period is set or a number of times less than said predetermined number of times is set.

3. The information processing device according to claim 1, wherein said recovery condition is defined based on a security level set for each processing contents and is indicated in a failure recovery request from said one or more other domains, and said recovery unit executes, for a domain developing a fault, failure recovery processing based on a failure recovery request sent by one or more other domains and said recovery condition.

4. The information processing device according to claim 1, wherein said one or more other domains are structured separately, according to processing contents to be executed, as a first domain having at least one processing content whose security level is lower than a security level of processing executed by said specific domain and a second domain having at least one processing content whose security level is lower than a security level of processing executed by said first domain, said second domain senses a failure in said first domain through a data transmission to said first domain by said communication unit and notifies said specific domain of a recovery request for the failure of said first domain, and said specific domain senses a failure of the first domain through said data transmission to said first domain by said communication unit and makes a recovery request for said failure to said recovery unit.

5. The information processing device according to claim 4, wherein sensing of a failure through said data transmission is executed according to whether a response is made or not from a domain as a destination of said data transmission within a predetermined time period or a predetermined number of times, and for sensing a failure by said second domain through said data transmission to said first domain, a time period longer than said predetermined time period is set or a number of times larger than said predetermined number of times is set.

6. The information processing device according to claim 1, wherein said recovery unit accepts a recovery request from said specific domain unconditionally and refuses a recovery request from said one or more other domains.

7. The information processing device according to claim 1, wherein upon notification of a failure recovery request from a domain, said recovery unit senses a failure in a domain to be recovered through a data transmission to said domain and executes, for said domain developing the failure, failure recovery processing based on said failure recovery request and said recovery condition.

8. The information processing device according to claim 1, wherein said recovery unit comprises a determination unit for determining whether to allow a failure recovery request notification sent by a domain, and based on a recovery request allowed by said determination unit, executes failure recovery processing for a domain developing a fault.

9. The information processing device according to claim 8, wherein said determination unit comprises data related to failure recovery which is set for each domain, and based on a failure recovery request sent by a domain and said data, determines whether to allow said failure recovery request.

10. The information processing device according to claim 9, wherein said data is set based on a security level set for each processing contents and is indicated by a failure recovery request from a domain.

11. The information processing device according to claim 1, wherein said recovery unit comprises a determination unit for determining whether to allow a failure recovery request sent by a domain, and based on a recovery request allowed by said determination unit, senses a failure in said domain to be recovered through a data transmission to said domain to be recovered, and executes failure recovery processing for said domain developing a fault.

12. An information processing device, comprising:

a plurality of processors; and a memory shared by said plurality of processors; wherein said plurality of processors form a plurality of domains which include one or a plurality of processors in said plurality of processors according to processing contents to be executed, and the processors in different domains communicate with each other through a communication unit, and which further comprises a recovery unit for executing, for a domain developing a fault, failure recovery processing based on a failure recovery request notification sent by said domain and a recovery condition set in advance for each said domain, wherein said plurality of domains are structured separately as a specific domain and one or more other domains according to processing contents to be executed, and said recovery unit executes, for a domain developing a fault, failure recovery processing based on a failure recovery request sent by said specific domain or said one or more other domains and a recovery condition set in advance for each of said specific domain and said one or more other domains, said specific domain is a domain executing processing whose security level is equal to or higher than a fixed security level, said one or more other domains are a domain having at least one processing content whose security level is lower than a security level of processing executed in said specific domain, said one or more other domains sense a failure in an other domain in accordance with a security level of the other domain and notify said specific domain of a recovery request for a failure of said other domain, and said specific domain makes a recovery request for said failure to said recovery unit.

13. The information processing device according to claim 6, wherein said one or more other domains are structured separately, according to processing contents to be executed, as a first domain having at least one processing content whose security level is lower than a security level of processing executed by said specific domain and a second domain having at least one processing content whose security level is lower than a security level of processing executed by said first domain, said first domain senses a failure in said second domain through a data transmission to said second domain by said communication unit and notifies said specific domain of a recovery request for the failure of said second domain, and said specific domain makes a recovery request for said failure to said recovery unit.

14. An information processing device, comprising:
a plurality of processors; and
a memory shared by said plurality of processors; wherein
said plurality of processors form a plurality of domains which include one or a plurality of processors in said plurality of processors according to processing contents to be executed, and
the processors in different domains communicate with each other through a communication unit, and which further comprises
a recovery unit for executing, for a domain developing a fault, failure recovery processing based on a failure recovery request notification sent by said domain and a recovery condition set in advance for each said domain,
wherein said plurality of domains are structured separately as a specific domain and one or more other domains according to processing contents to be executed, and
said recovery unit executes, for a domain developing a fault, failure recovery processing based on a failure recovery request sent by said specific domain or said one or more other domains and a recovery condition set in advance for each of said specific domain and said one or more other domains,
said specific domain is a domain executing processing whose security level is equal to or higher than a fixed security level,
said one or more other domains are a domain having at least one processing content whose security level is lower than a security level of processing executed in said specific domain,
said one or more other domains sense a failure in an other domain in accordance with a security level of the other domain and makes a recovery request for said failure to said recovery unit without passing through said specific domain, and
said recovery unit executes, for said other domain developing a fault, failure recovery processing based on a recovery request for said failure notified by said one or more other domains and a recovery condition set in advance for each other domain.

15. The information processing device according to claim 14, wherein
said one or more other domains are structured separately, according to processing contents to be executed, as a first domain having at least one processing content whose security level is lower than a security level of processing executed by said specific domain and a second domain having at least one processing content whose security level is lower than a security level of processing executed by said first domain,
said first domain senses a failure in said second domain through a data transmission to said second domain by said communication unit and notifies said recovery unit of a recovery request for the failure of said second domain without passing through said specific domain, and
said recovery unit executes, for a second domain developing a fault, failure recovery processing based on a recovery request of said failure notified by said first domain and a recovery condition set in advance for each said other domain.

16. The information processing device according to claim 14, wherein
said one or more other domains are structured separately, according to processing contents to be executed, as a first domain having at least one processing content whose security level is lower than a security level of processing executed by said specific domain and a second domain having at least one processing content whose security level is lower than a security level of processing executed by said first domain,
said second domain senses a failure in said first domain through a data transmission to said first domain by said communication unit and notifies said recovery unit of a recovery request for the failure of said first domain without passing through said specific domain, and
said recovery unit senses a failure of the first domain through said data transmission to said first domain by said communication unit and executes, for said first domain developing a fault, failure recovery processing based on a recovery request of said failure notified by said second domain and a recovery condition set in advance for each said other domain.

17. A recovery device for recovering, on an information processing device having a plurality of domains as virtual machines formed of a plurality of processors, a failure occurring on a domain, which comprises
with said plurality of processors forming a plurality of domains which include one or a plurality of processors in said plurality of processors according to processing contents to be executed,
a recovery unit which forms said information processing device for executing, for a domain developing a fault, failure recovery processing based on a failure recovery request notification sent by said domain and a recovery condition set in advance for each said domain,
said plurality of domains are structured separately as a specific domain and one or more other domains according to processing contents to be executed,
said recovery unit executes, for a domain developing a fault, failure recovery processing based on a failure recovery request sent by said specific domain or said one or more other domains and a recovery condition set in advance for each of said specific domain and said one or more other domains,
said one or more other domains are structured separately, according to processing contents to be executed, as a first domain having at least one processing content whose security level is lower than a security level of processing executed by said specific domain and a second domain having at least one processing content whose security level is lower than a security level of processing executed by said first domain,
said second domain senses a failure in said first domain through a data transmission to said first domain and notifies said recovery unit of a recovery request for the failure of said first domain without passing through said specific domain, and
said recovery unit senses a failure of the first domain through said data transmission to said first domain and executes, for said first domain developing a fault, failure recovery processing based on a recovery request of said failure notified by said second domain and a recovery condition set in advance for each said one or more other domains.

18. The recovery device according to claim 17, wherein
said recovery unit accepts a recovery request from said specific domain unconditionally and refuses a recovery request from said one or more other domains.

19. The recovery device according to claim 17, wherein upon notification of a failure recovery request from a domain, said recovery unit senses a failure in a domain to be recovered through a data transmission to said domain and executes, for said domain developing the failure, failure recovery processing based on said failure recovery request and said recovery condition.

20. The recovery device according to claim 17, wherein said recovery unit
comprises a determination unit for determining whether to allow a failure recovery request notification sent by a domain, and
based on a recovery request allowed by said determination unit, executes failure recovery processing for a domain developing a fault.

21. The recovery device according to claim 20, wherein said determination unit
comprises data related to failure recovery which is set for each domain, and
based on a failure recovery request sent by a domain and said data, determines whether to allow said failure recovery request.

22. The recovery device according to claim 21, wherein said data is set based on a security level set for each processing contents and is indicated by a failure recovery request from a domain.

23. The recovery device according to claim 17, wherein said recovery unit
comprises a determination unit for determining whether to allow a failure recovery request sent by said one or more other domains, and
based on a recovery request allowed by said determination unit, senses a failure in said domain to be recovered through a data transmission to said domain to be recovered, and executes failure recovery processing for said domain developing a fault.

24. A non-transitory medium having a program executed on an information processing device as a computer processing device formed of a plurality of processors to realize recovery of a function of said information processing device, which making said information processing device execute
with said plurality of processors forming a plurality of domains according to processing contents to be executed,
a communication function of causing the processors in different domains to communicate with each other, and
a recovery function of executing, for a domain developing a fault, failure recovery processing based on a failure recovery request notification sent by said domain and a recovery condition set in advance for each said domain,
wherein the program further comprises the functions of:
with said plurality of domains being structured separately as a specific domain and one or more other domains according to processing contents to be executed,
a function of causing said recovery function to execute, for a domain developing a fault, failure recovery processing based on a failure recovery request sent by said specific domain or said one or more other domains and a recovery condition set in advance for each of said specific domain and said one or more other domains,
with said specific domain being a domain executing processing whose security level is equal to or higher than a fixed security level and said one or more other domains being a domain having at least one processing content whose security level is lower than a security level of processing executed in said specific domain,
a function of causing said one or more other domains to sense a failure in an other domain in accordance with a security level of the other domain to notify said specific domain of a recovery request for the failure of said other domain, and
a function of causing said specific domain to sense a failure in said other domain through a data transmission to said other domain by said communication function to make a recovery request for said failure to said recovery function.

25. The non-transitory medium according to claim 24, wherein the program further comprises the functions of:
a function of executing sensing of a failure through said data transmission according to whether a response is made or not from a domain as a destination of said data transmission within a predetermined time period or a predetermined number of times,
a function of causing said specific domain to execute basic processing as said processing whose security level is equal to or higher than a fixed security level, and
a function of, when said failure sensing function senses a failure by said specific domain through said data transmission to said other domain, setting a time period shorter than said predetermined time period or setting a number of times less than said predetermined number of times.

26. The non-transitory medium according to claim 24, wherein the program further comprises the functions of:
with said recovery condition being defined based on a security level set for each processing contents and indicated in a failure recovery request from said one or more other domains,
a function of causing said recovery function to execute, for a domain developing a fault, failure recovery processing based on a failure recovery request sent by said one or more other domains and said recovery condition.

27. The non-transitory medium according to claim 24, wherein the program further comprises the functions of:
with said one or more other domains being structured separately, according to processing contents to be executed, as a first domain having at least one processing content whose security level is lower than a security level of processing executed by said specific domain and a second domain having at least one processing content whose security level is lower than a security level of processing executed by said first domain,
a function of causing said second domain to sense a failure in said first domain through said data transmission to said first domain by said communication function to notify said specific domain of a recovery request for the failure of said first domain, and
a function of causing said specific domain to sense a failure of the first domain through said data transmission to said first domain by said communication function to make a recovery request for said failure to said recovery function.

28. The computer non-transitory medium according to claim 27, wherein the program further comprises the functions of:

a function of executing sensing of a failure through a data transmission according to whether a response is made or not from a domain as a destination of said data transmission within a predetermined time period or a predetermined number of times, and a function of, when said failure sensing function senses a failure by said second domain through said data transmission to said first domain, setting a time longer than said predetermined time or setting a number of times larger than said predetermined number of times.

29. The non-transitory medium according to claim 24, wherein further the program comprises the function of:

a function of causing said recovery function to accept a recovery request from said specific domain unconditionally and refuse a recovery request from said one or more other domains.

30. The non-transitory medium according to claim 24, wherein the program further comprises the function of:

a function of causing said recovery function, upon notification of a failure recovery request from a domain, to sense a failure in a domain to be recovered through a data transmission to said domain to be recovered and execute, for said domain developing the failure, failure recovery processing based on said failure recovery request and said recovery condition.

31. The non-transitory medium according to claim 24, wherein said recovery function comprises a determination function of determining whether to allow a failure recovery request sent by said one or more other domains, and further comprising a function of executing failure recovery processing for a domain developing a fault based on a recovery request allowed by said determination function.

32. The non-transitory medium according to claim 31, wherein the program further comprises the function of:

a function of causing said determination function to determine whether to allow said failure recovery request based on a failure recovery request sent by a domain and a security level set for each processing contents of said domain.

33. The non-transitory medium according to claim 24, wherein said recovery function comprises a determination function of determining whether to allow a failure recovery request sent by said one or more other domains, and further comprising a function of sensing, based on a recovery request allowed by said determination function, a failure in said domain to be recovered through a data transmission to said domain to be recovered by said communication function, and executing failure recovery processing for said domain developing a fault.

34. A non-transitory medium having a program executed on an info illation processing device as a computer processing device formed of a plurality of processors to realize recovery of a function of said information processing device, which making said information processing device execute with said plurality of processors forming a plurality of domains according to processing contents to be executed, a communication function of causing the processors in different domains to communicate with each other, and a recovery function of executing, for a domain developing a fault, failure recovery processing based on a failure recovery request notification sent by said domain and a recovery condition set in advance for each said domain, wherein the program further comprises the functions of:

with said plurality of domains being structured separately as a specific domain and one or more other domains according to processing contents to be executed, a function of causing said recovery function to execute, for a domain developing a fault, failure recovery processing based on a failure recovery request sent by said specific domain or said one or more other domains and a recovery condition set in advance for each of said specific domain and said one or more other domains, with said specific domain being a domain executing processing whose security level is equal to or higher than a fixed security level and said one or more other domains being a domain having at least one processing content whose security level is lower than a security level of processing executed in said specific domain, a function of causing said one or more other domains to sense a failure in an other domain in accordance with a security level of the other domain to notify said specific domain of a recovery request for a failure of said other domain, and a function of causing said specific domain to make a recovery request for said failure to said recovery function.

35. The non-transitory medium according to claim 34, wherein the program further comprises the functions of:

with said one or more other domains being structured separately, according to processing contents to be executed, as a first domain having at least one processing content whose security level is lower than a security level of processing executed by said specific domain and a second domain having at least one processing content whose security level is lower than a security level of processing executed by said first domain, a function of causing said first domain to sense a failure in said second domain through a data transmission to said second domain by said communication function to notify said specific domain of a recovery request for the failure of said second domain, and a function of causing said specific domain to make a recovery request for said failure to said recovery function.

36. A non-transitory medium having a program executed on an information processing device as a computer processing device formed of a plurality of processors to realize recovery of a function of said information processing device, which making said information processing device execute with said plurality of processors forming a plurality of domains according to processing contents to be executed, a communication function of causing the processors in different domains to communicate with each other, and a recovery function of executing, for a domain developing a fault, failure recovery processing based on a failure recovery request notification sent by said domain and a recovery condition set in advance for each said domain, wherein the program further comprises the functions of:

with said plurality of domains being structured separately as a specific domain and one or more other domains according to processing contents to be executed, a function of causing said recovery function to execute, for a domain developing a fault, failure recovery processing based on a failure recovery request sent by said specific domain or said one or more other domains and a recovery condition set in advance for each of said specific domain and said other domain, with said specific domain being a domain executing processing whose security level is equal to or higher than a fixed security level and said one or more other domains being a domain having at least one processing content whose security level is lower than a security level of processing executed in said specific domain, a function of causing said one or more other domains to sense a failure in an other domain in accordance with a security level of the other domain to make a recovery request for said failure to said recovery function without passing through said specific domain, and a function of causing said recovery function to execute, for said other domain developing a fault, failure recovery processing based on a recovery request for said failure notified by said one or more other domains and a recovery condition set in advance for each said other domain.

37. The non-transitory medium according to claim 36, wherein the program further comprises the functions of:

with said one or more other domains being structured separately, according to processing contents to be executed, as a first domain having at least one processing content whose security level is lower than a security level of processing executed by said specific domain and a second domain having at least one processing content whose security level is lower than a security level of processing executed by said first domain, a function of causing said first domain to sense a failure in said second domain through a data transmission to said second domain by said communication function to notify said recovery function of a recovery request for the failure of said second domain without passing through said specific domain, and a function of causing said recovery function to execute, for said second domain developing a fault, failure recovery processing based on a recovery request of said failure notified by said first domain and a recovery condition set in advance for each said other domain.

38. The non-transitory medium according to claim 36, wherein the program further comprises the functions of:

with said one or more other domains being structured separately, according to processing contents to be executed, as a first domain having at least one processing content whose security level is lower than a security level of processing executed by said specific domain and a second domain having at least one processing content whose security level is lower than a security level of processing executed by said first domain, a function of causing said second domain to sense a failure in said first domain through a data transmission to said first domain by said communication function to notify said recovery function of a recovery request for the failure of said first domain without passing through said specific domain, and a function of causing said recovery function to sense a failure of the first domain through said data transmission to said first domain by said communication function and executing, for said first domain developing a fault, failure recovery processing based on a recovery request of said failure notified by said second domain and a recovery condition set in advance for each said other domain.

39. A recovery method of recovering a processing function of an information processing device formed of a plurality of processors, comprising:

with said plurality of processors forming a plurality of domains according to processing contents to be executed, and with the processors in different domains communicating by a communication step, a recovery step of executing, by a recovery unit on said information processing device, failure recovery processing for a domain developing a fault based on a failure recovery request notification sent by said domain and a recovery condition set in advance for each said domain, with said plurality of domains being structured separately as a specific domain and one or more other domains according to processing contents to be executed, at said recovery step, for a domain developing a fault, failure recovery processing is executed based on a failure recovery request sent by said specific domain or said one or more other domains and a recovery condition set in advance for each of said specific domain and said one or more other domains, with said specific domain being a domain executing processing whose security level is equal to or higher than a fixed security level and said one or more other domains being a domain having at least one processing content whose security level is lower than a security level of processing executed in said specific domain, a sensing step of said one or more other domains to sense a failure in an other domain in accordance with a security level of the other domain, a notification step of said one or more other domains to notify said specific domain of a recovery request for a failure of said other domain sensed at said sensing step, a sensing step of said specific domain to sense a failure in said other domain notified at said notification step through a data transmission to said other domain by said communication unit, and a step of said specific domain to make a recovery request for said failure sensed at said sensing step to said recovery unit.

40. The recovery method according to claim 39, further comprising:

a step of executing sensing of a failure through said data transmission according to whether a response is made or not from a domain as a destination of said data transmission within a predetermined time period or a predetermined number of times, wherein said specific domain is a domain executing basic processing as processing whose security level is equal to or higher than said fixed security level, and at said step, when sensing a failure through said data transmission by said specific domain to said other domain, a failure is sensed by a time shorter than said predetermined time or a number of times less than said predetermined number of times.

41. The recovery method according to claim 39, wherein said recovery condition is defined based on a security level set for each processing contents and indicated in a failure recovery request from said one or more other domains, and at said recovery step, for said other domain developing a fault, failure recovery processing is executed based on a failure recovery request sent by said one or more other domains and said recovery condition.

42. The recovery method according to claim 39, wherein at said recovery step, a recovery request from said specific domain is accepted unconditionally and a recovery request from said one or more other domains is refused.

43. The recovery method according to claim 39, comprising:
- a sensing step of said recovery unit, upon notification of a failure recovery request from a domain, to sense a failure in a domain to be recovered through a data transmission to said domain to be recovered by said communication step, wherein
- at said recovery step after sensing at said sensing step, recovery processing of a failure is executed for said domain developing the failure based on said failure recovery request and said recovery condition.

44. The recovery method according to claim 39, wherein at said recovery step, failure recovery processing is executed for a domain developing a fault based on a recovery request allowed by said determination step of said recovery unit that determines whether to allow a failure recovery request sent from a domain.

45. The recovery method according to claim 44, wherein at said determination step, whether to allow said failure recovery request is determined based on a failure recovery request sent by said domain and a security level set for each processing contents of said domain.

46. The recovery method according to claim 39, wherein at said recovery step, based on a recovery request allowed by the determination step of said recovery unit that determines whether to allow a failure recovery request sent by one or more other domains, a failure in said domain to be recovered is sensed through a data transmission to said domain to be recovered by said communication step and failure recovery processing is executed for said domain developing a fault.

47. A recovery method of recovering a processing function of an information processing device formed of a plurality of processors, comprising:
- with said plurality of processors forming a plurality of domains according to processing contents to be executed, and
- with the processors in different domains communicating by a communication step,
- a recovery step of executing, by a recovery unit on said information processing device, failure recovery processing for a domain developing a fault based on a failure recovery request notification sent by said domain and a recovery condition set in advance for each said domain,
- with said plurality of domains being structured separately as a specific domain and one or more other domains according to processing contents to be executed,
- at said recovery step, for a domain developing a fault, failure recovery processing is executed based on a failure recovery request sent by said specific domain or said one or more other domains and a recovery condition set in advance for each of said specific domain and said one or more other domains,
- said specific domain being a domain executing processing whose security level is equal to or higher than a fixed security level, and said one or more other domains being a domain having at least one processing content whose security level is lower than a security level of processing executed in said specific domain,
- a sensing step of said one or more other domains to sense a failure in an other domain in accordance with a security level of the other domain,
- a notification step of said one or more other domains to notify said specific domain of a recovery request for a failure of said other domain sensed at said sensing step, and
- a step of said specific domain to make a recovery request for said failure notified at said notification step to said recovery unit.

48. A recovery method of recovering a processing function of an information processing device formed of a plurality of processors, comprising:
- with said plurality of processors forming a plurality of domains according to processing contents to be executed, and
- with the processors in different domains communicating by a communication step,
- a recovery step of executing, by a recovery unit on said information processing device, failure recovery processing for a domain developing a fault based on a failure recovery request notification sent by said domain and a recovery condition set in advance for each said domain,
- with said plurality of domains being structured separately as a specific domain and one or more other domains according to processing contents to be executed,
- at said recovery step, for a domain developing a fault, failure recovery processing is executed based on a failure recovery request sent by said specific domain or said one or more other domains and a recovery condition set in advance for each of said specific domain and said one or more other domains,
- said specific domain being a domain executing processing whose security level is equal to or higher than a fixed security level, and said one or more other domains being a domain having at least one processing content whose security level is lower than a security level of processing executed in said specific domain,
- a sensing step of said one or more other domains to sense a failure in an other domain in accordance with a security level of the other domain, and
- a step of said one or more other domains to make a recovery request for said failure sensed at said sensing step to said recovery unit without passing through said specific domain, wherein
- at said recovery step, failure recovery processing is executed for said other domain developing a fault based on a recovery request of said failure notified by one or more other domains and a recovery condition set in advance for each said other domain.

49. A recovery method of recovering a processing function of an information processing device formed of a plurality of processors, comprising:
- with said plurality of processors forming a plurality of domains according to processing contents to be executed, and
- with the processors in different domains communicating by a communication step,
- a recovery step of executing, by a recovery unit on said information processing device, failure recovery processing for a domain developing a fault based on a failure recovery request notification sent by said domain and a recovery condition set in advance for each said domain
- with said plurality of domains being structured separately as a specific domain and one or more other domains according to processing contents to be executed,
- at said recovery step, for a domain developing a fault, failure recovery processing is executed based on a failure recovery request sent by said specific domain or said one or more other domains and a recovery condition set in advance for each of said specific domain and said one or more other domains,
- said specific domain being a domain executing processing whose security level is equal to or higher than a fixed security level, and said one or more other domains being a domain having at least one processing content whose security level is lower than a security level of processing executed in said specific domain, a sensing step of said one or more other domains to sense a failure in an other domain in accordance with a security level of the other domain, a notification step of said one or more other domains to notify said specific domain of a recovery request for a failure of said other domain sensed at said sensing step, and a step of said specific domain to make a recovery request for said failure notified at said notification step to said recovery unit, with said one or more other domains being structured separately, according to processing contents to be executed, as a first domain having at least one processing content whose security level is lower than a security level of processing executed by said specific domain and a second domain having at least one processing content whose security level is lower than a security level of processing executed by said first domain, a sensing step of said first domain to sense a failure in said second domain through a data transmission to said second domain by said communication step, a notification step of said first domain to notify said specific domain of a recovery request for a failure of said second domain sensed at said sensing step, and a step of said specific domain to make a recovery request for said failure notified at said notification step to said recovery unit.

50. A recovery method of recovering a processing function of an information processing device formed of a plurality of processors, comprising:

with said plurality of processors forming a plurality of domains according to processing contents to be executed, and with the processors in different domains communicating by a communication step, a recovery step of executing, by a recovery unit on said information processing device, failure recovery processing for a domain developing a fault based on a failure recovery request notification sent by said domain and a recovery condition set in advance for each said domain, with said plurality of domains being structured separately as a specific domain and one or more other domains according to processing contents to be executed, at said recovery step, for a domain developing a fault, failure recovery processing is executed based on a failure recovery request sent by said specific domain or said one or more other domains and a recovery condition set in advance for each of said specific domain and said one or more other domains, said specific domain being a domain executing processing whose security level is equal to or higher than a fixed security level, and said one or more other domains being a domain having at least one processing content whose security level is lower than a security level of processing executed in said specific domain, a sensing step of said one or more other domains to sense a failure in an other domain in accordance with a security level of the other domain, and a step of said one or more other domains to make a recovery request for said failure sensed at said sensing step to said recovery unit without passing through said specific domain, wherein at said recovery step, failure recovery processing is executed for said other domain developing a fault based on a recovery request of said failure notified by said one or more other domains and a recovery condition set in advance for each said other domain, with said one or more other domains being structured separately, according to processing contents to be executed, as a first domain having at least one processing content whose security level is lower than a security level of processing executed by said specific domain and a second domain having at least one processing content whose security level is lower than a security level of processing executed by said first domain, a sensing step of said first domain to sense a failure in said second domain through a data transmission to said second domain by said communication step, and a notification step of said specific domain to notify said recovery unit of a recovery request for a failure of said second domain sensed at said sensing step without passing through said specific domain, wherein at said recovery step, failure recovery processing is executed for said second domain developing a fault based on a recovery request of said failure notified by said first domain and a recovery condition set in advance for each said other domain.

51. A recovery method of recovering a processing function of an information processing device formed of a plurality of processors, comprising:

with said plurality of processors forming a plurality of domains according to processing contents to be executed, and with the processors in different domains communicating by a communication step, a recovery step of executing, by a recovery unit on said information processing device, failure recovery processing for a domain developing a fault based on a failure recovery request notification sent by said domain and a recovery condition set in advance for each said domain, with a specific domain being a domain executing processing whose security level is equal to or higher than a fixed security level and one or more other domains being a domain having at least one processing content whose security level is lower than a security level of processing executed in said specific domain, a sensing step of said one or more other domains to sense a failure in the other domain in accordance with a security level of the other domain, a notification step of said one or more other domains to notify said specific domain of a recovery request for a failure of said other domain sensed at said sensing step, a sensing step of said specific domain to sense a failure in said other domain notified at said notification step through a data transmission to said other domain by said communication unit, and a step of said specific domain to make a recovery request for said failure sensed at said sensing step to said recovery unit, with said one or more other domains being structured separately, according to processing contents to be executed, as a first domain having at least one processing content whose security level is lower than a security level of processing executed by said specific domain and a second domain having at least one processing content whose security level is lower than a security level of processing executed by said first domain, a sensing step of said second domain to sense a failure in said first domain through said data transmission to said first domain at the communication step, a notification step of said second domain to notify said specific domain of a recovery request for a failure of said first domain sensed at said sensing step, a sensing step of said specific domain to sense a failure of the first domain notified at said notification step through said data transmission to said first domain by said communication step, and a step of said specific domain to make a recovery request for said failure sensed at said sensing step to said recovery unit.

52. The recovery method according to claim 51, comprising:

a step of executing sensing of a failure through said data transmission according to whether a response is made or not from a domain as a destination of said data transmission within a predetermined time period or a predetermined number of times, wherein at said step, when sensing a failure by said second domain through said data transmission to said first domain, a failure is sensed in a time longer than said predetermined time or by a number of times larger than said predetermined number of times.

53. A recovery method of recovering a processing function of an information processing device formed of a plurality of processors, comprising:

with said plurality of processors forming a plurality of domains according to processing contents to be executed, and with the processors in different domains communicating by a communication step, a recovery step of executing, by a recovery unit on said information processing device, failure recovery processing for a domain developing a fault based on a failure recovery request notification sent by said domain and a recovery condition set in advance for each said domain with said plurality of domains being structured separately as a specific domain and one or more other domains according to processing contents to be executed, at said recovery step, for a domain developing a fault, failure recovery processing is executed based on a failure recovery request sent by said specific domain or said one or more other domains and a recovery condition set in advance for each of said specific domain and said one or more other domains, said specific domain being a domain executing processing whose security level is equal to or higher than a fixed security level, and said one or more other domains being a domain having at least one processing content whose security level is lower than a security level of processing executed in said specific domain, a sensing step of said one or more other domains to sense a failure in an other domain in accordance with a security level of the other domain, and a step of said one or more other domains to make a recovery request for said failure sensed at said sensing step to said recovery unit without passing through said specific domain, wherein at said recovery step, failure recovery processing is executed for said other domain developing a fault based on a recovery request of said failure notified by one or more other domains and a recovery condition set in advance for each said other domain, with said one or more other domains being structured separately, according to processing contents to be executed, as a first domain having at least one processing content whose security level is lower than a security level of processing executed by said specific domain and a second domain having at least one processing content whose security level is lower than a security level of processing executed by said first domain, a sensing step of said second domain to sense a failure in said first domain through a data transmission to said first domain by said communication step, and a notification step of said second domain to notify said recovery unit of a recovery request for a failure of said first domain sensed at said sensing step without passing through said specific domain, wherein at said recovery step, a failure of the first domain is sensed through said data transmission to said first domain by said communication step, and for said first domain developing a fault, failure recovery processing is executed based on a recovery request of said failure notified by said second domain and a recovery condition set in advance for each said other domain.

* * * * *